United States Patent [19]

Blazek

[11] 4,197,584

[45] Apr. 8, 1980

[54] OPTICAL INSPECTION SYSTEM FOR PRINTING FLAW DETECTION

[75] Inventor: Henry Blazek, Brookfield, Conn.

[73] Assignee: The Perkin-Elmer Corporation, Norwalk, Conn.

[21] Appl. No.: 954,018

[22] Filed: Oct. 23, 1978

[51] Int. Cl.[2] .................... G06K 5/00

[52] U.S. Cl. .................... 364/551; 364/419; 356/71; 356/394; 250/556

[58] Field of Search .................... 364/551, 552, 523, 518; 356/71, 394; 250/555-567

[56] References Cited

U.S. PATENT DOCUMENTS

| | | | |
|---|---|---|---|
| 3,483,527 | 12/1969 | Terry | 364/523 X |
| 3,753,617 | 8/1973 | Ehrat | 356/394 X |
| 4,007,326 | 2/1977 | Bernsen | 356/394 X |
| 4,013,876 | 3/1977 | Anstin | 364/419 |
| 4,060,915 | 12/1977 | Conway | 364/419 X |
| 4,139,779 | 2/1979 | Ehrat | 356/71 X |
| 4,143,279 | 3/1979 | Ehrat et al. | 356/71 X |

*Primary Examiner*—Edward J. Wise
*Attorney, Agent, or Firm*—Salvatore A. Giarratana; Francis L. Masselle; Edwin T. Grimes

[57] ABSTRACT

An optical system for detecting printing flaws on a printed sheet includes a plurality of detector arrays each with a plurality of detector elements positioned to scan a reference sheet and the test sheet. Each detector element in each array "sees" a small area of a test or a reference sheet as the sheets are scanned and the output of the detector elements are synchronized with each other and compared. When the output from the test array detector does not equal the output of the corresponding reference array detector and the system is synchronized, the system coupled thereto indicates that the two areas "seen" are unequal. A sufficient and preset number of unequal indications are required to decide whether the test sheet is sufficiently different from the reference sheet that it should be destroyed.

14 Claims, 78 Drawing Figures

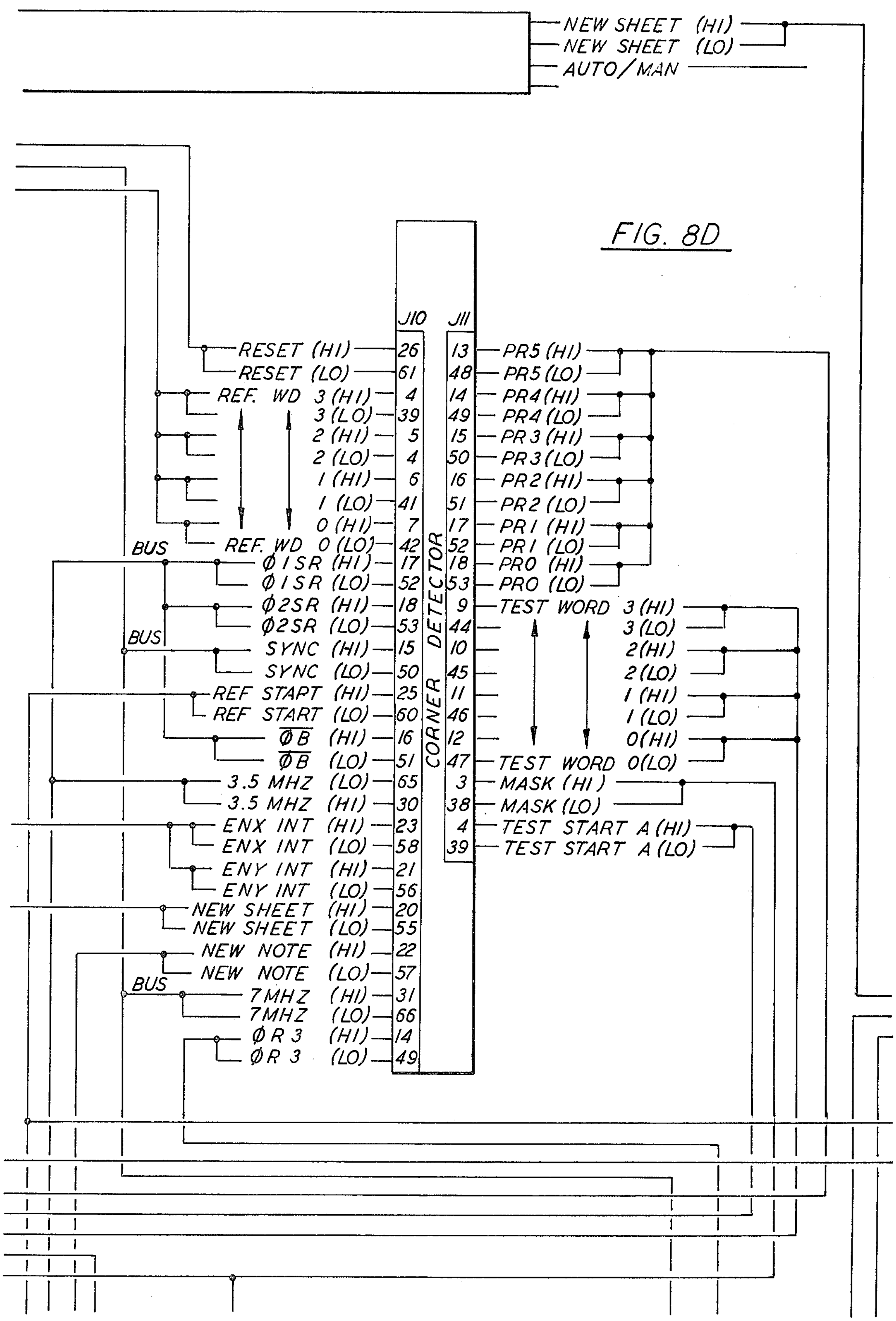
NEW SHEET (HI)
NEW SHEET (LO)
AUTO/MAN
FIG. 8D
J10
J11
CORNER DETECTOR
RESET (HI) 26
RESET (LO) 61
REF. WD 3 (HI) 4
3 (LO) 39
2 (HI) 5
2 (LO) 4
1 (HI) 6
1 (LO) 41
0 (HI) 7
REF. WD 0 (LO) 42
BUS
Ø1SR (HI) 17
Ø1SR (LO) 52
Ø2SR (HI) 18
Ø2SR (LO) 53
SYNC (HI) 15
SYNC (LO) 50
REF STAPT (HI) 25
REF START (LO) 60
ØB (HI) 16
ØB (LO) 51
3.5 MHZ (LO) 65
3.5 MHZ (HI) 30
ENX INT (HI) 23
ENX INT (LO) 58
ENY INT (HI) 21
ENY INT (LO) 56
NEW SHEET (HI) 20
NEW SHEET (LO) 55
NEW NOTE (HI) 22
NEW NOTE (LO) 57
7MHZ (HI) 31
7MHZ (LO) 66
ØR3 (HI) 14
ØR3 (LO) 49
13 PR5 (HI)
48 PR5 (LO)
14 PR4 (HI)
49 PR4 (LO)
15 PR3 (HI)
50 PR3 (LO)
16 PR2 (HI)
51 PR2 (LO)
17 PR1 (HI)
52 PR1 (LO)
18 PRO (HI)
53 PRO (LO)
9 TEST WORD 3 (HI)
44 3 (LO)
10 2 (HI)
45 2 (LO)
11 1 (HI)
46 1 (LO)
12 0 (HI)
47 TEST WORD 0 (LO)
3 MASK (HI)
38 MASK (LO)
4 TEST START A (HI)
39 TEST START A (LO)

OPTICAL INSPECTION SYSTEM FOR PRINTING FLAW DETECTION

BACKGROUND OF THE INVENTION

The present invention relates generally to an optical inspection system for detecting printing flaws in items where high quality printing is desired such as for bank notes, postage stamps, stock certificates and the like.

Bank notes and other printer paper of value such as postage stamps, stock certificates and the like are normally printed to very high quality standards for two principal reasons. First, the increased cost associated with high quality is justified by the value of the end product, and second, the high quality standards discourage potential counterfeiters. Despite all precautions, however, a small percentage of the printed product is produced with printing defects. Presently, such printing defects are discovered by manual inspection which is an expensive process and vulnerable to the subjective judgements and human frailties of the inspector. It is desirable, therefore, to substitute high speed automatic inspection for the present manual process.

The following discussion and description of the invention will concentrate on the problems and the solution to the problems relating to inspection of bank notes. However, those of skill in the art will recognize that the problems and solutions as they relate to bank notes are also common to the problems of high quality printing for postage stamps, stock certificates and other paper of value. Accordingly, the concepts of the present invention are applicable to any environment where high quality standards must be maintained in a printed product.

Ideally, it is desirable to perform inspection by making a point-by-point comparison between a test note to be inspected and a master note. The presence of a defect would then be determined by establishing a threshold on the difference resulting from each comparison. In reality, the "points" being compared are small finite areas approximately equal to the dimensions of the smallest speck that can be seen by the unaided human eye.

The approach adopted in accordance with the present invention assumes the comparison is between equivalent points. The procedure is analogous to a microscopic equivalent of the manual process in which the inspector compares eye for eye, nose for nose, etc., in the portrait area of two currency notes to determine a level of similarity. This technique requires the two notes to be properly registered while they are being viewed.

A major problem to be overcome before the inspection technology can be successful arises from the dimensional instability of the paper used for bank notes. This dimensional instability is also found in the paper used for other forms of high quality printing. Because of this paper instability, it is impossible to bring the entire test note into registration simultaneously with the reference note. Specifically, it has been determined that even if some portion of each note is brought into exact registration with the other note, the notes could be out of registration in other areas by as much an order of magnitude more than the dimension of the incremental areas being compared. Accordingly, a major objective of the present invention is to continuously and automatically maintain registration between the test note and the master note against which the test note is compared so as to compensate for paper instability.

In view of the foregoing objective, it is necessarily axiomatic that the present invention must be able to continuously measure registration error in two dimensions between two similar images. The apparatus must be capable of performing the electronic equivalent of a manual procedure in which one dithers two transparencies along two orthogonal axes to determine the best fit.

In addition to being able to detect a registration error, it is necessary for the system to be able to correct registration errors in two dimensions so that pixels (picture elements) on the test note may be compared to corresponding pixels on a reference note in real time.

It is highly desirable to utilize digital electronics in a system according to the present invention, however, a digital system operates in discrete step sizes so that implementation of a tracking error corrector results in what is referred to as a quantization error which is an ultimate limiting factor on tracker performance. For example, if the step size is one pixel, the minimum quantization error would be one half pixel. This occurs because any attempt to correct an error of less than one half pixel would result in creating an error of greater than one half pixel and of the opposite sign. In general, the minimum quantization error is equal to one half the step size of the correction. It is, therefore, a further objective of the present invention to incorporate a mechanism for minimizing the step size of the tracking error correction as well as prevent tracking error correction when such correction will produce a larger tracking error than the error sought to be corrected.

A further problem associated with currency inspection is to ensure that substantially all of the test note is scanned and compared with a reference note. Accordingly, it is yet a further objective of the present invention to provide a mechanism for quickly achieving initial registration between the test note and the reference note so that even the very first part of each note tested is compared with the reference note.

Since every system has some low level noise, it is a further objective of the present invention to provide an optical comparator which has a low gain when viewing areas of a printed sheet having no detail and high gain when viewing areas of a printed sheet having maximum detail thereby minimizing the effect of system noise.

BRIEF DESCRIPTION OF THE INVENTION

In achieving the foregoing and other objectives of the present invention, the currency inspection system includes a suitable transport for moving sheets of uncut bank notes by a sensor head/illuminator. Within the sensor head/illuminator, a light source is directed toward the uncut sheet of paper and a plurality of optical elements sense the light reflected from the sheet. The light reflected from the sheet is then digitized and compared with data corresponding to a reference note.

In one embodiment, the system includes a separate sensor head/illuminator for scanning a reference (master) note or another note on the uncut sheet which serves as a reference note. The light reflected therefrom is digitized so as to provide the information against which the data derived from scanning the test notes on the uncut sheet can be compared. Alternatively, the digitized information from a reference note can be stored in a digital memory for comparison with the real time data derived from scanning the uncut sheet.

The system includes an electronic processor for processing the digital signals from the sensors to achieve synchronization between the test and the reference notes. It also senses the differences between the two notes and produces an error signal when the differences exceed a selectable threshold. The electronic processor includes a feature detector to detect an identifiable feature, such as a corner, which is utilized to provide the tracker with initial conditions causing a zero tracking error at the time when the optics begins to scan the note. This allows the flaw detection to start immediately on detecting the corner thereby permitting inspection of the entire note surface. Once initialized, the tracker maintains synchronization between the digital signals received from the optics for the test note and the digital information from the optics (or memory data) for the reference note.

The flaw detector is operational when the tracker indicates that the scanning of the test note and the reference note is synchronized. The flaw detector samples the reflectance from the reference and the test note over corresponding areas. If the printing on the two notes is the same, the reflectance over each incremental area will be substantially the same. If there is a flaw, on the other hand, the two reflectances will not be substantially the same and the flaw detector then determines whether the difference between the two reflectance exceeds a threshold value. When the threshold is exceeded, an indication is transmitted to an external computer that a flaw has been detected. The external computer then tallies the number of the flaws over the entire surface of the test note. Should the computer sum exceed a second threshold, this fact is made available to the system operator so that the flawed note can be destroyed.

BRIEF DESCRIPTION OF THE DRAWINGS

The foregoing objectives, advantages and features of the invention are described below in greater detail in connection with the drawings wherein.

Figure 3B:
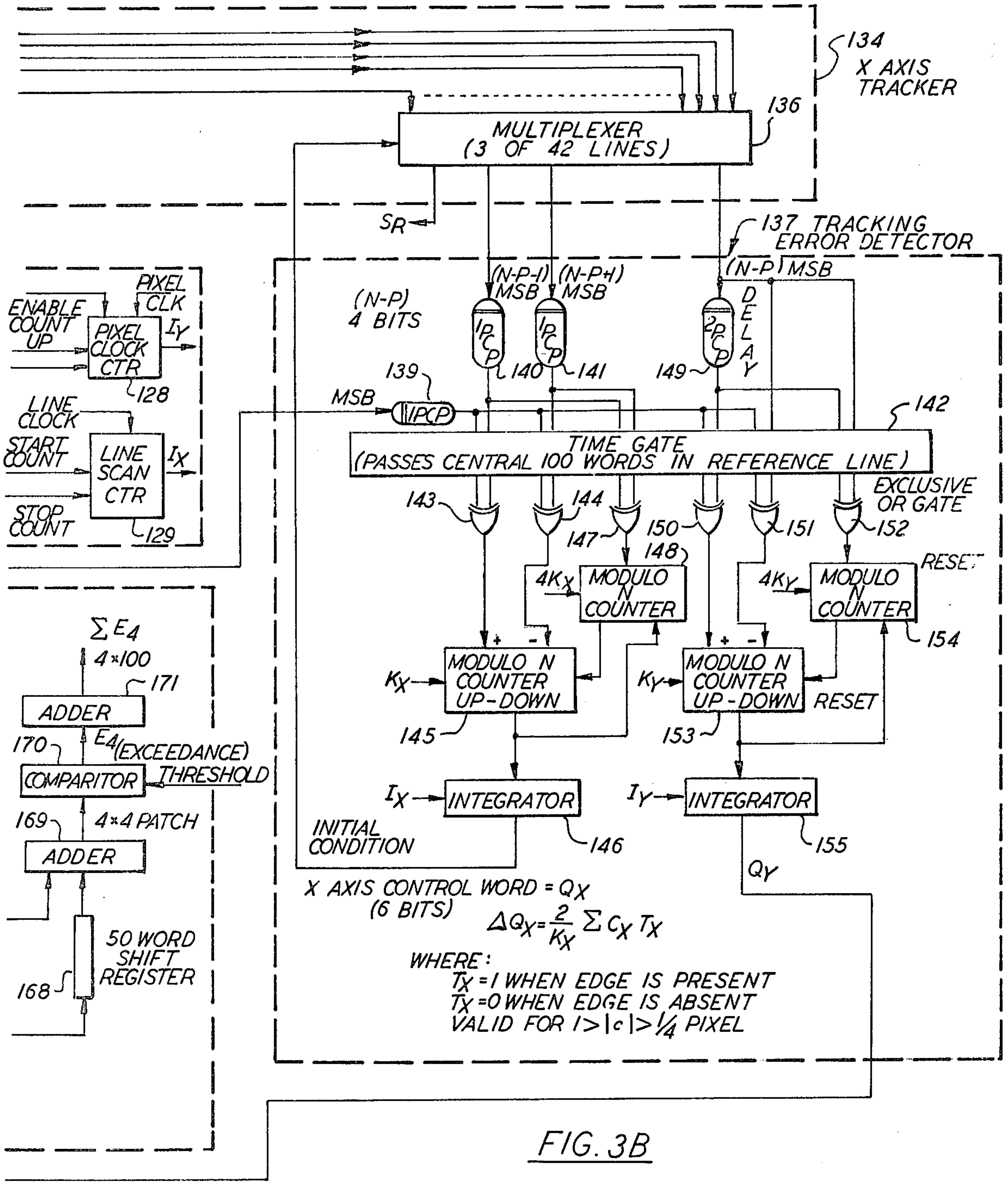
Figure 3:
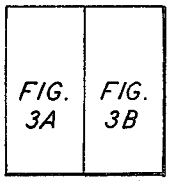
Figure 3A:
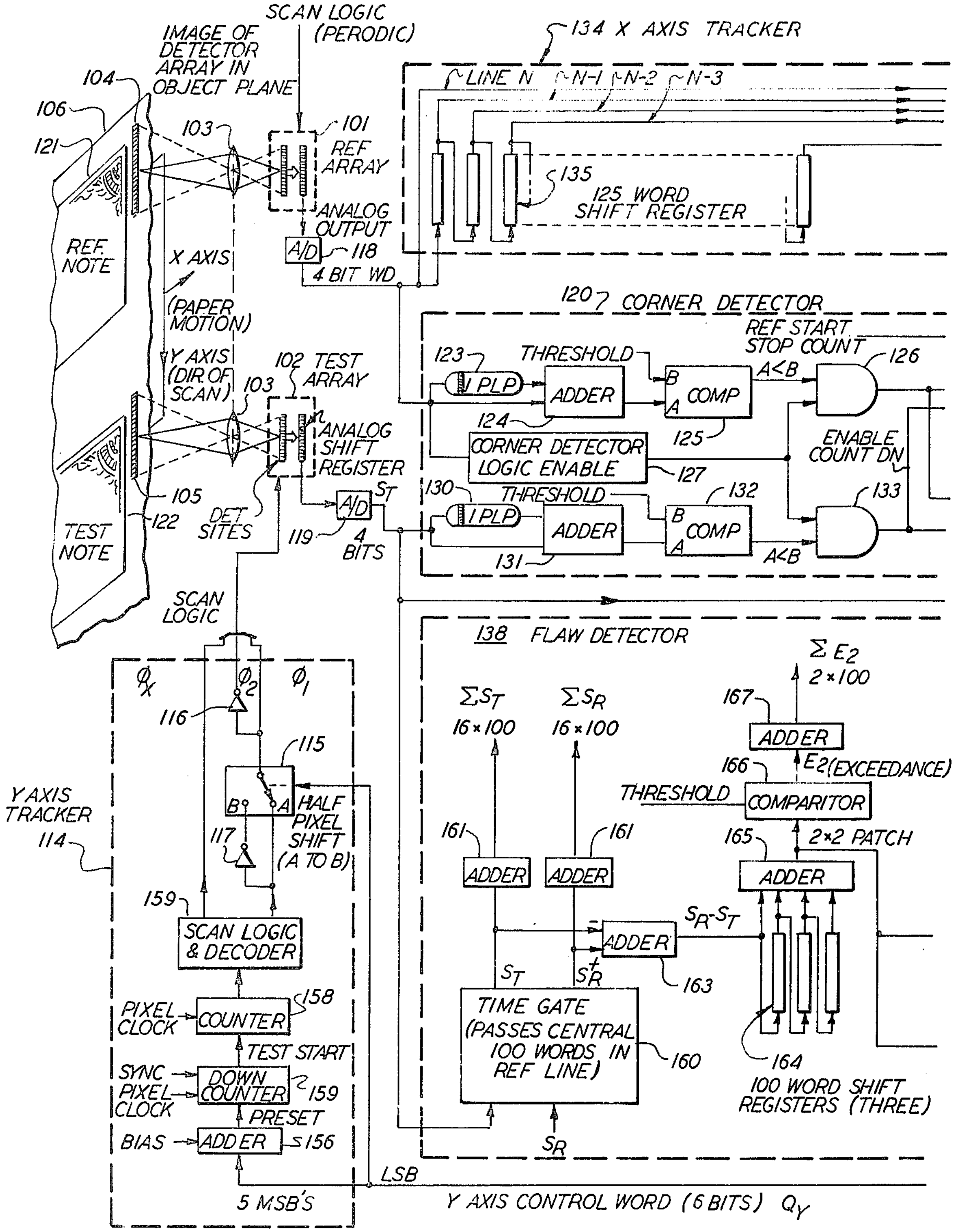
Figure 4:
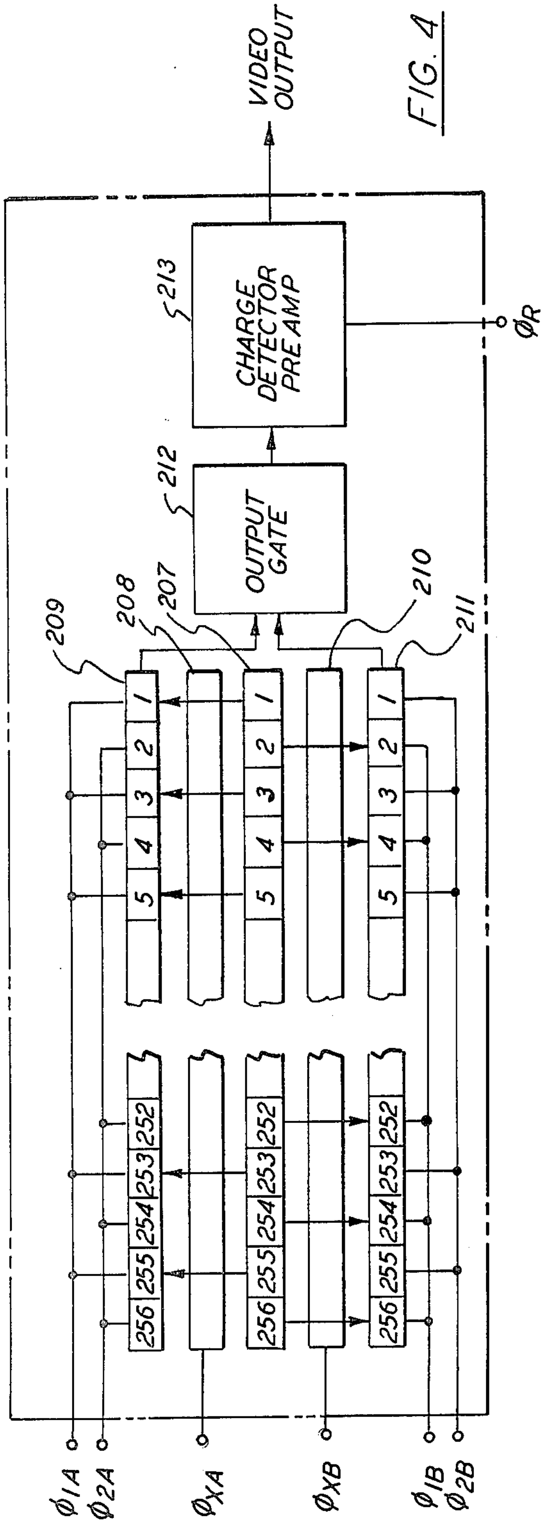
Figure 5:
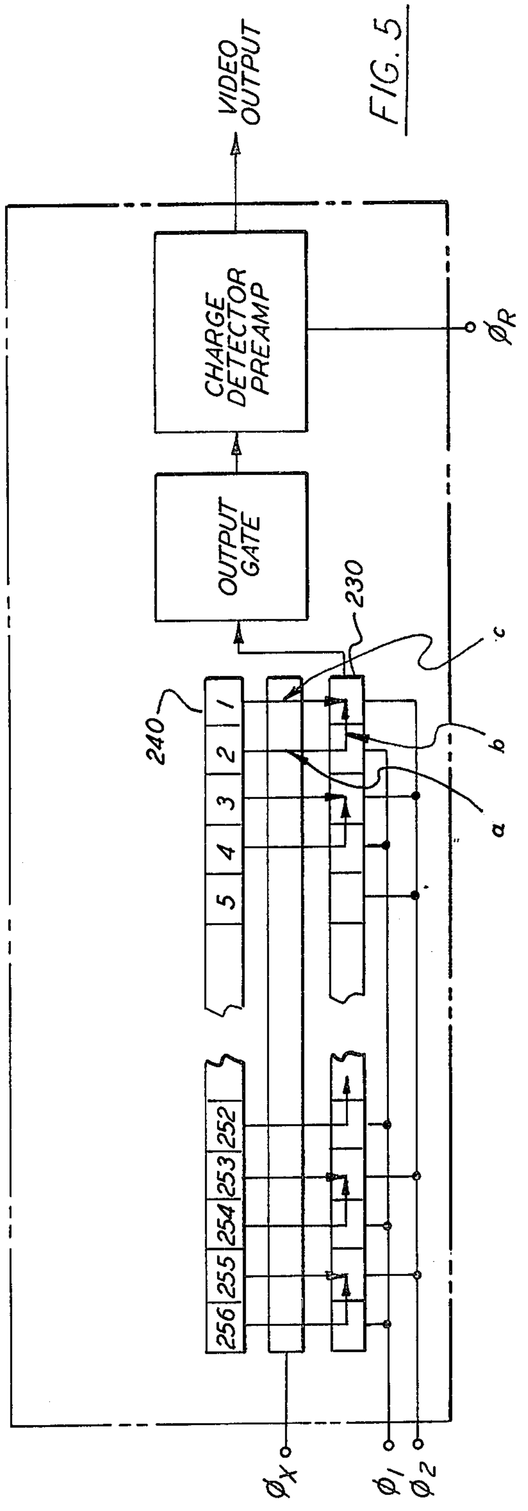
Figure 6:
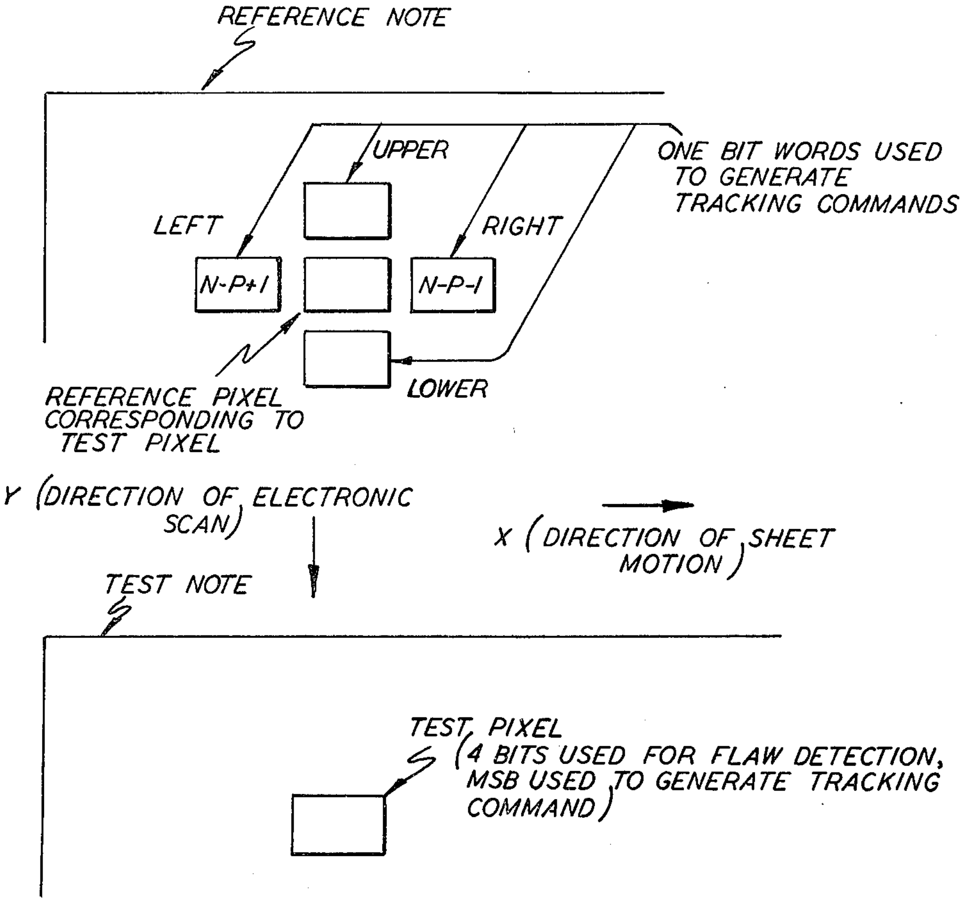
Figure 7:
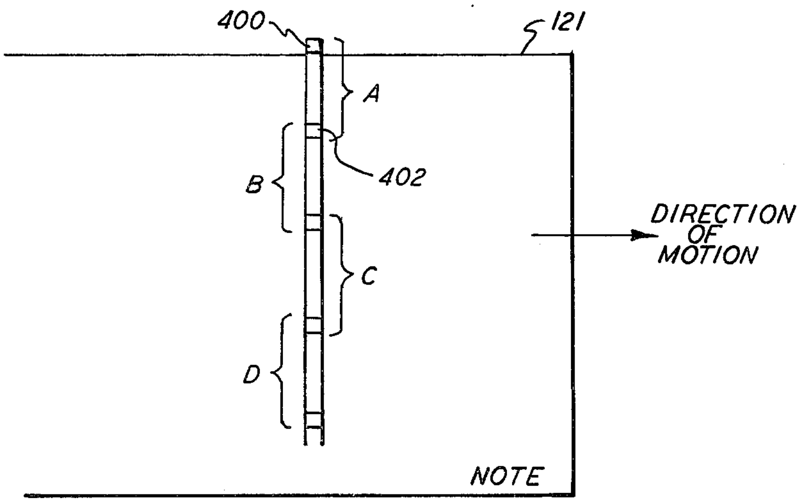
Figure 8A:
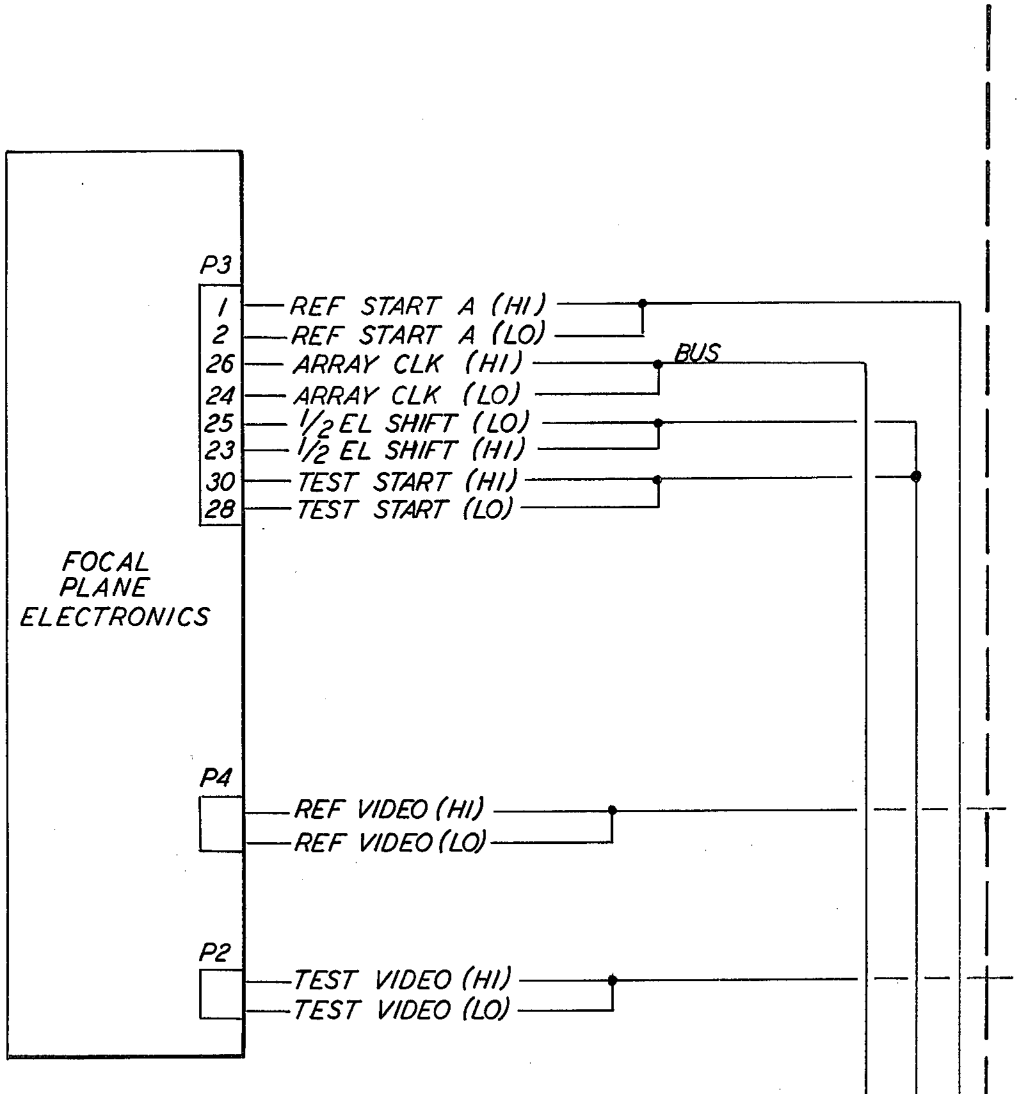
Figure 8:
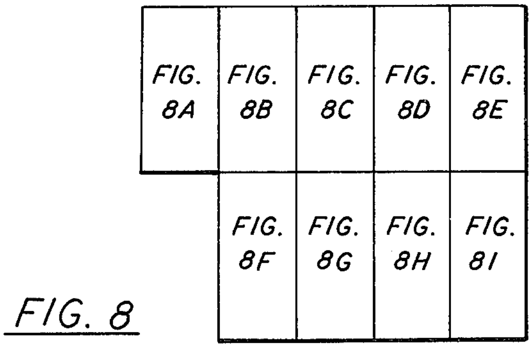
Figure 8B:
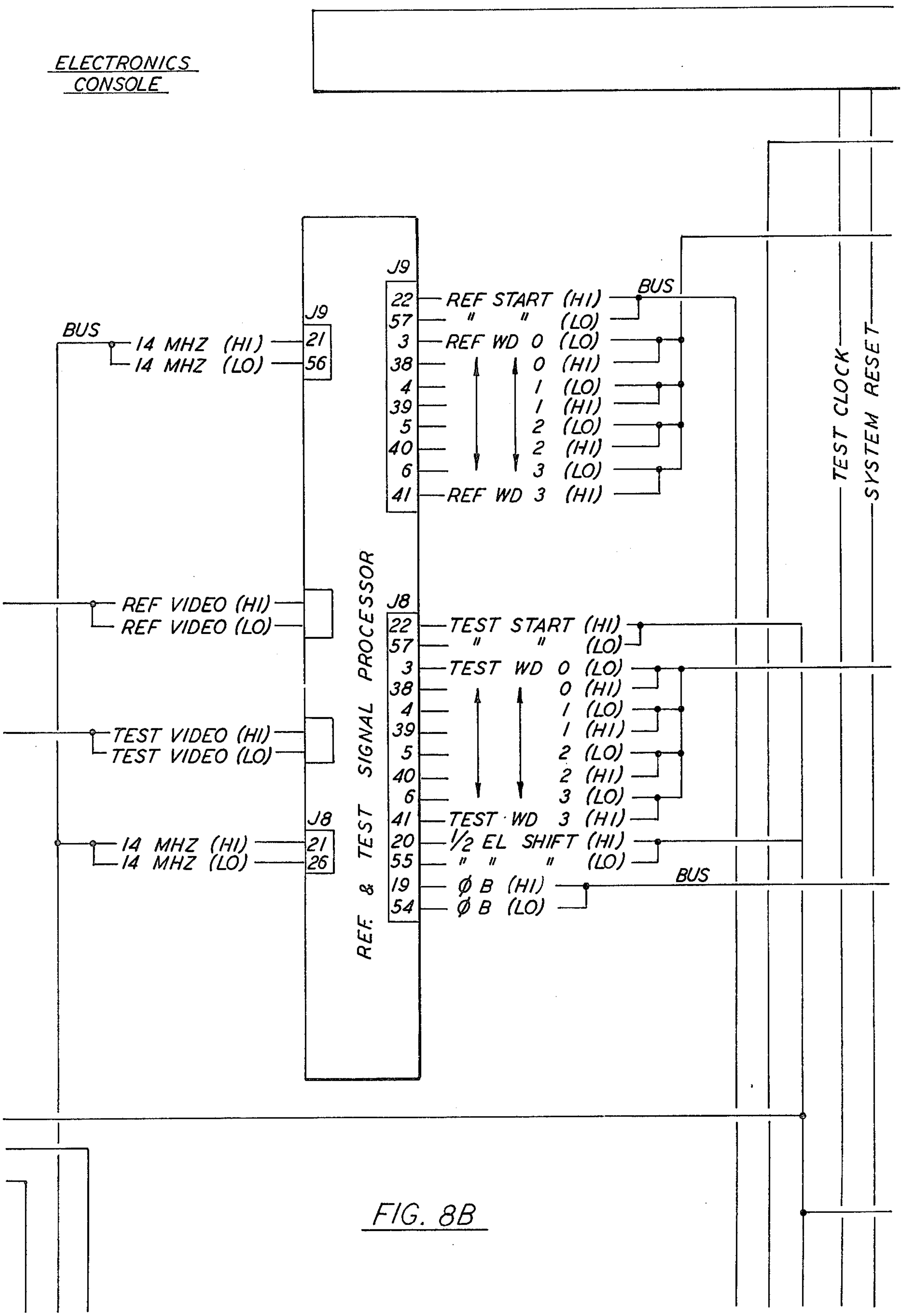
Figure 8C:
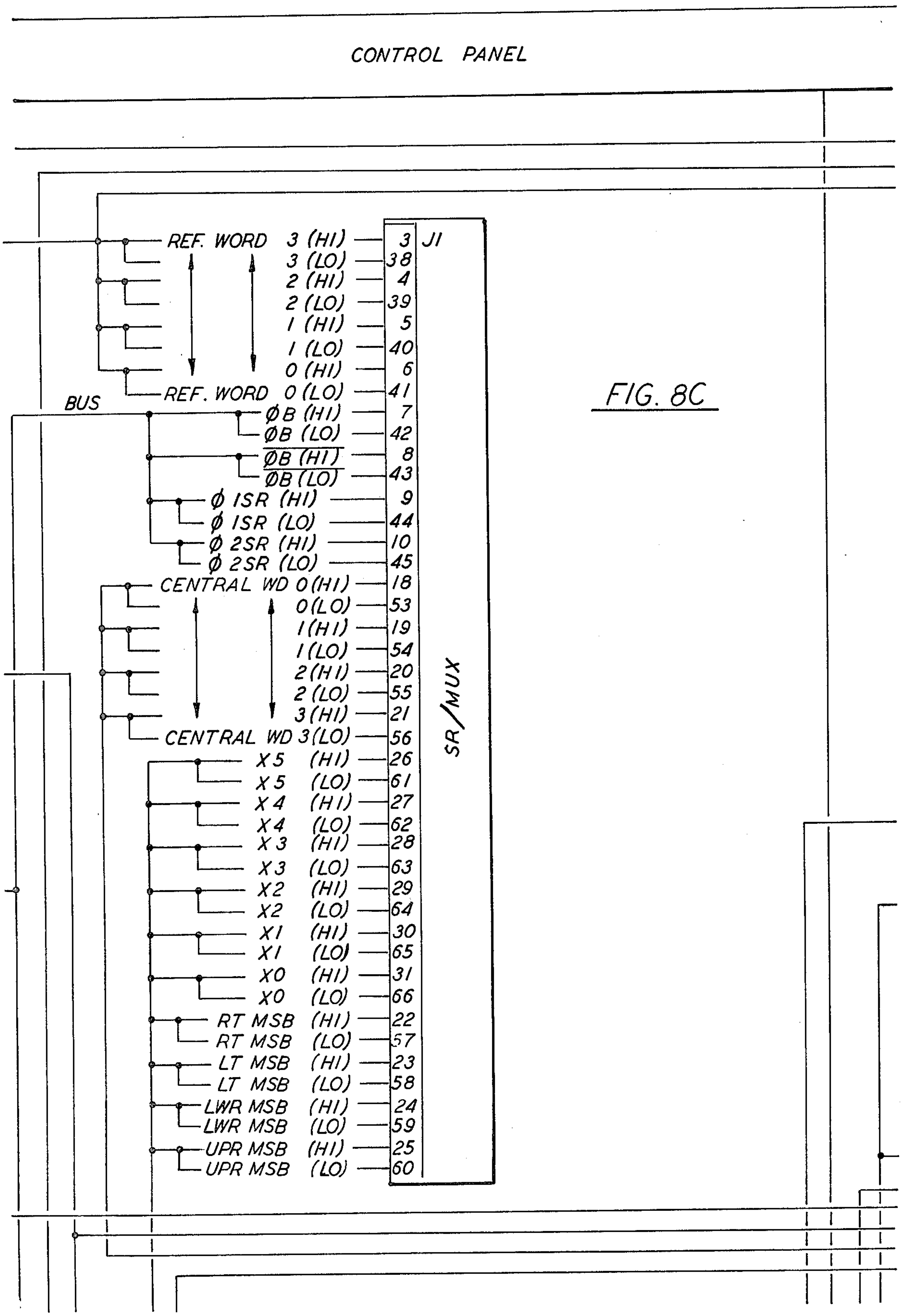
Figure 8E:
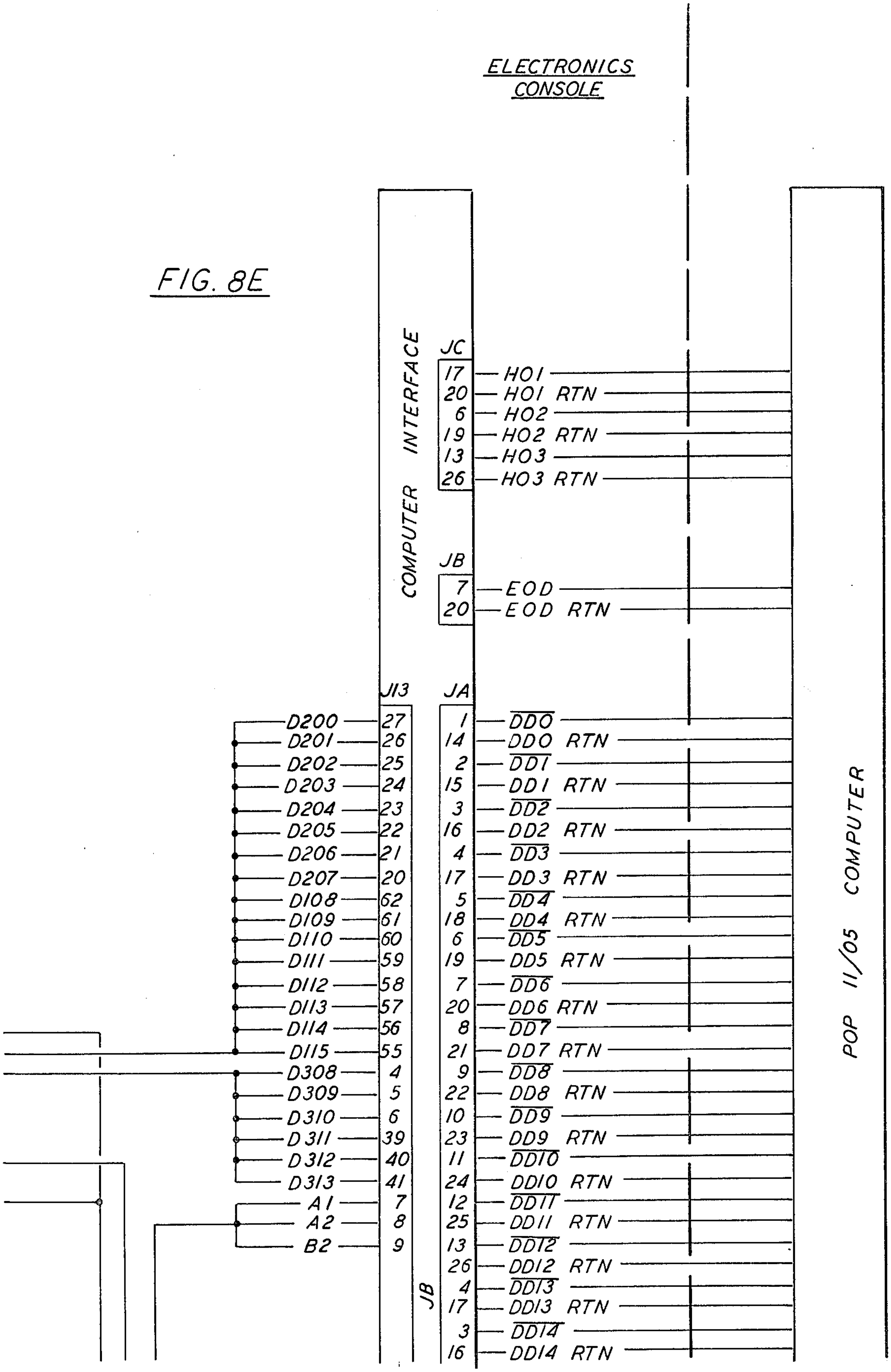
Figure 8F:
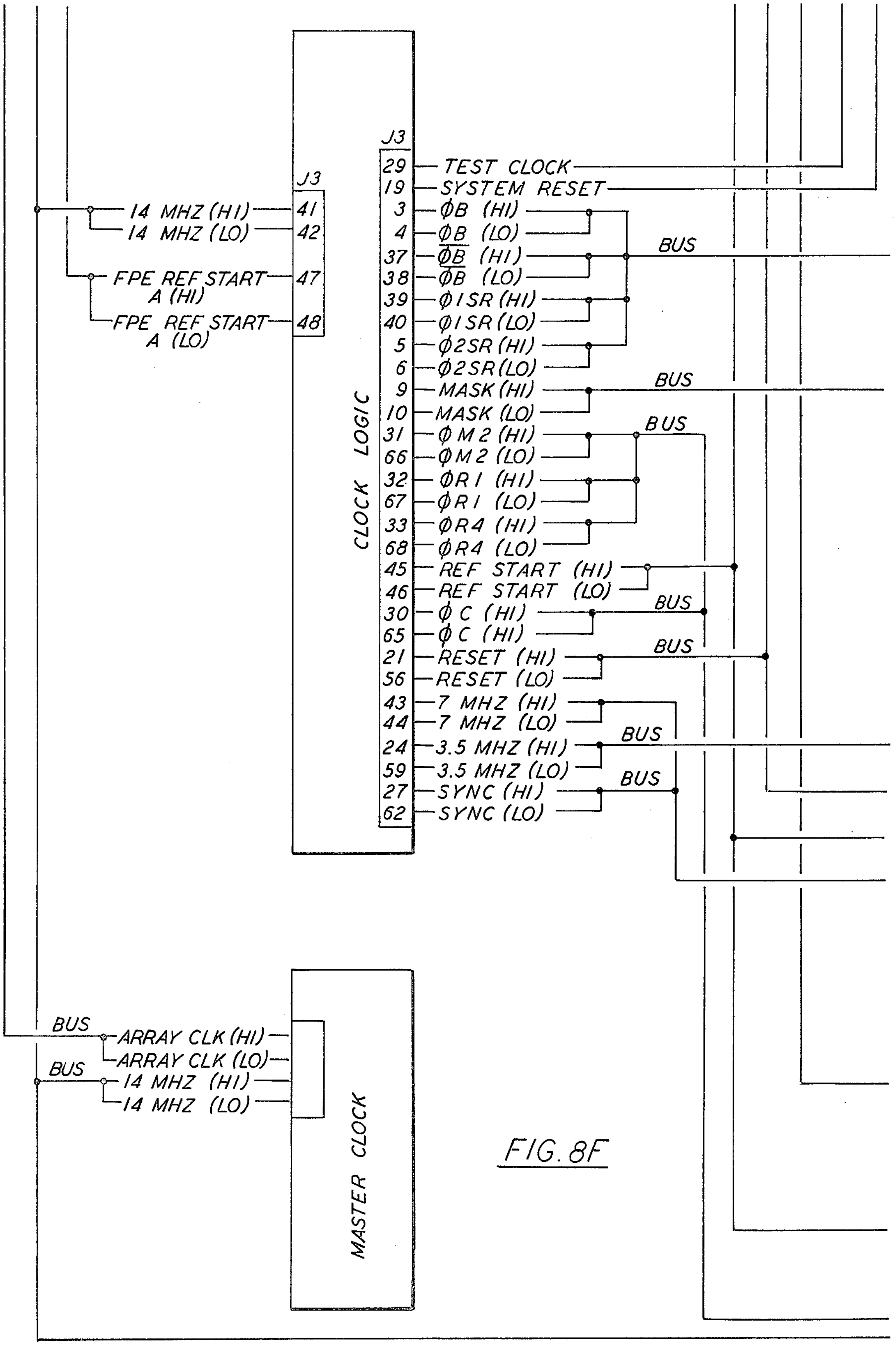
Figure 8G:
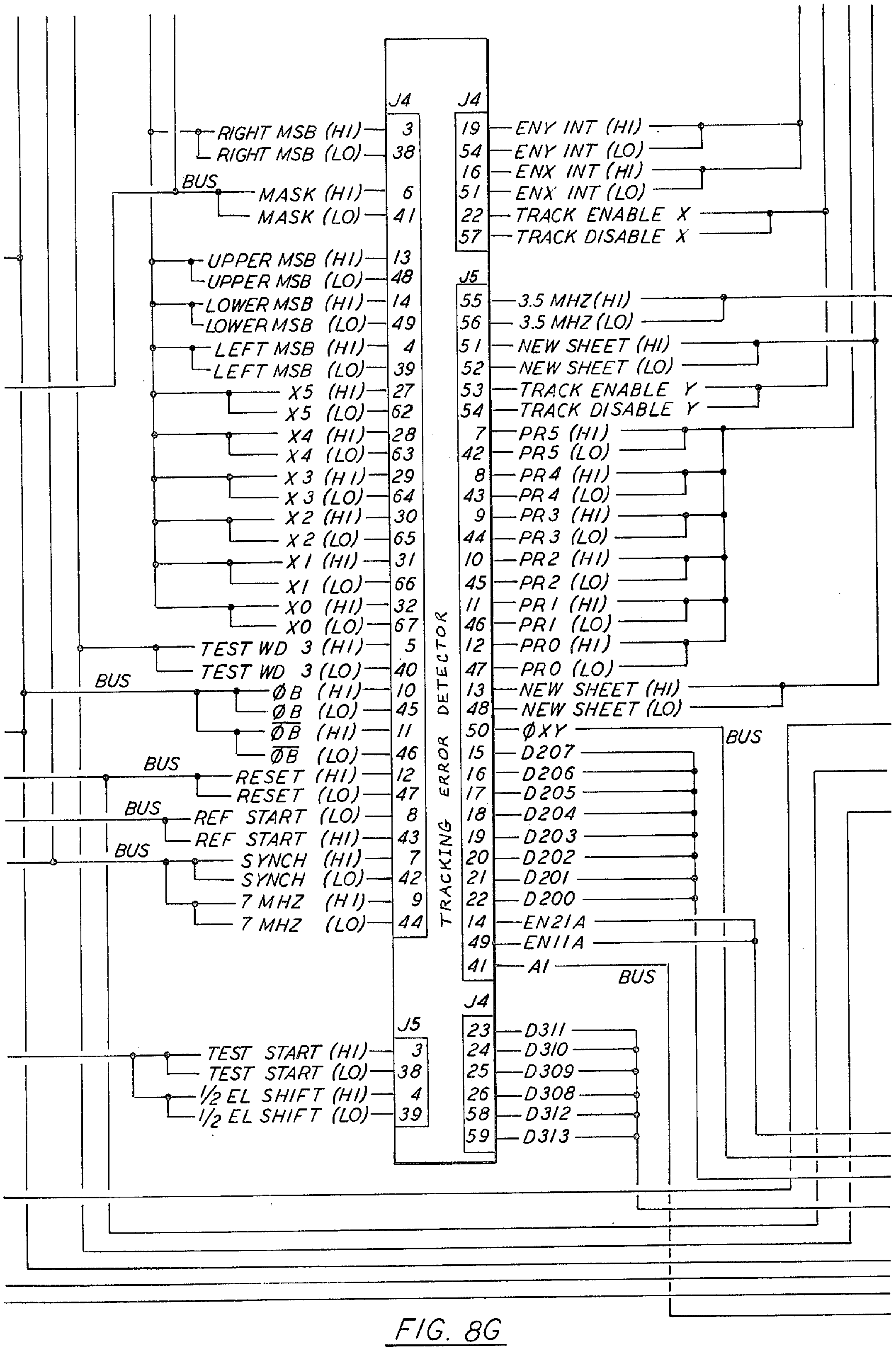
Figure 8H:
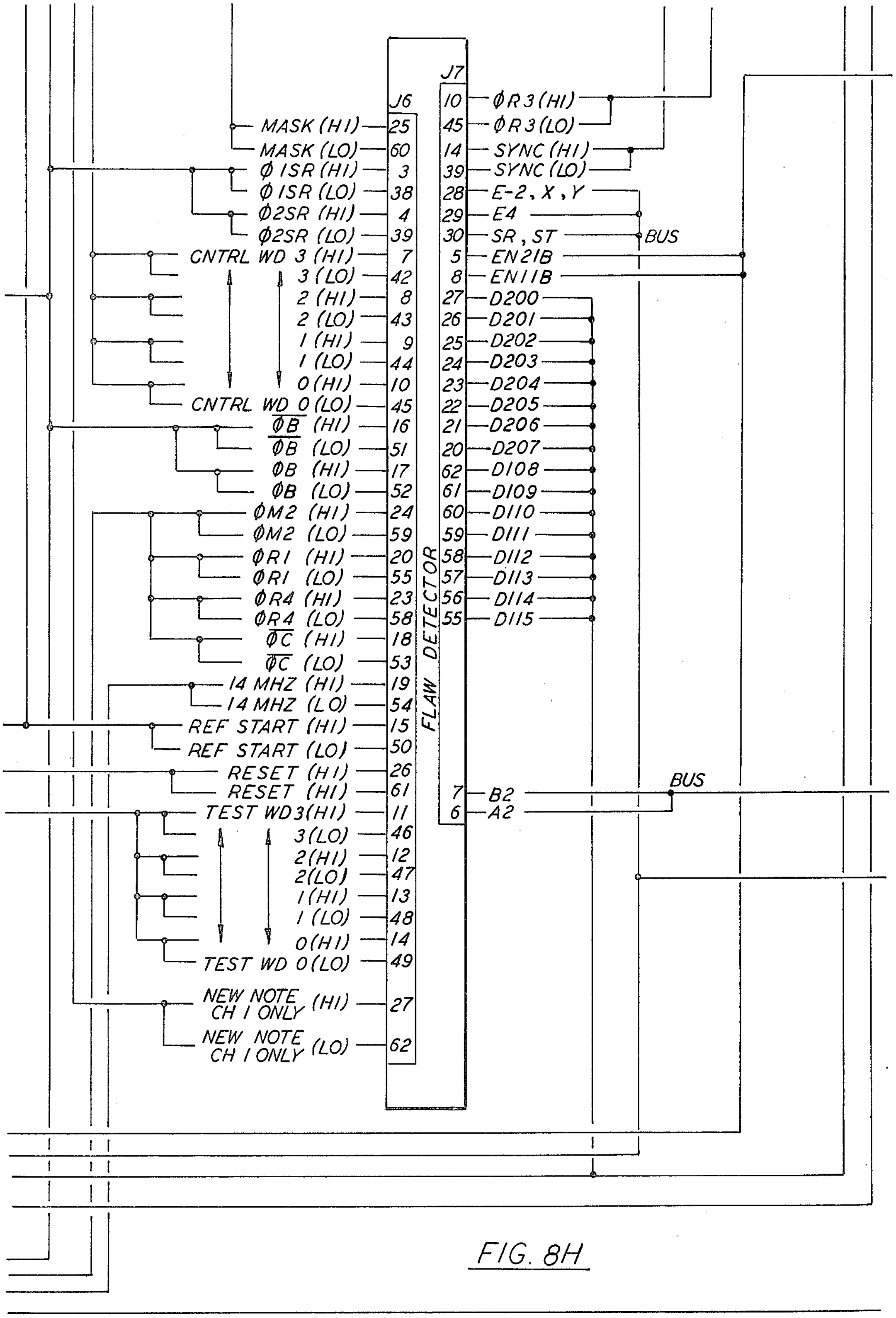
Figure 8I:
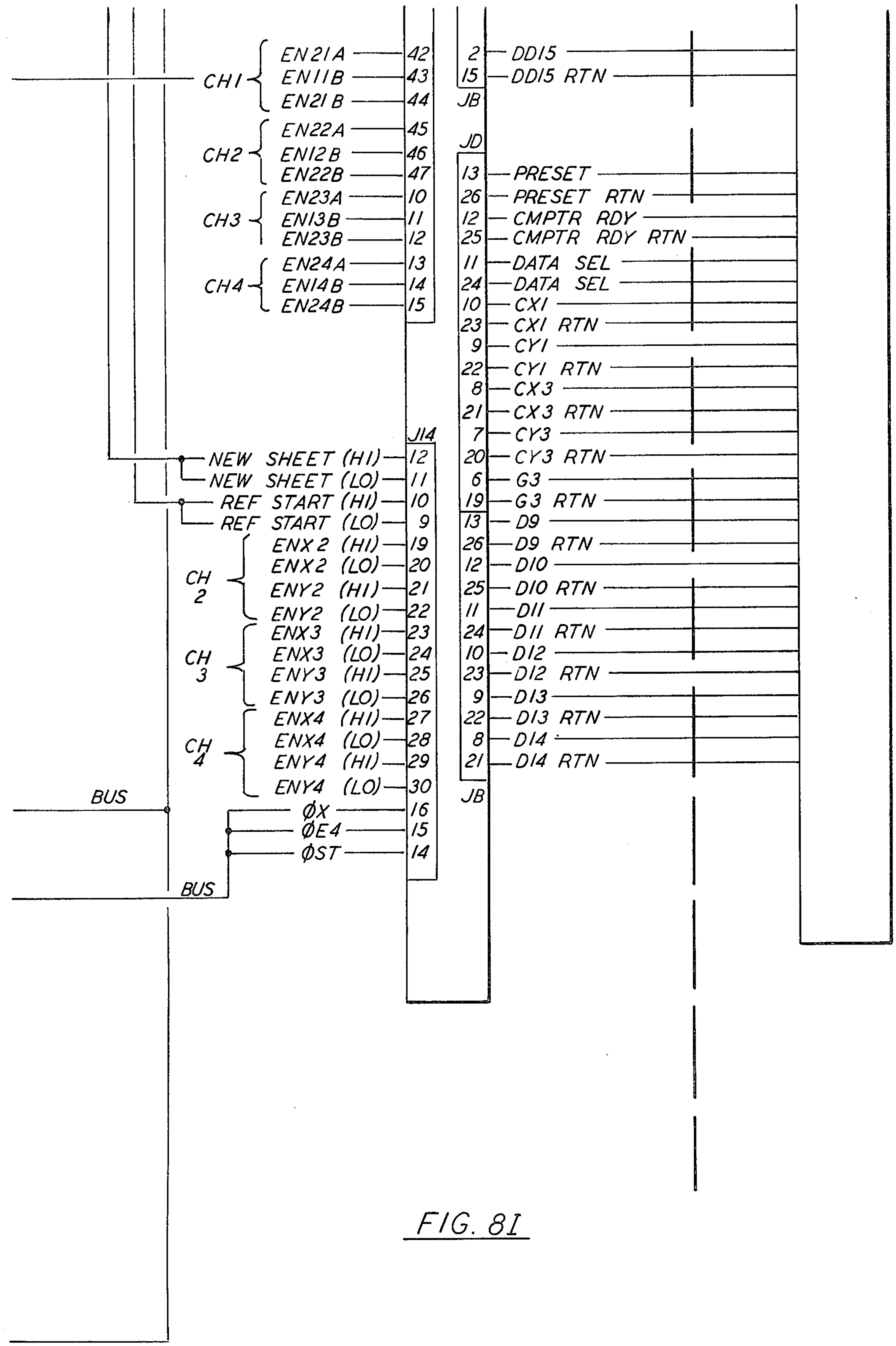
Figures 9, 9A:
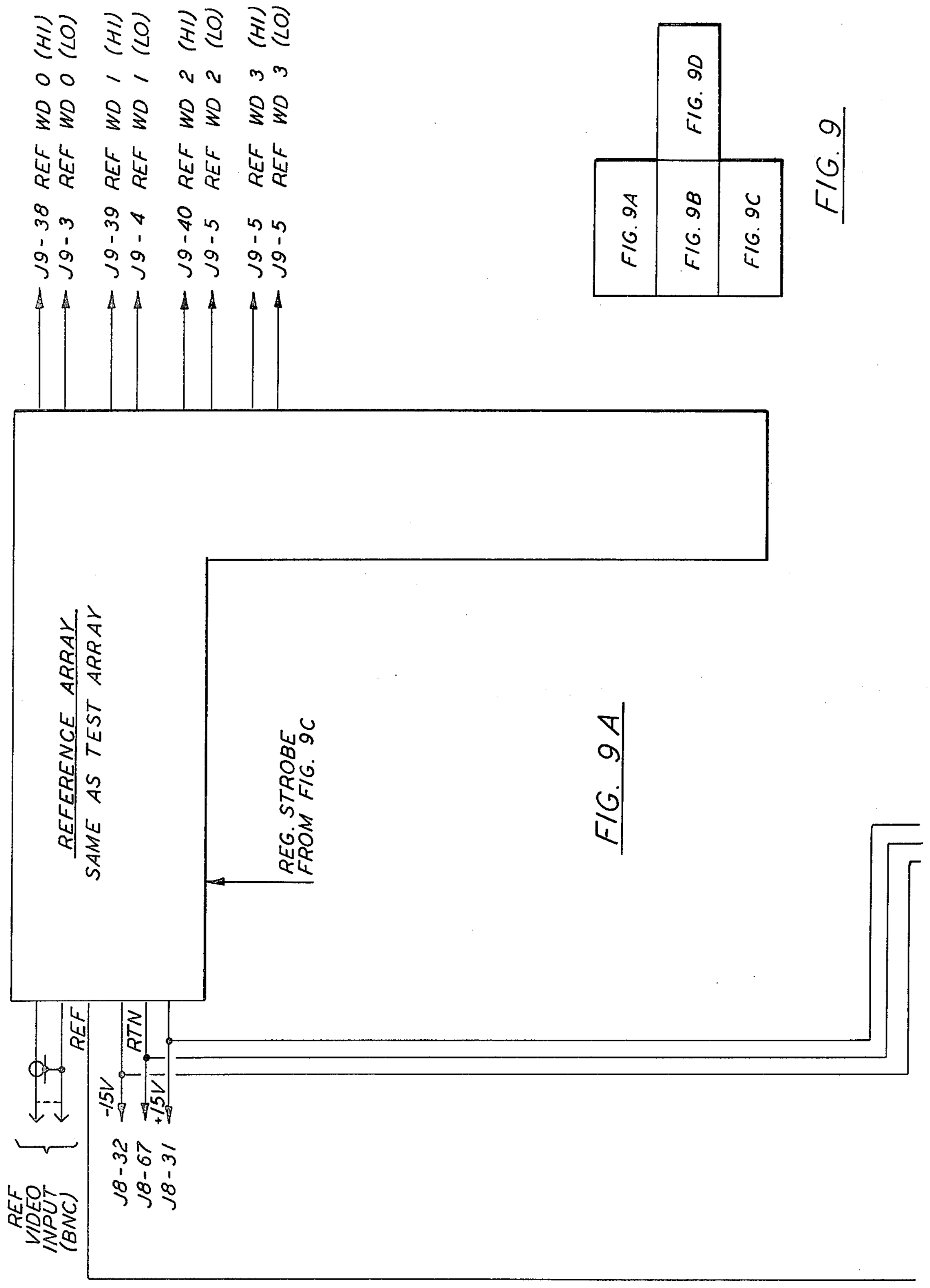
Figure 9B:
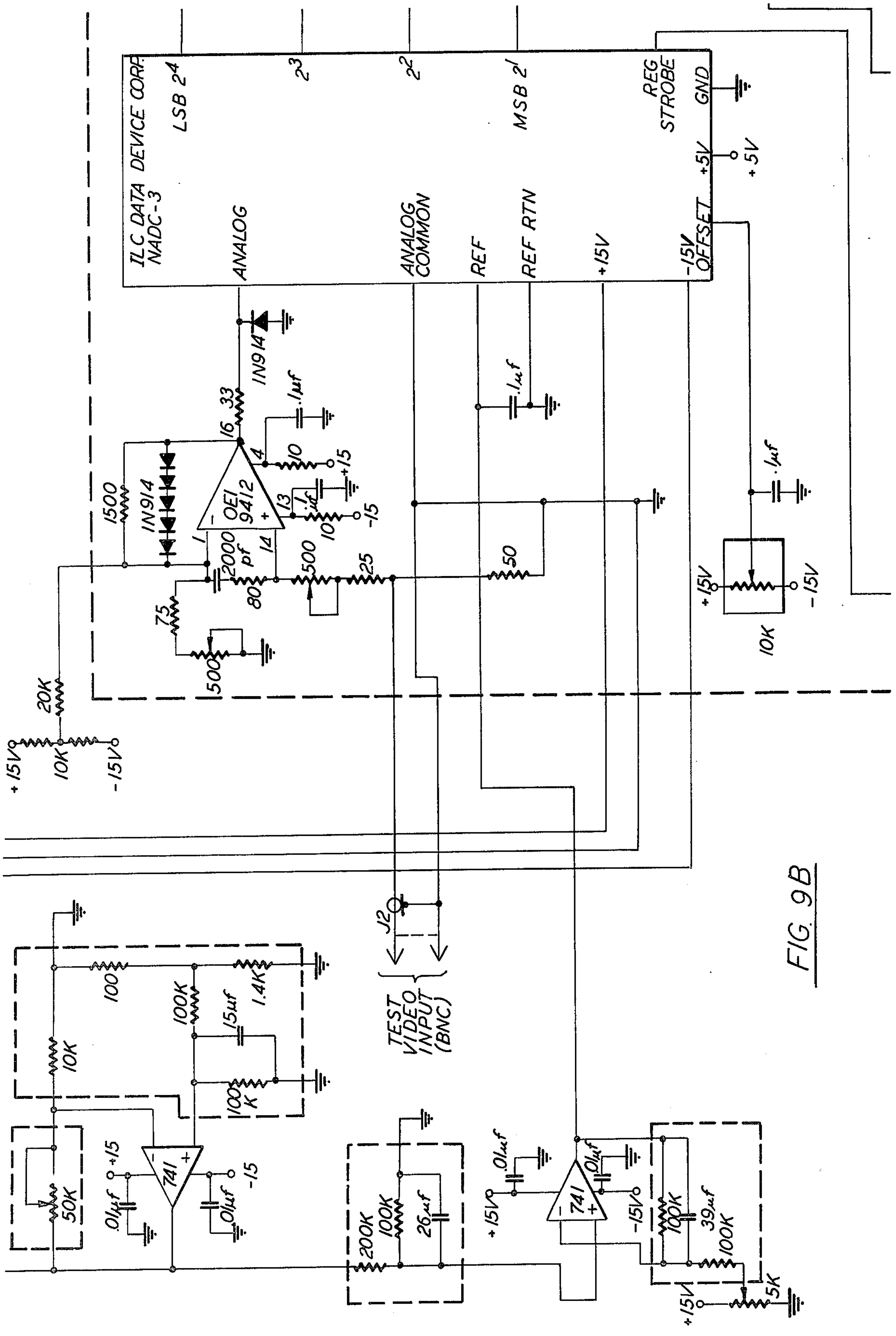
Figure 9C:
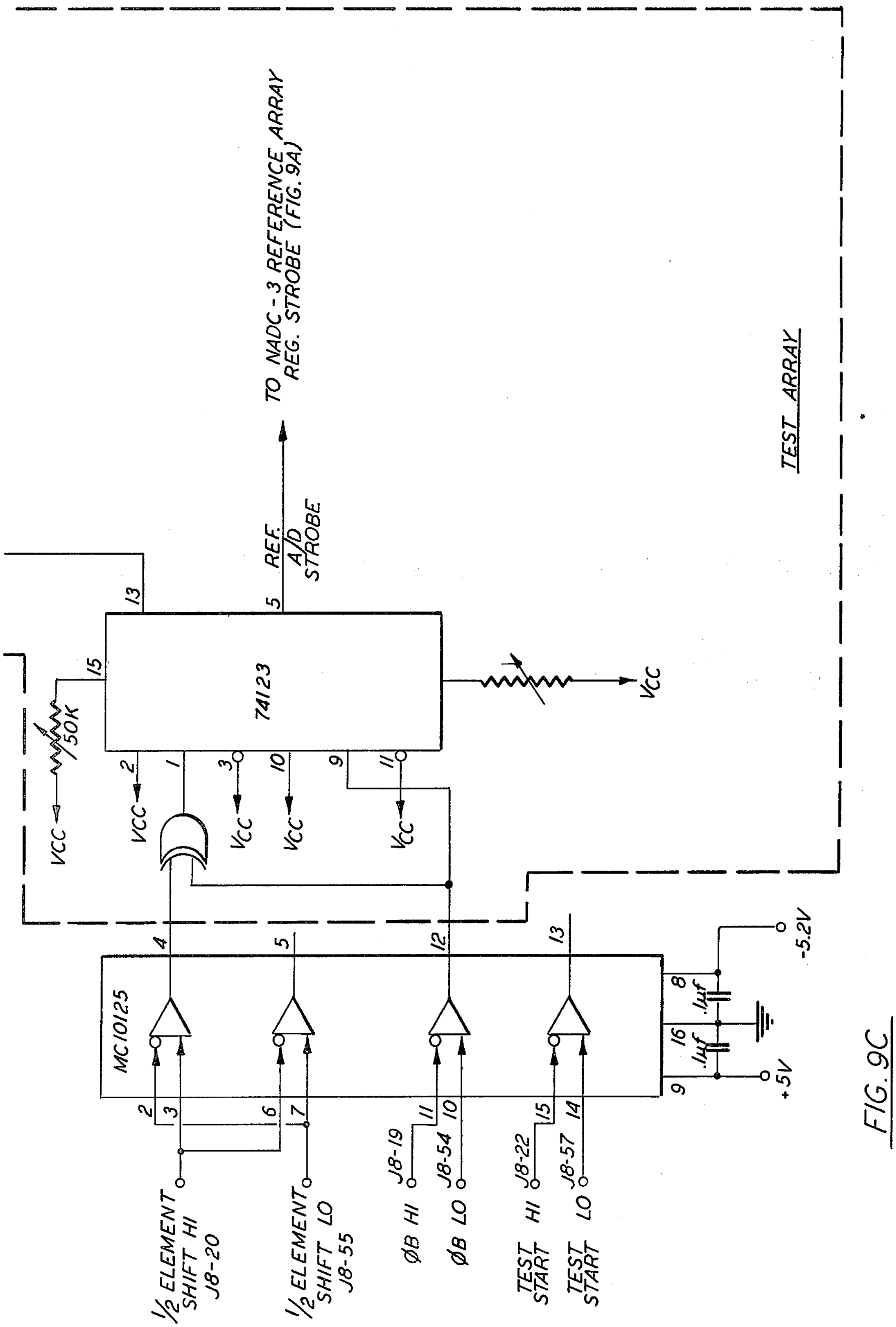
Figure 9D:
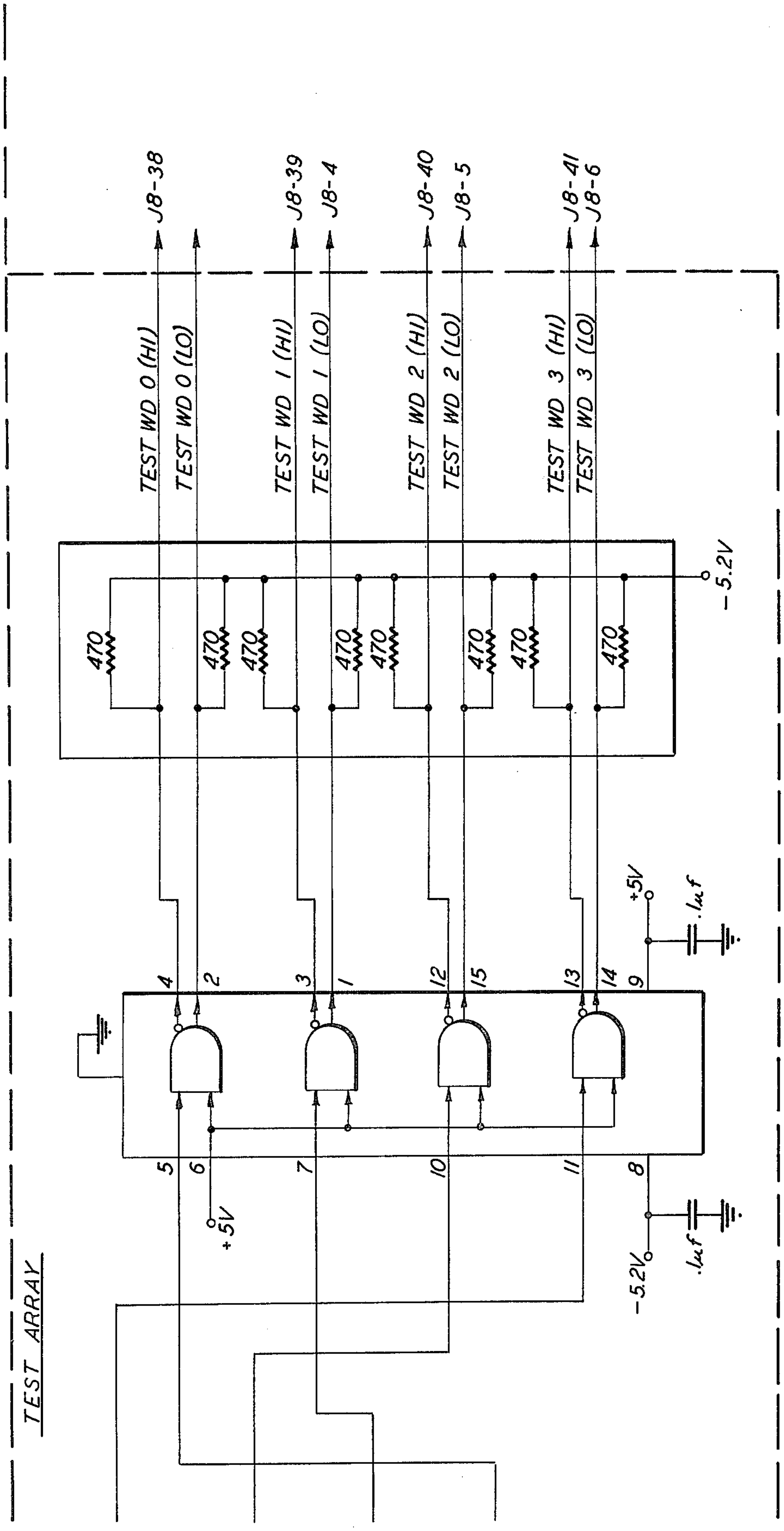
Figures 10, 10A:
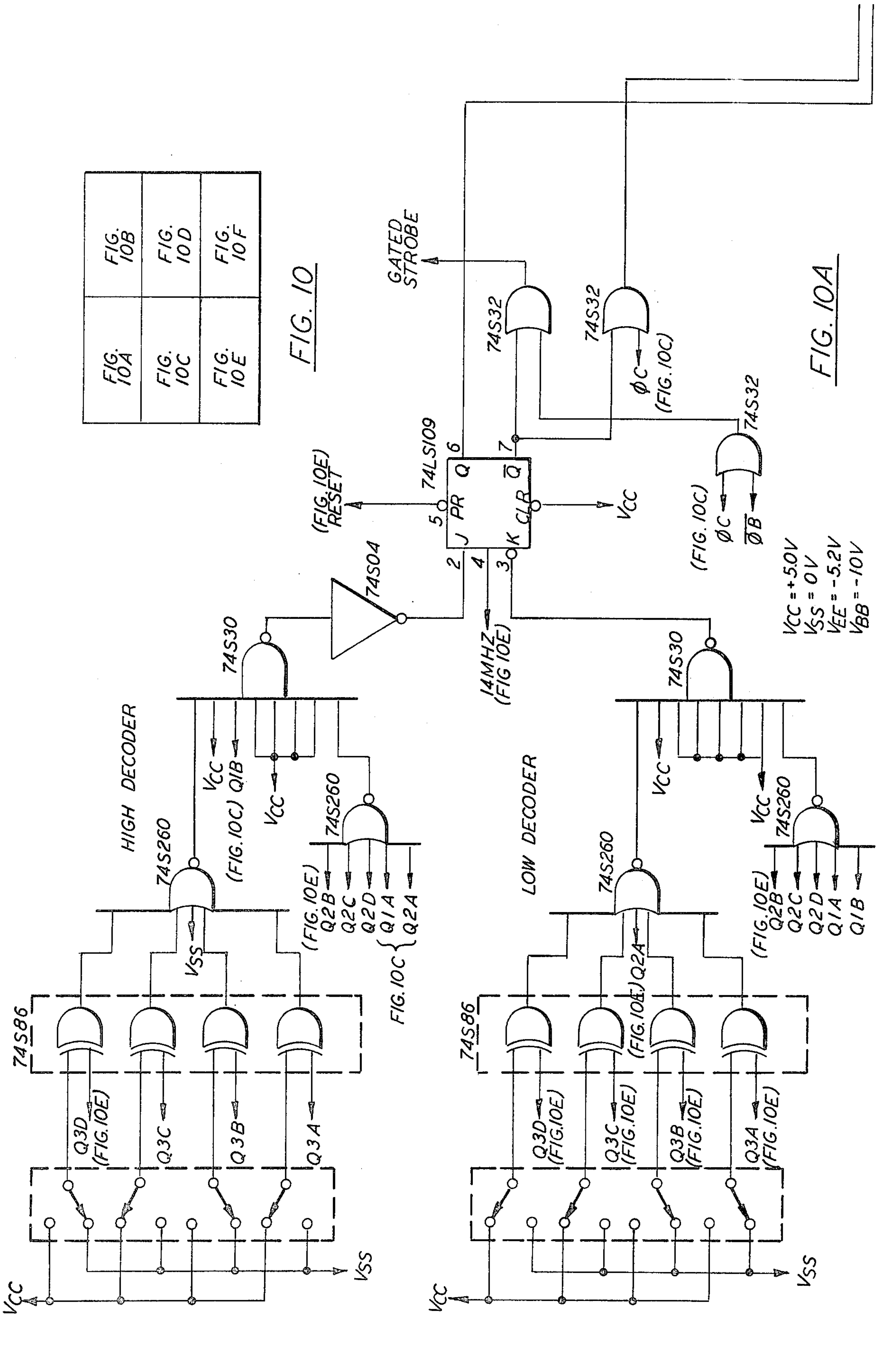
Figure 10B:
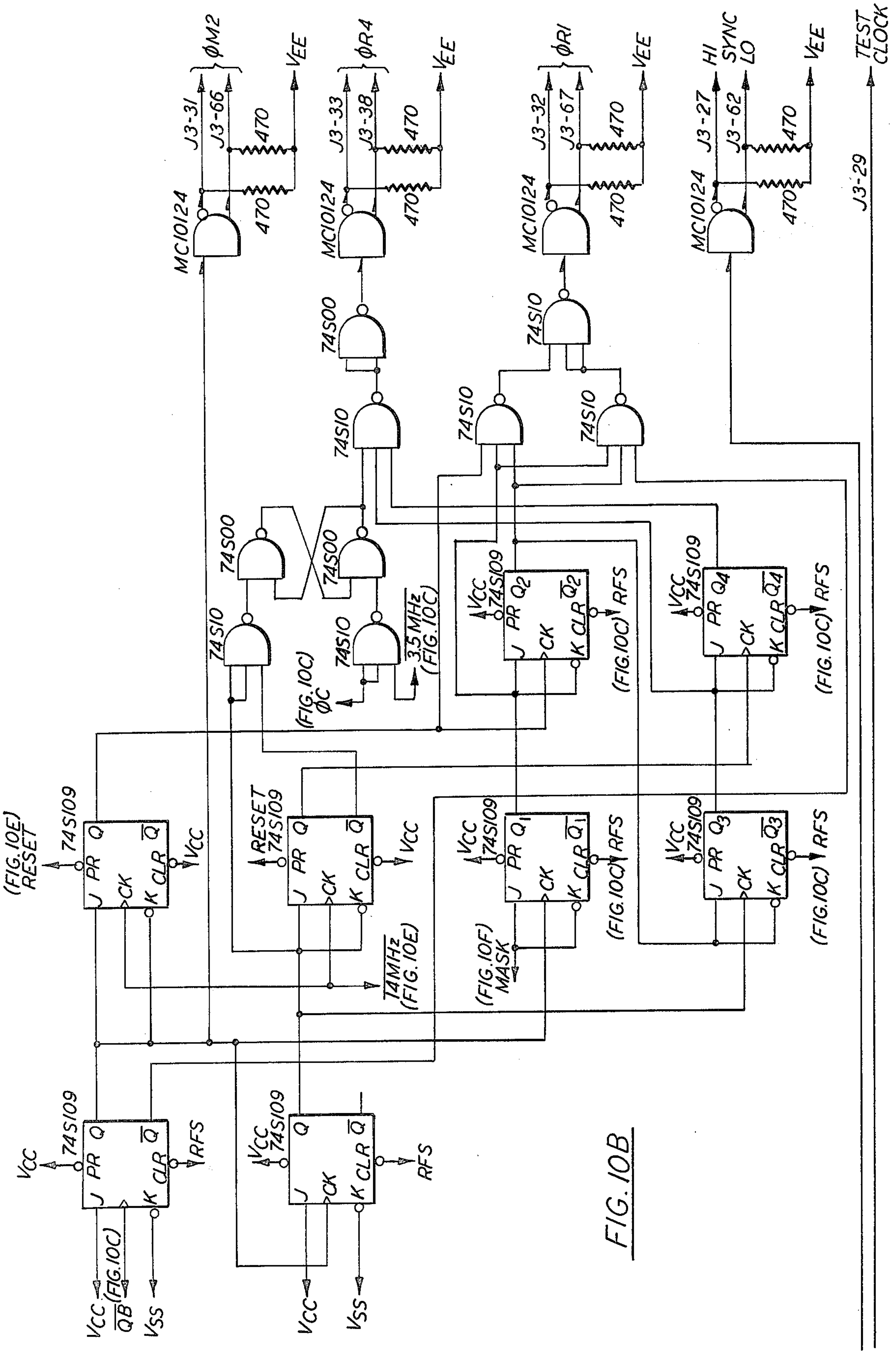
Figure 10C:
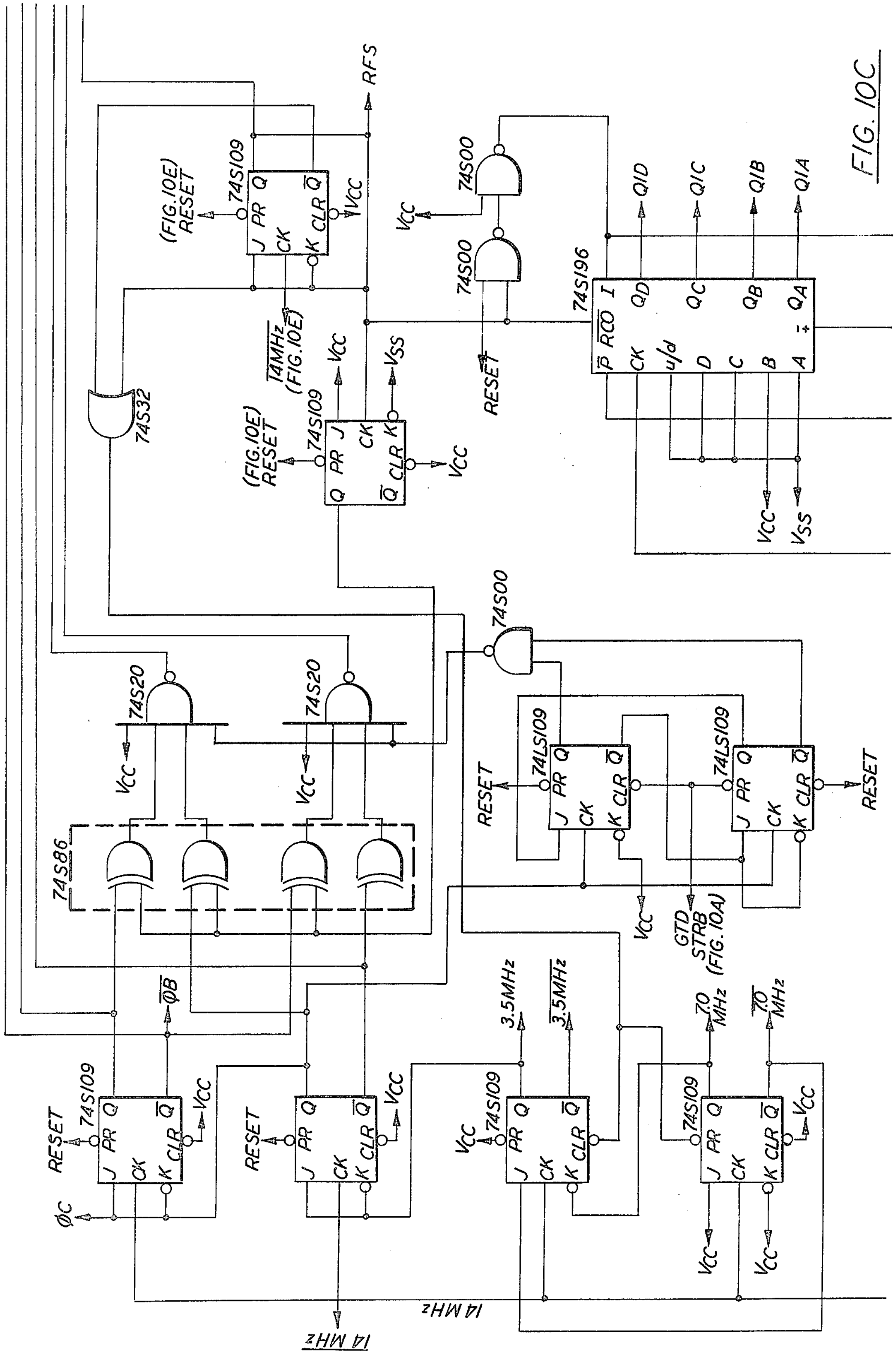
Figure 10D:
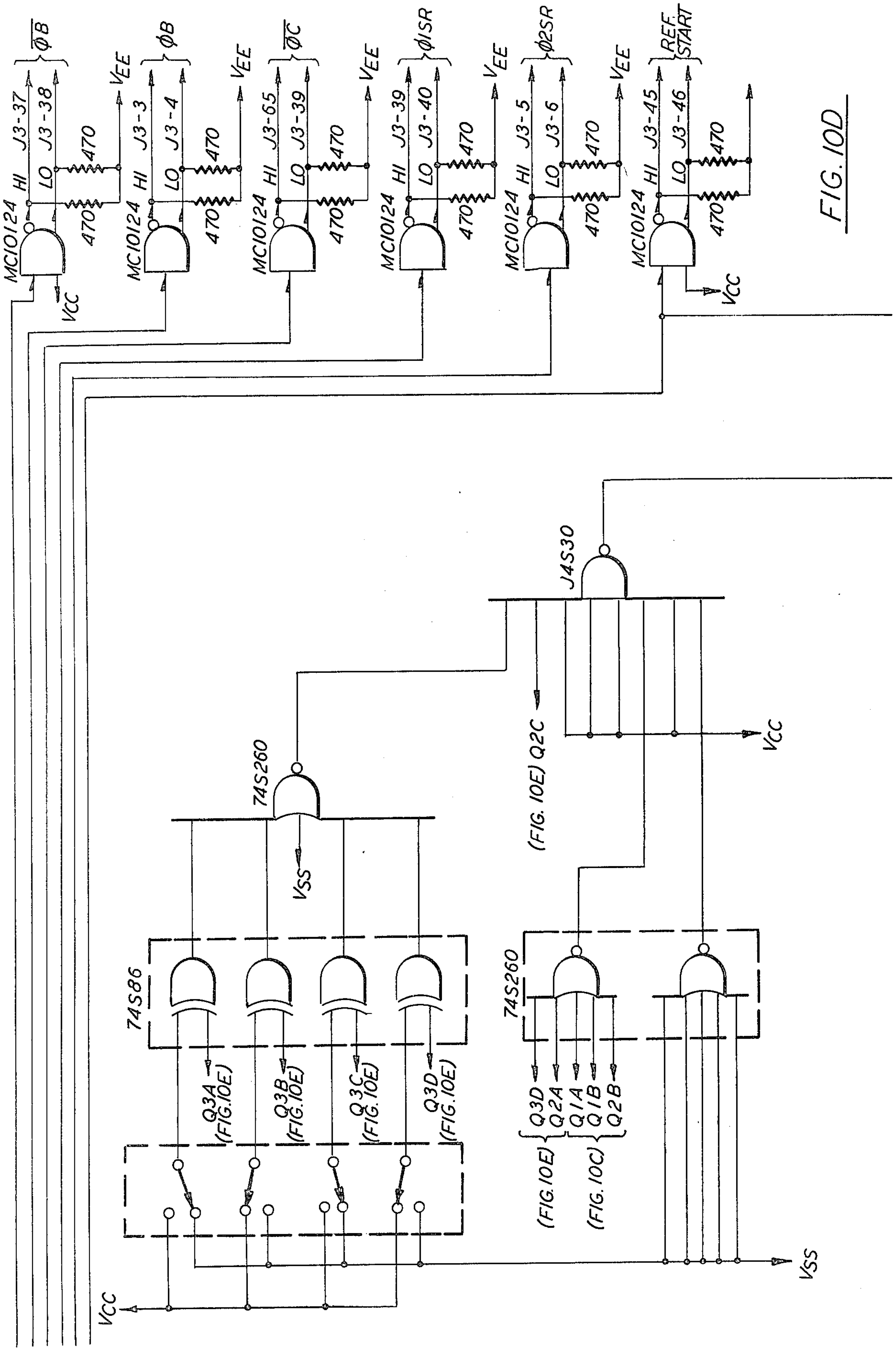
Figure 10E:
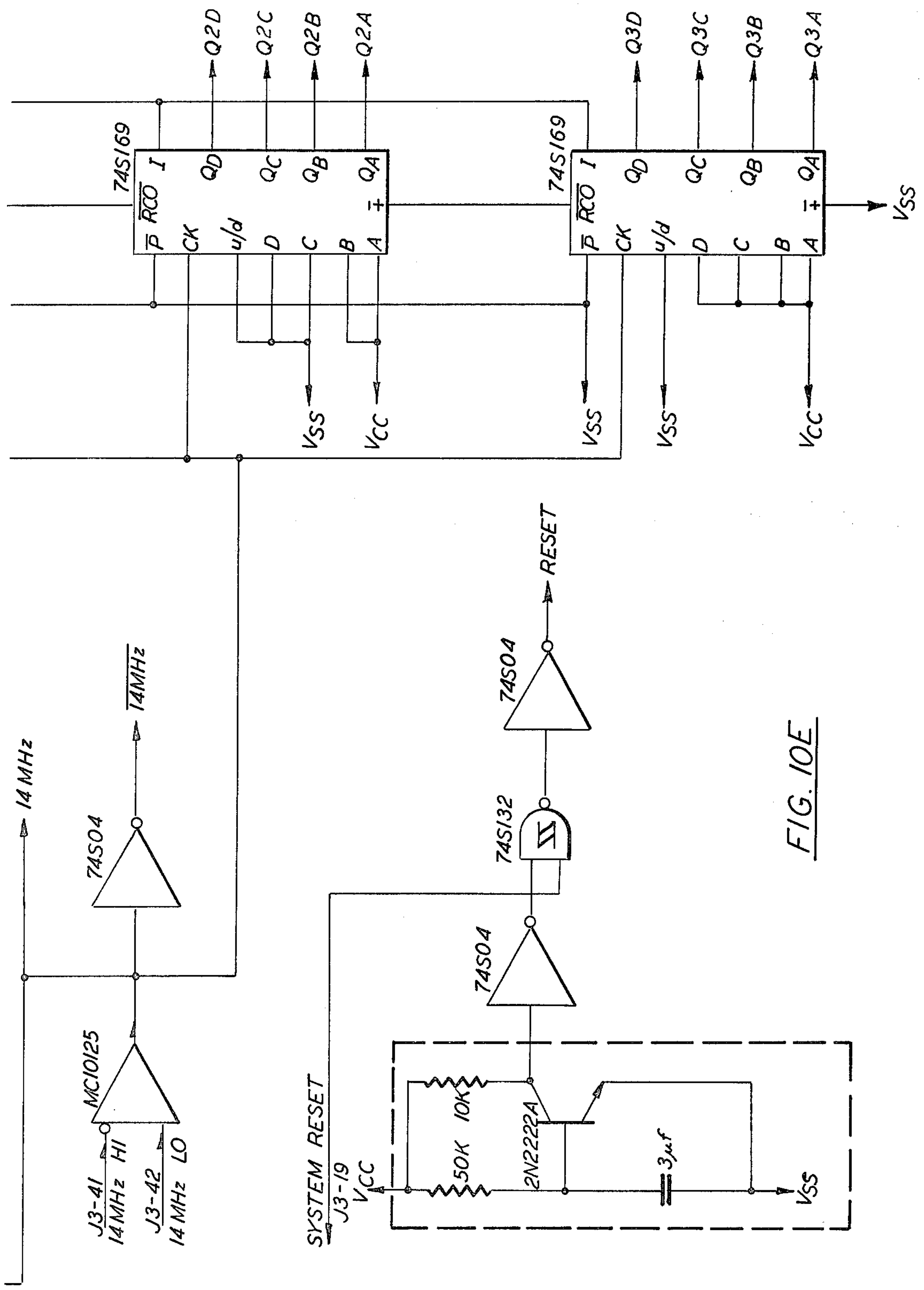
Figure 10F:
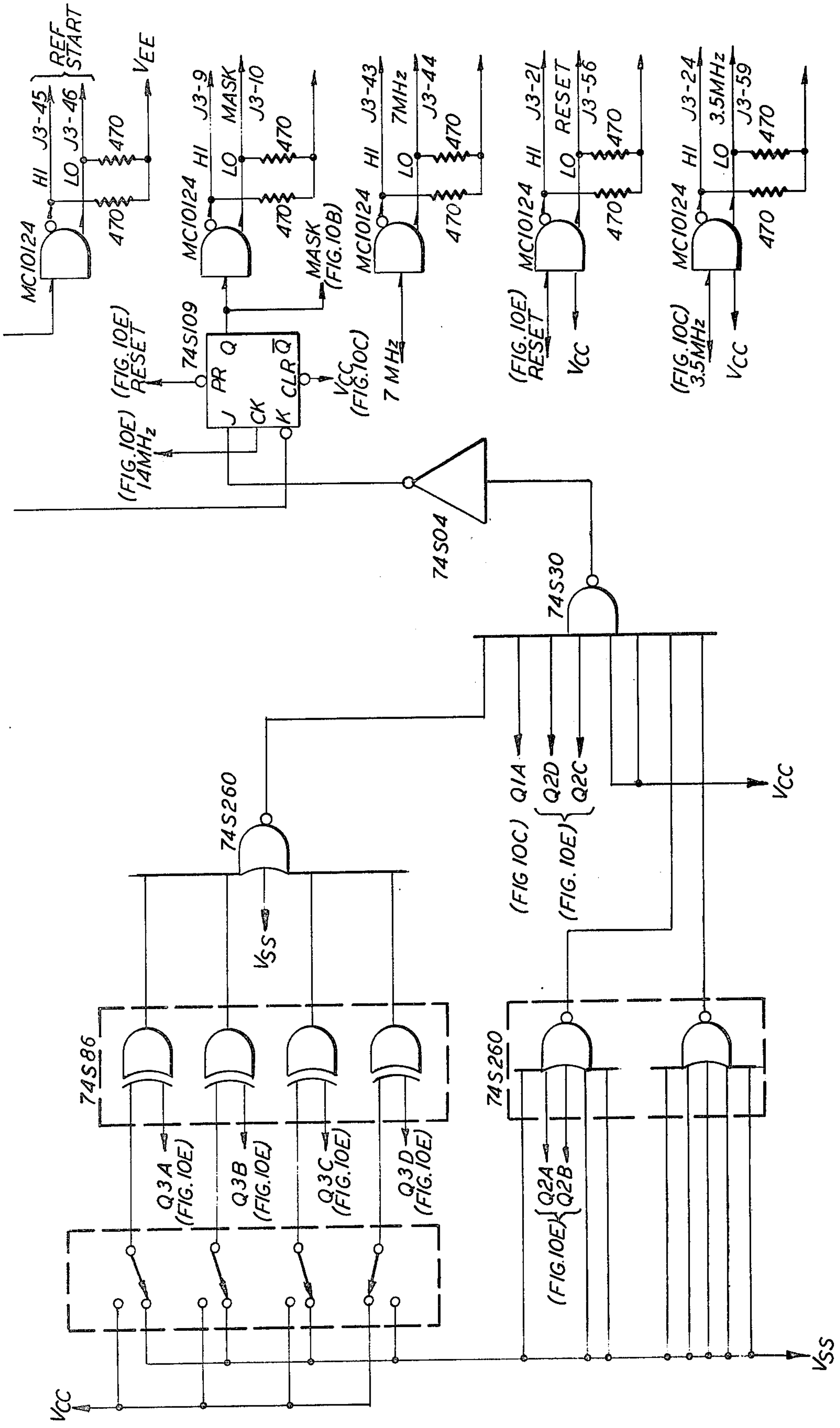
Figure 11C:
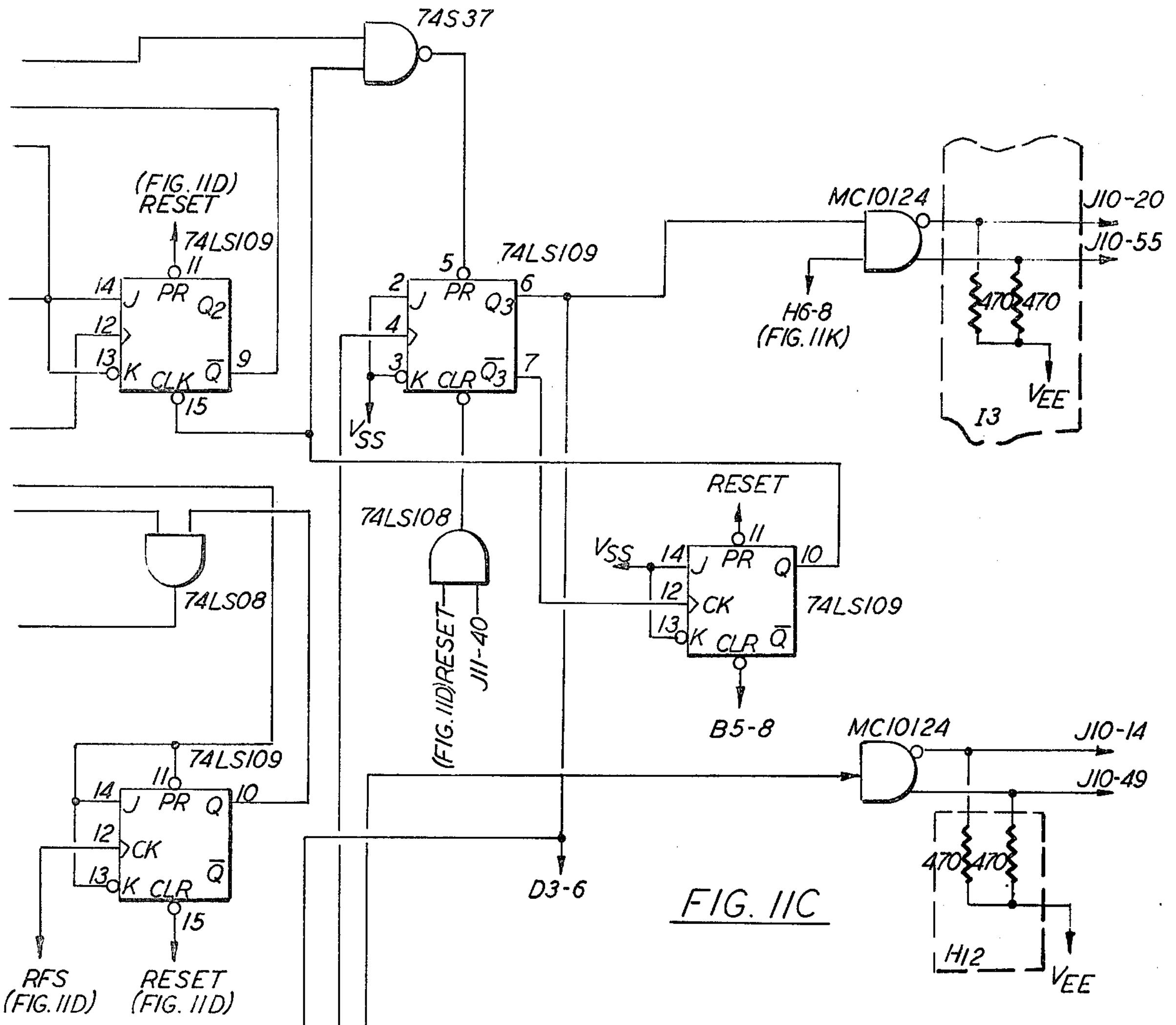
Figure 11:
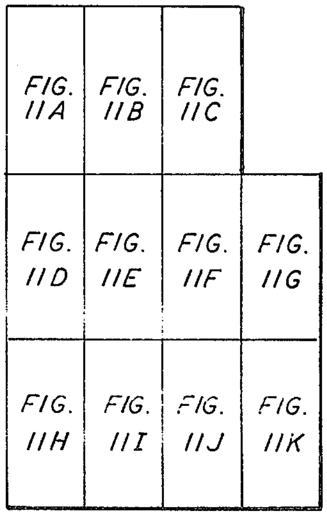
Figure 11A:
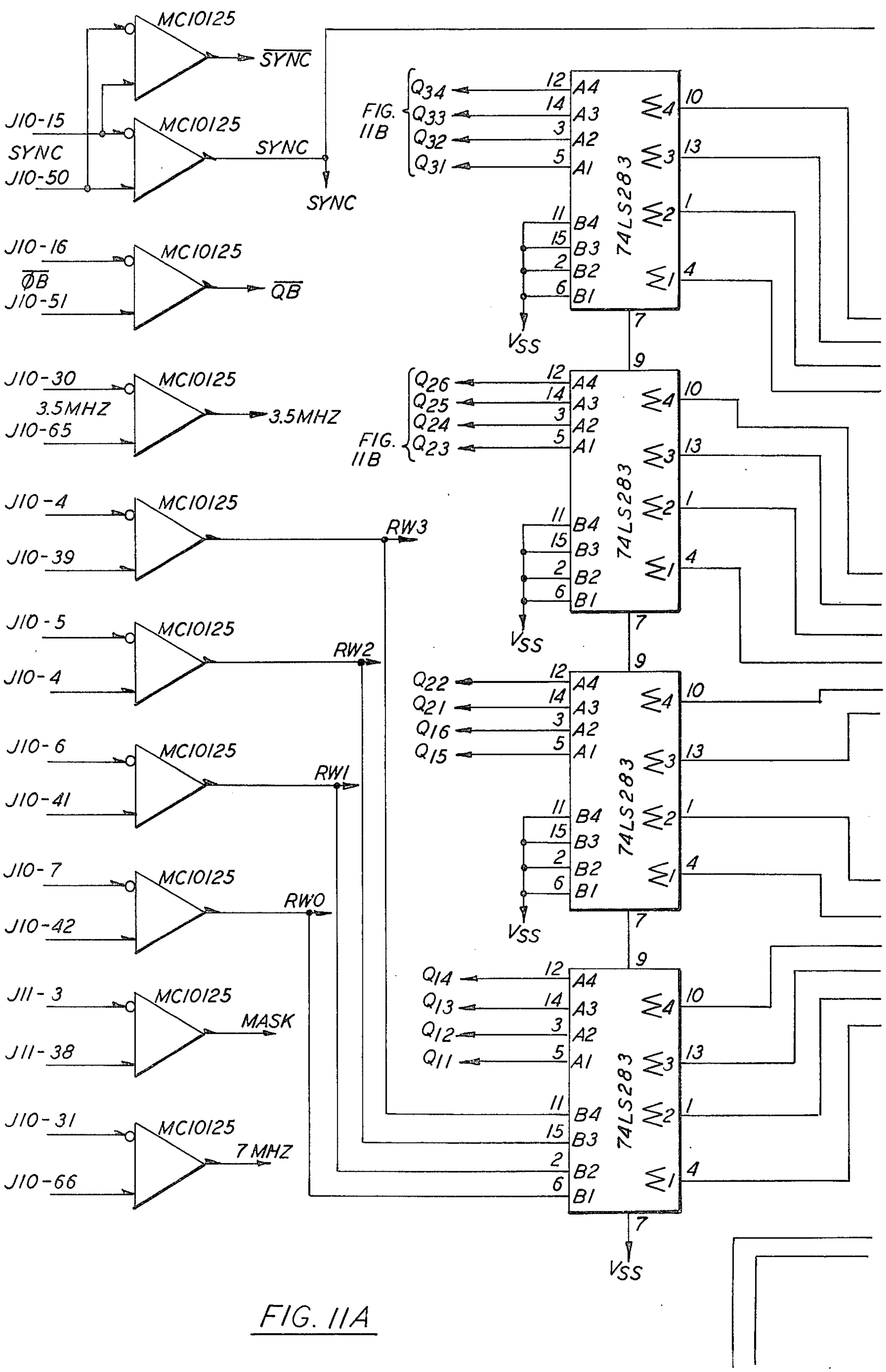
Figure 11B:
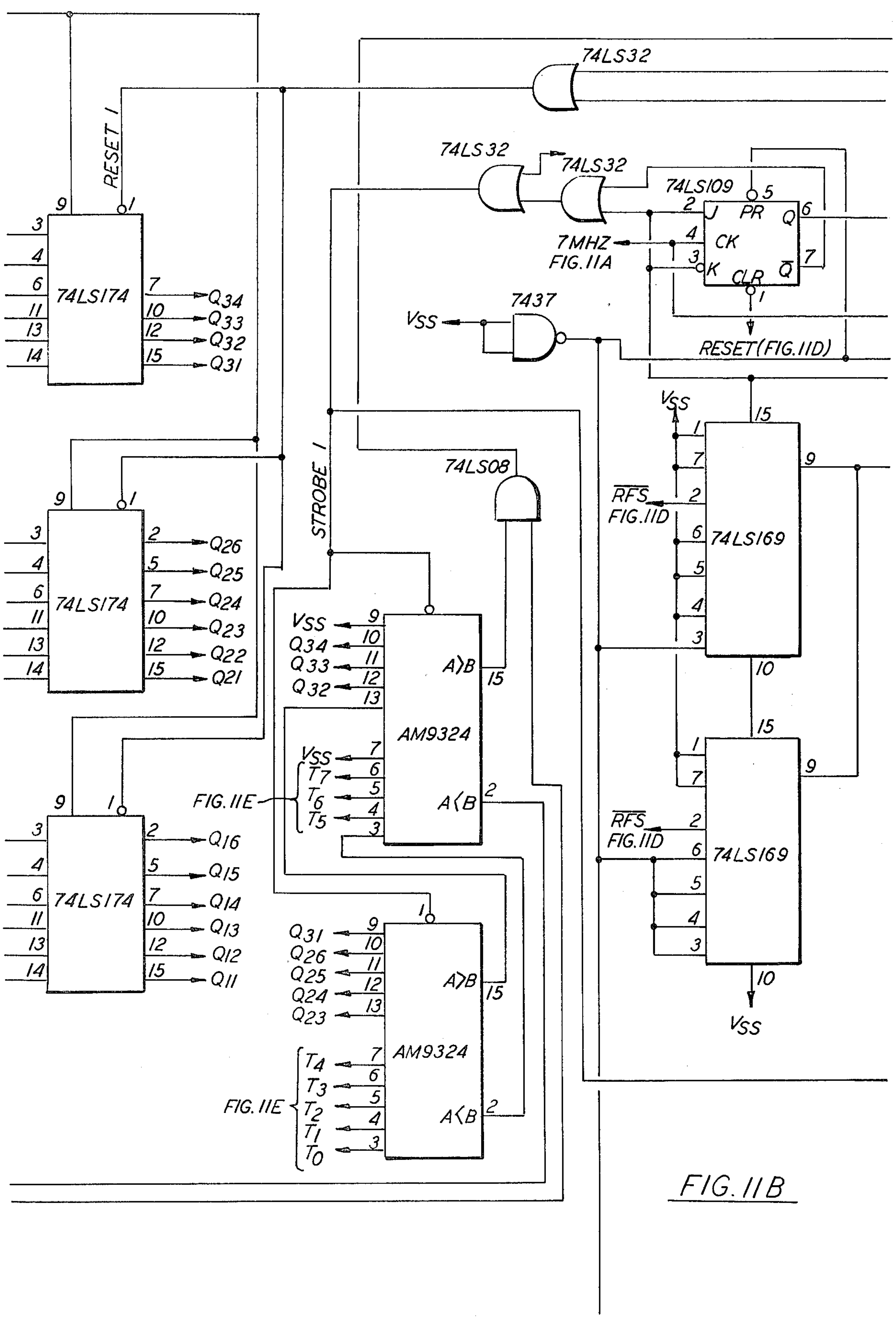
Figure 11D:
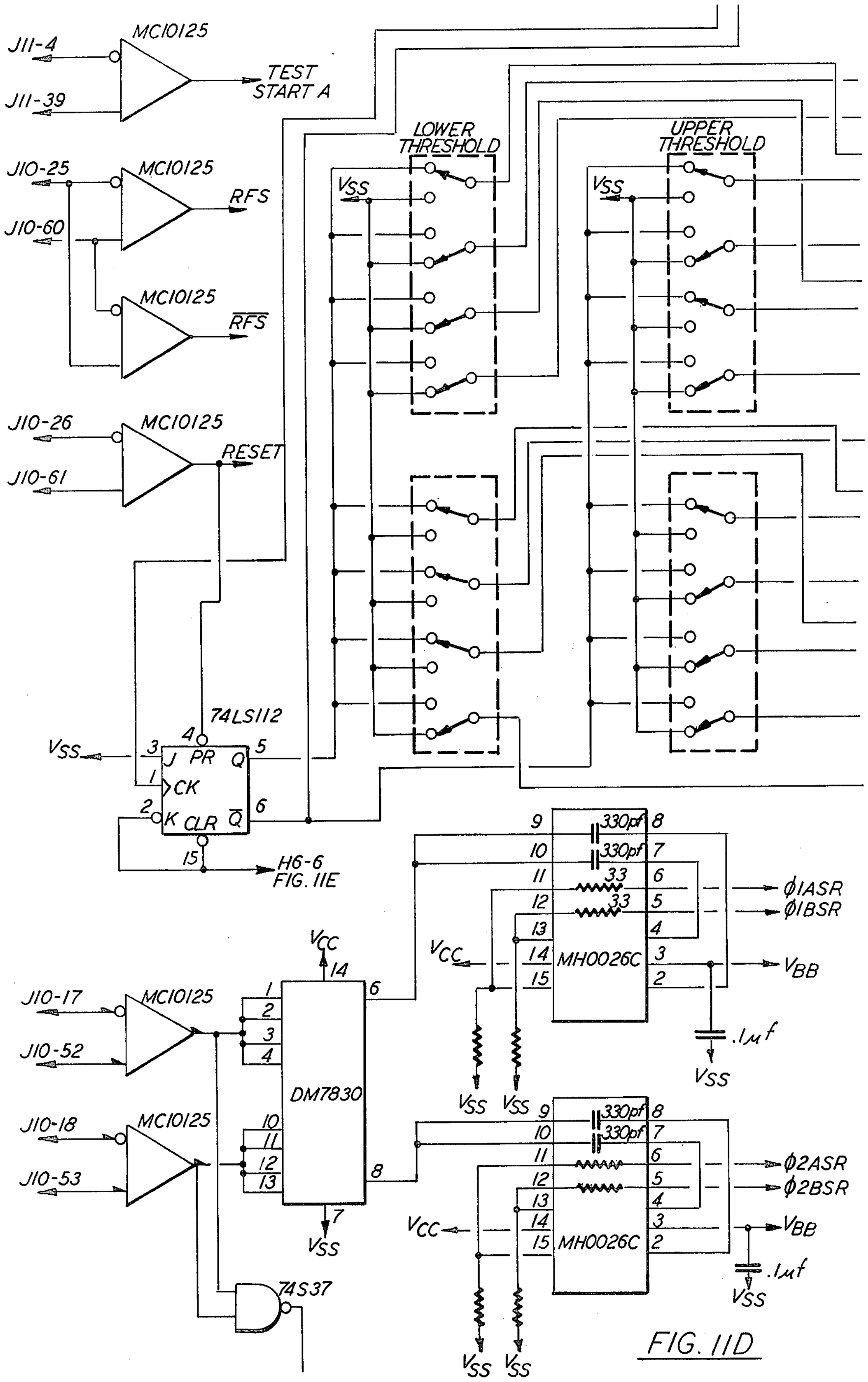
Figure 11E:
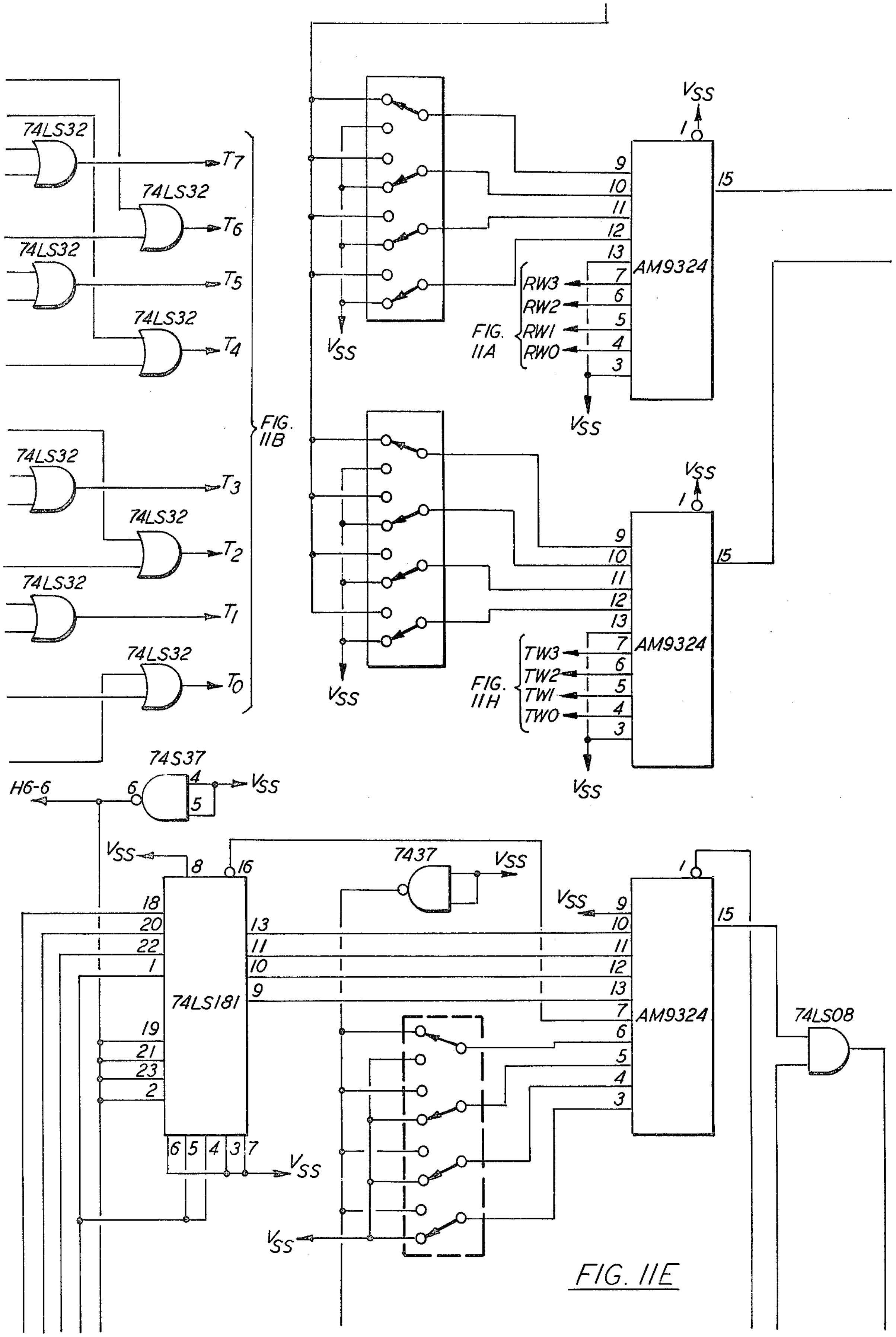
Figure 11F:
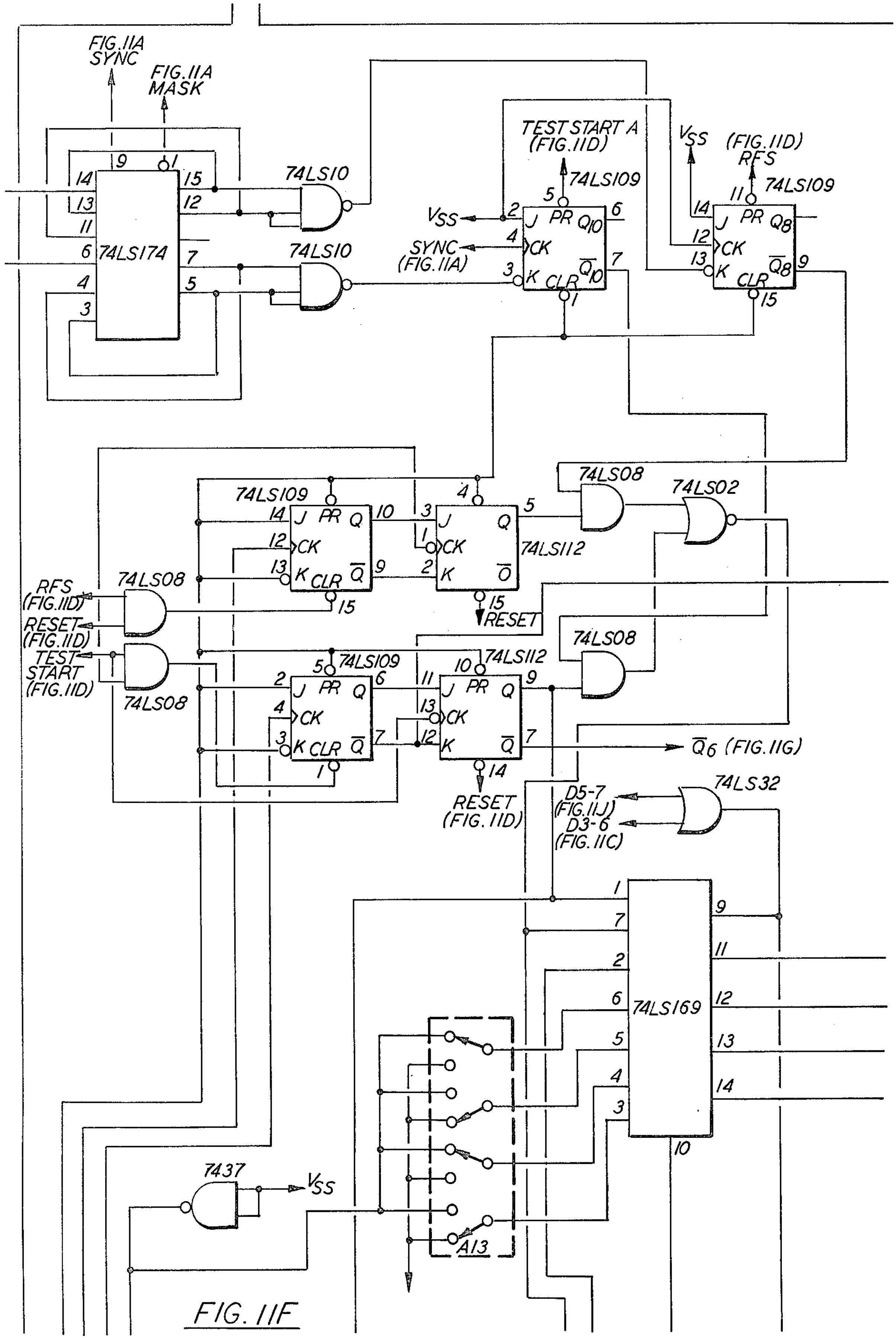
Figure 11G:
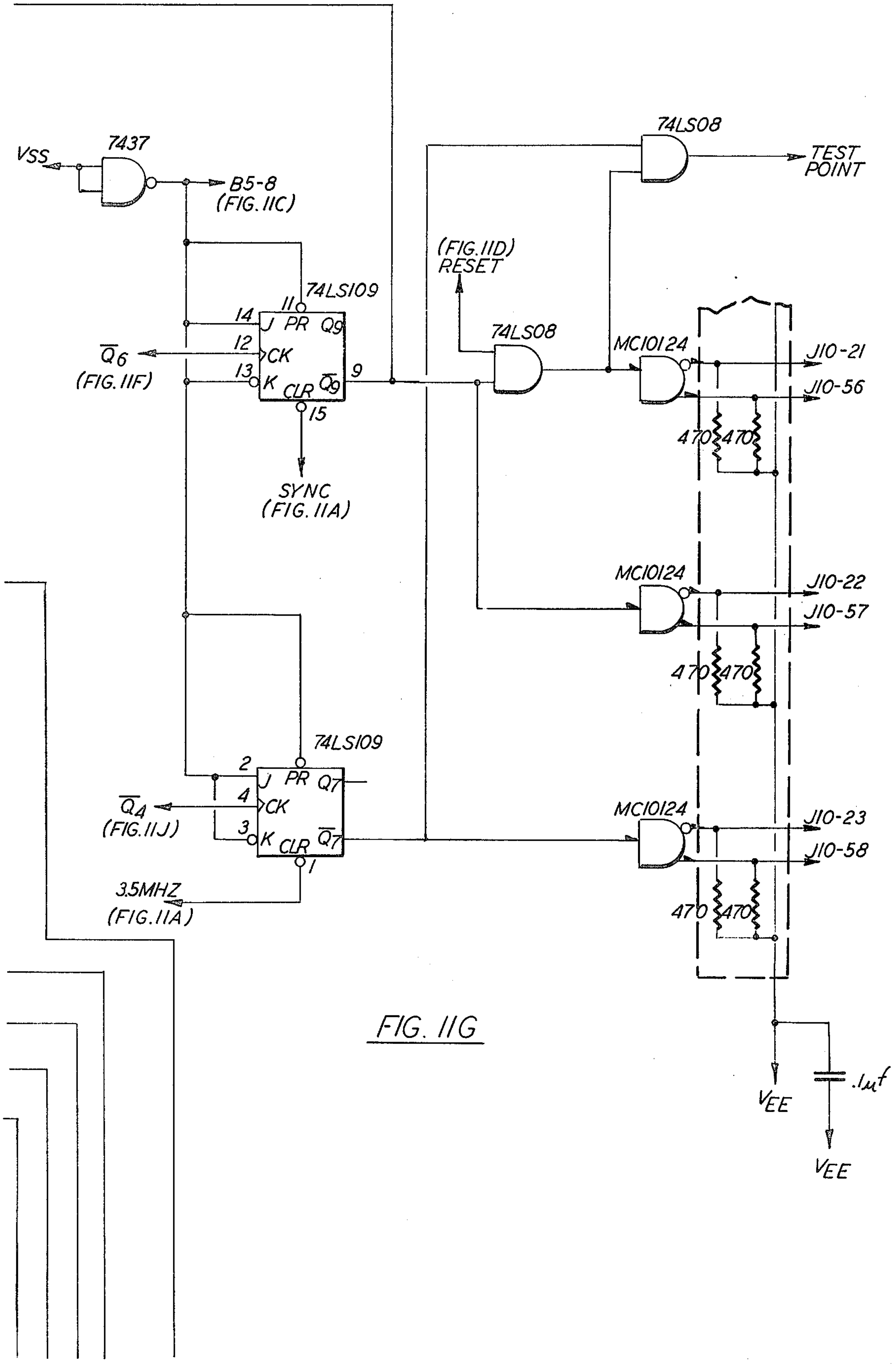
Figure 11H:
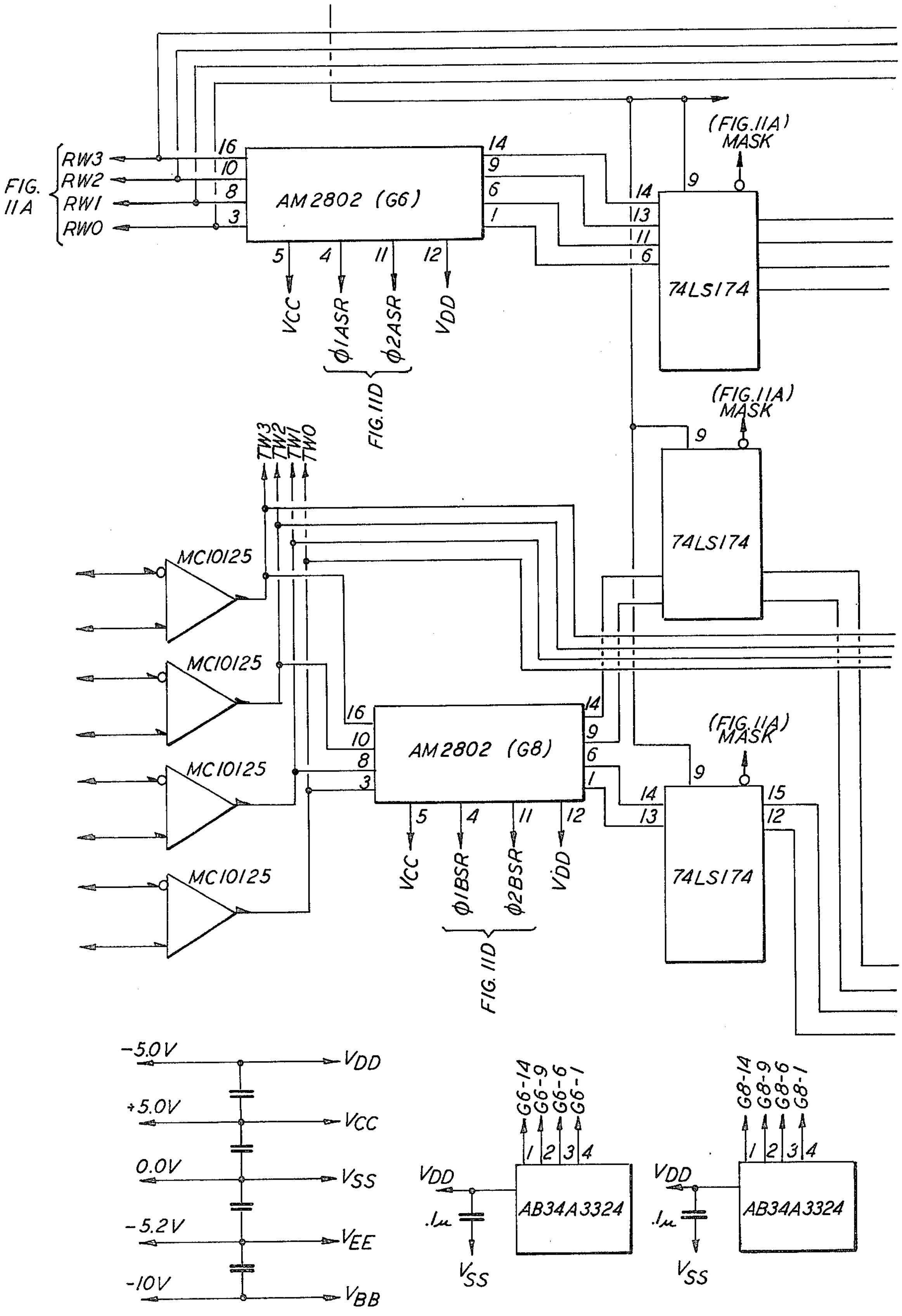
Figure 11I:
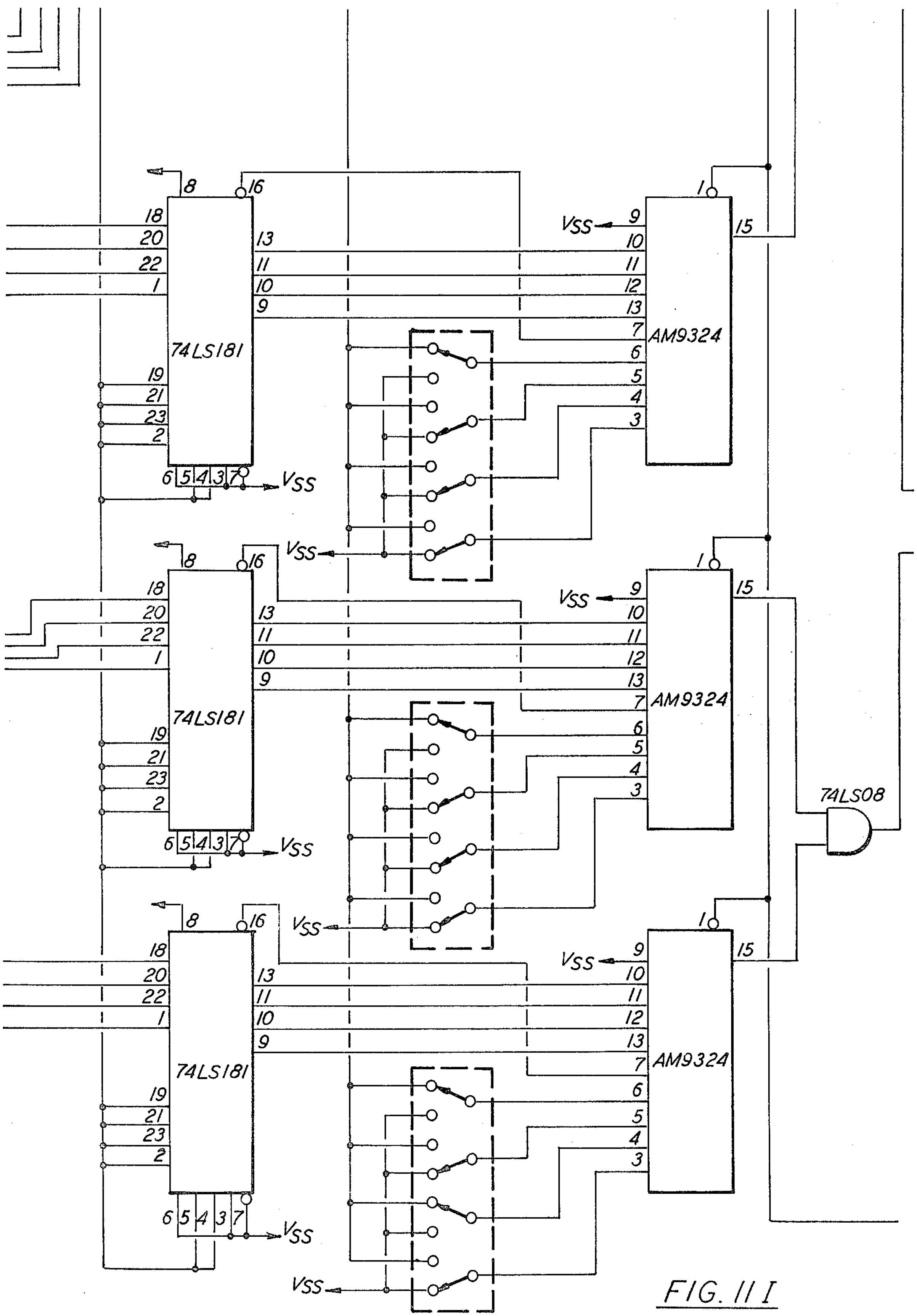
Figure 11J:
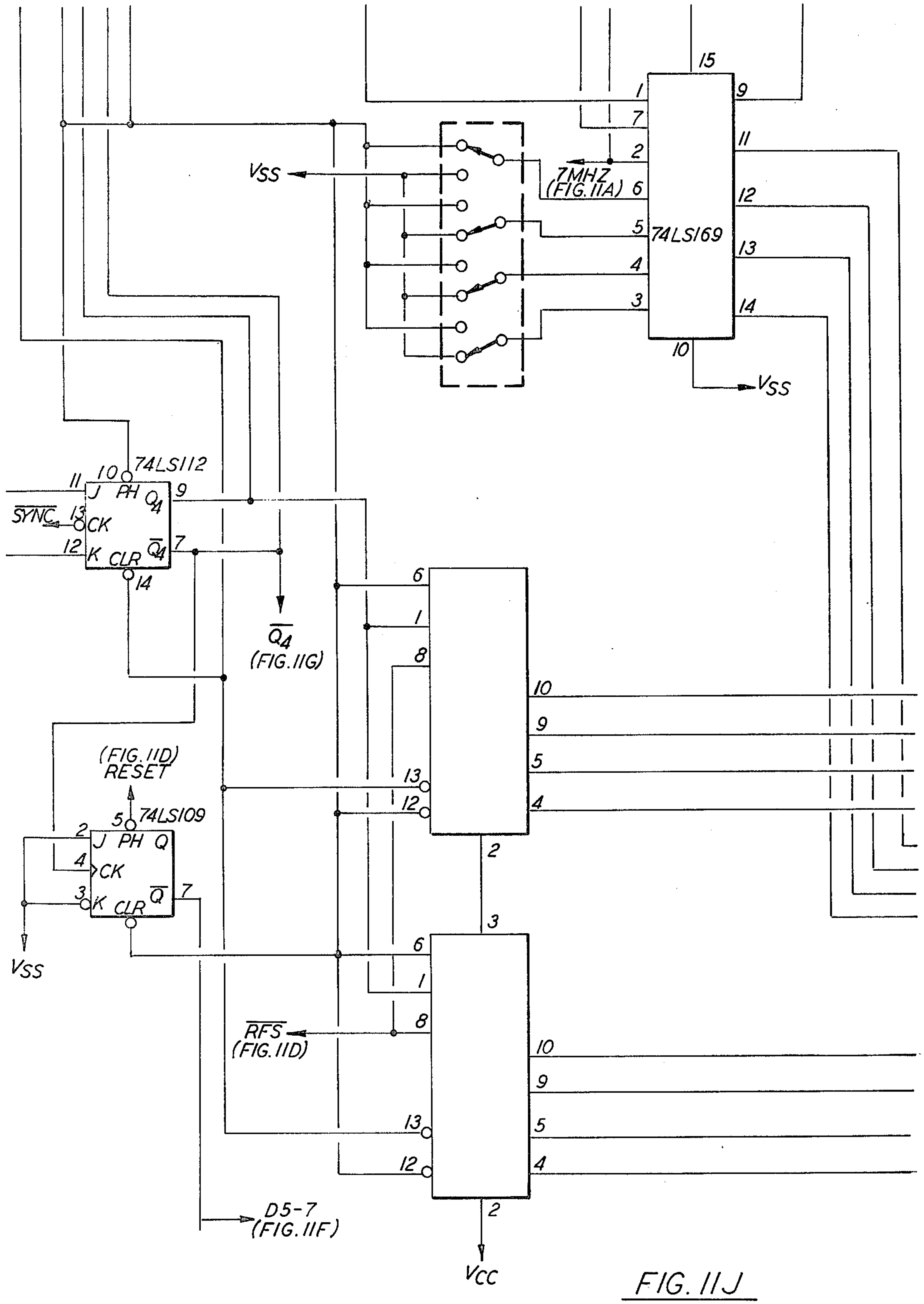
Figure 11K:
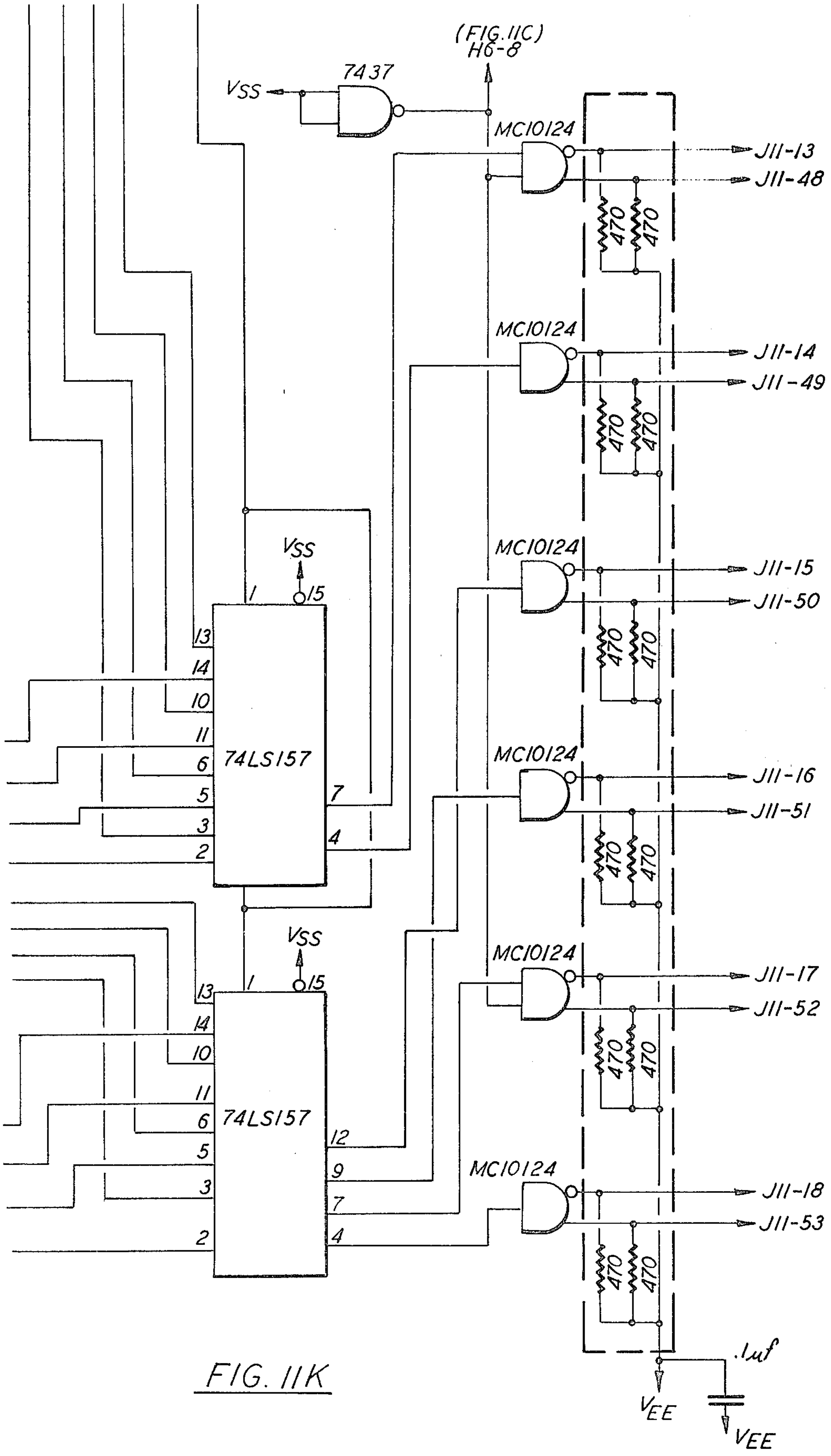
Figure 12:
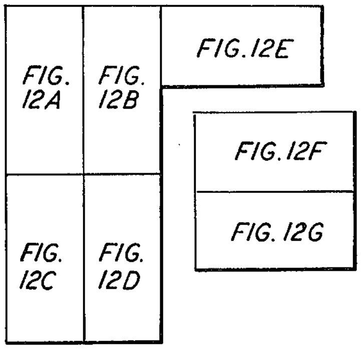
Figure 12A:
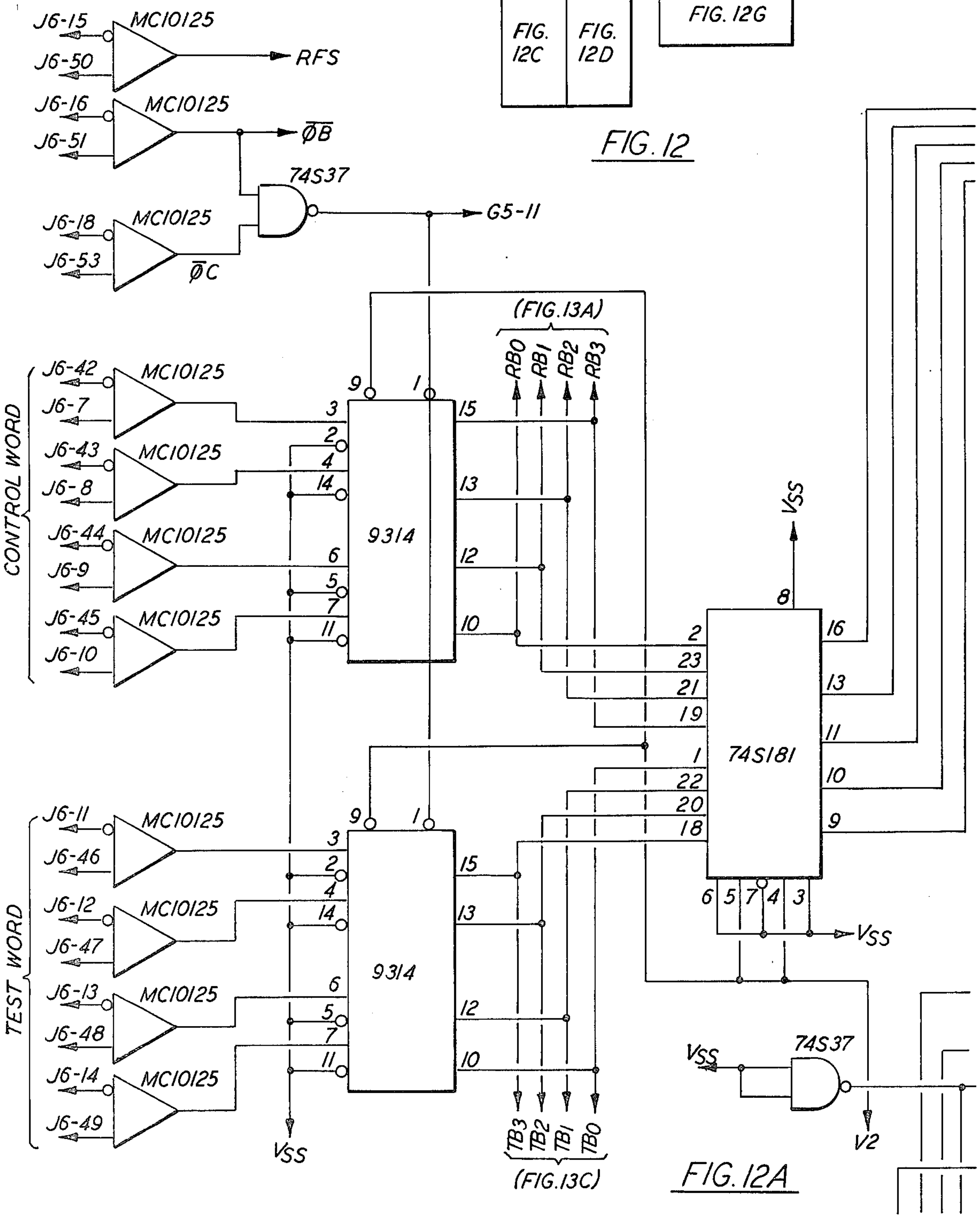
Figure 12B:
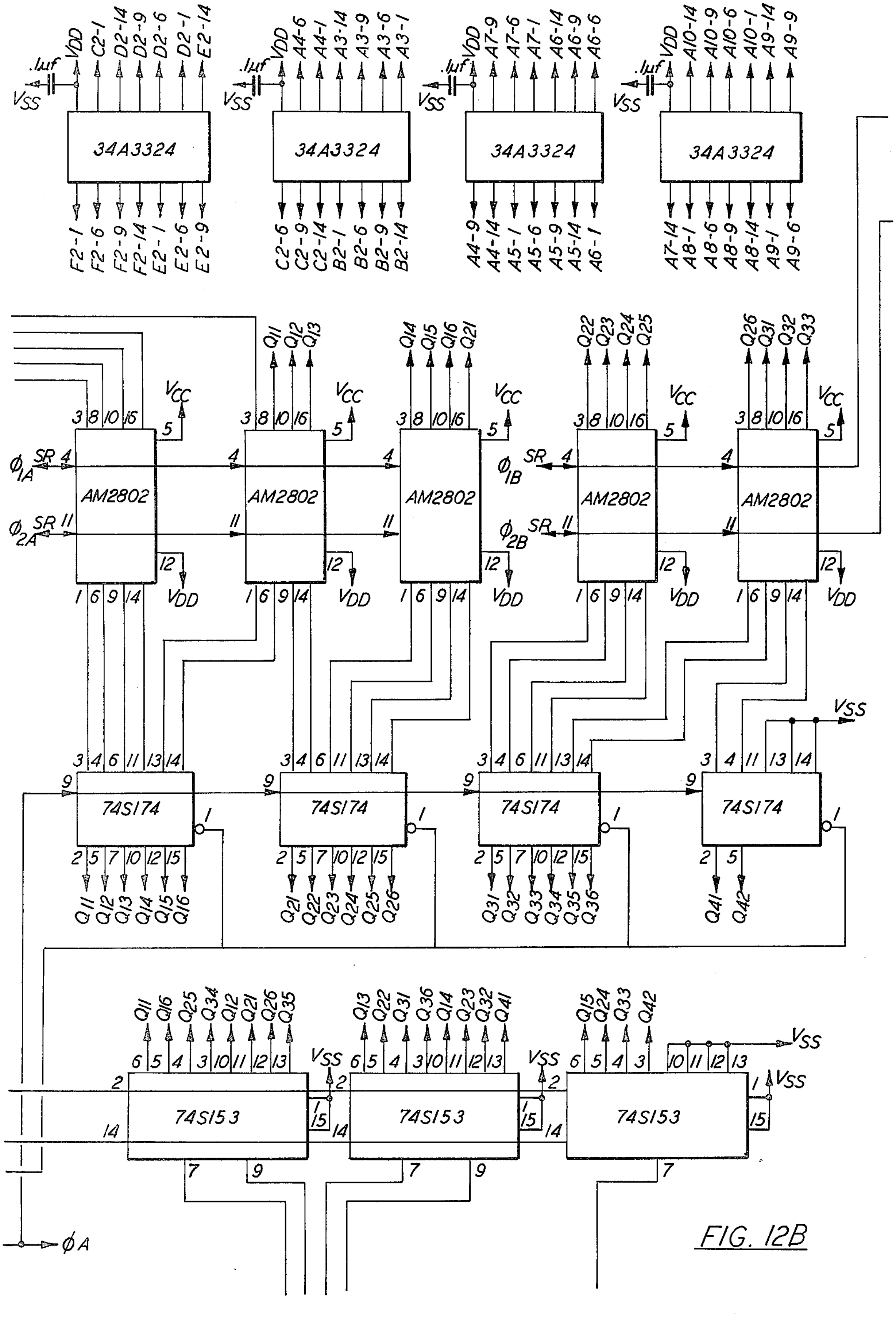
Figure 12C:
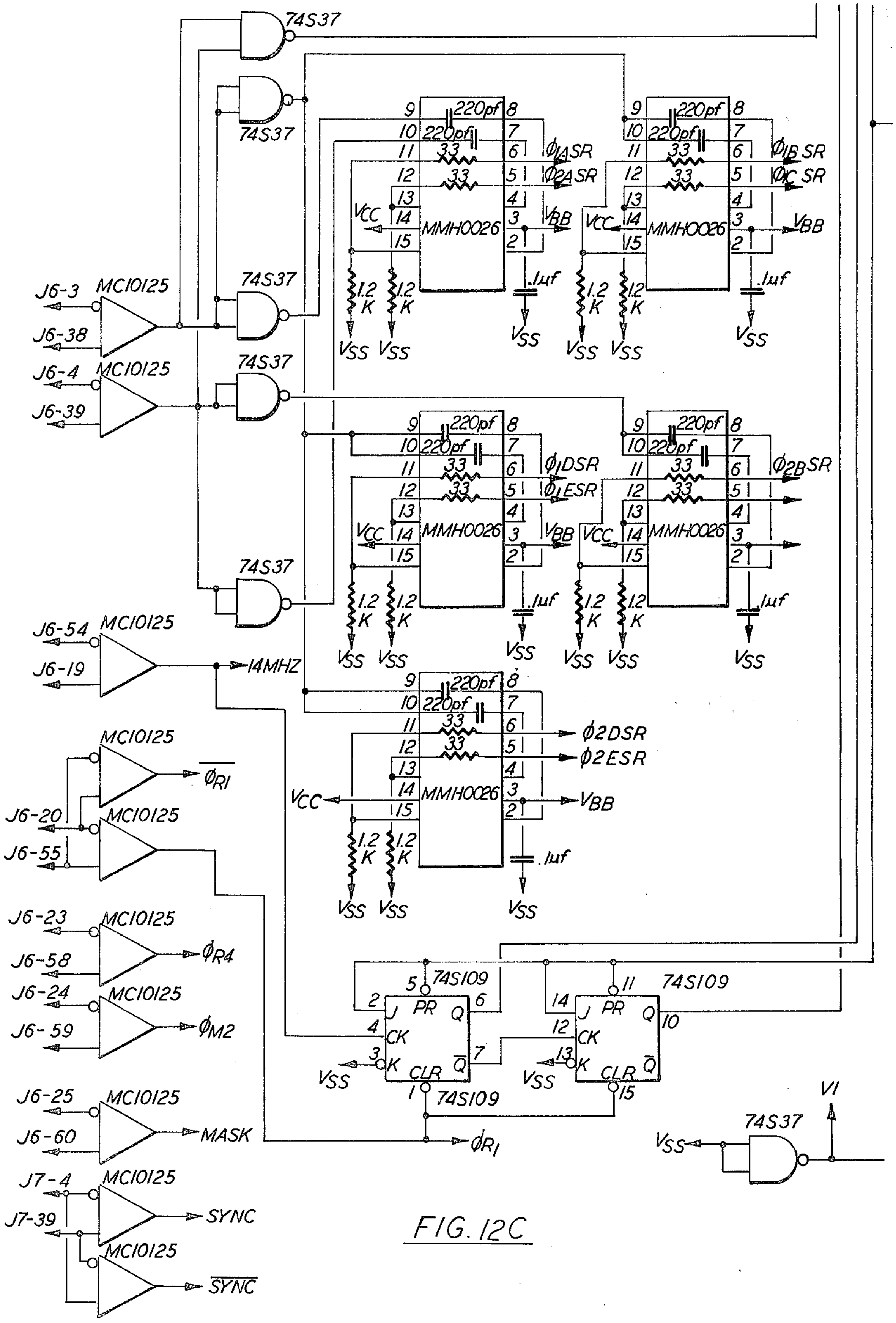
Figure 12D:
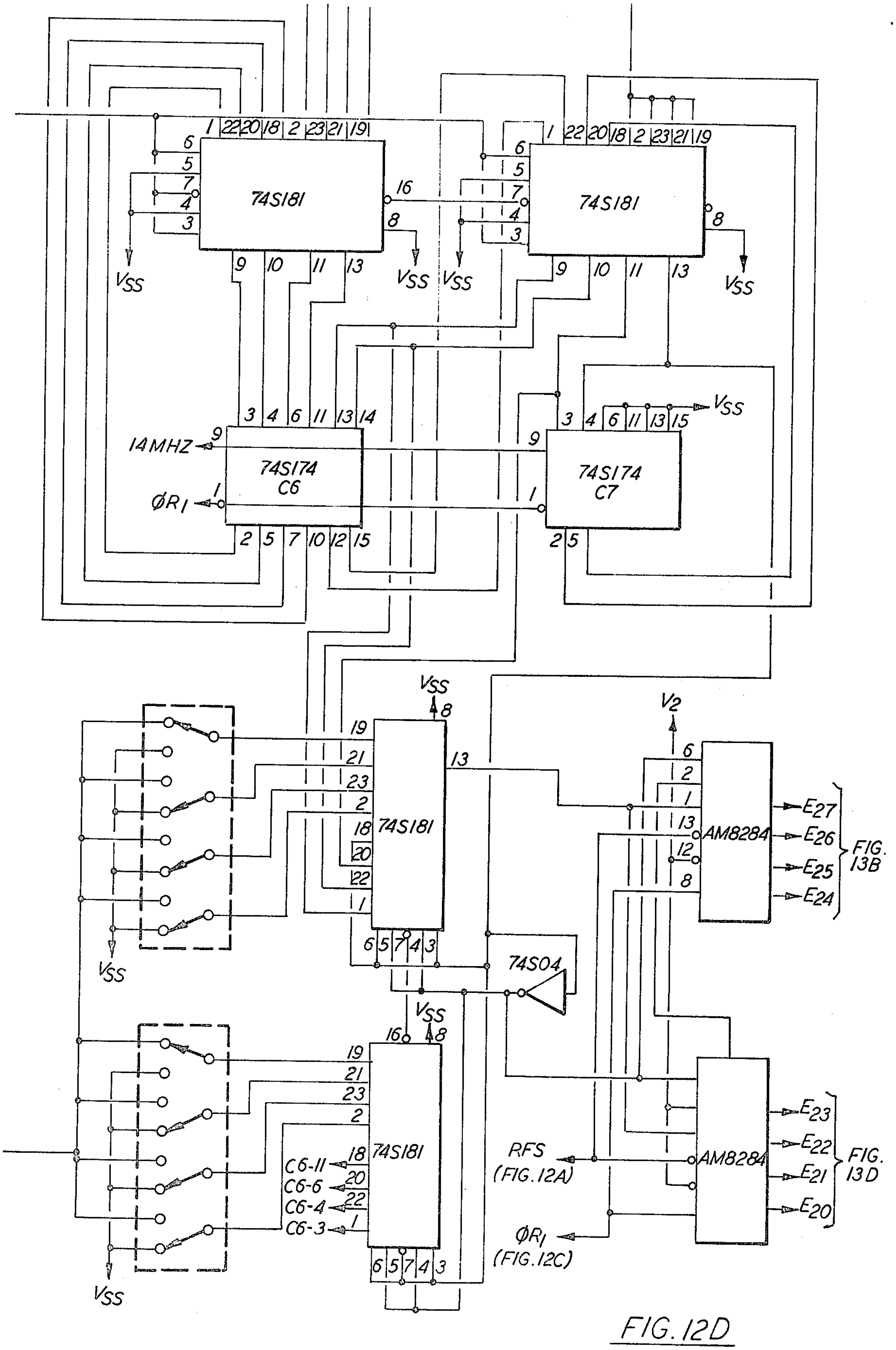
Figure 12E:
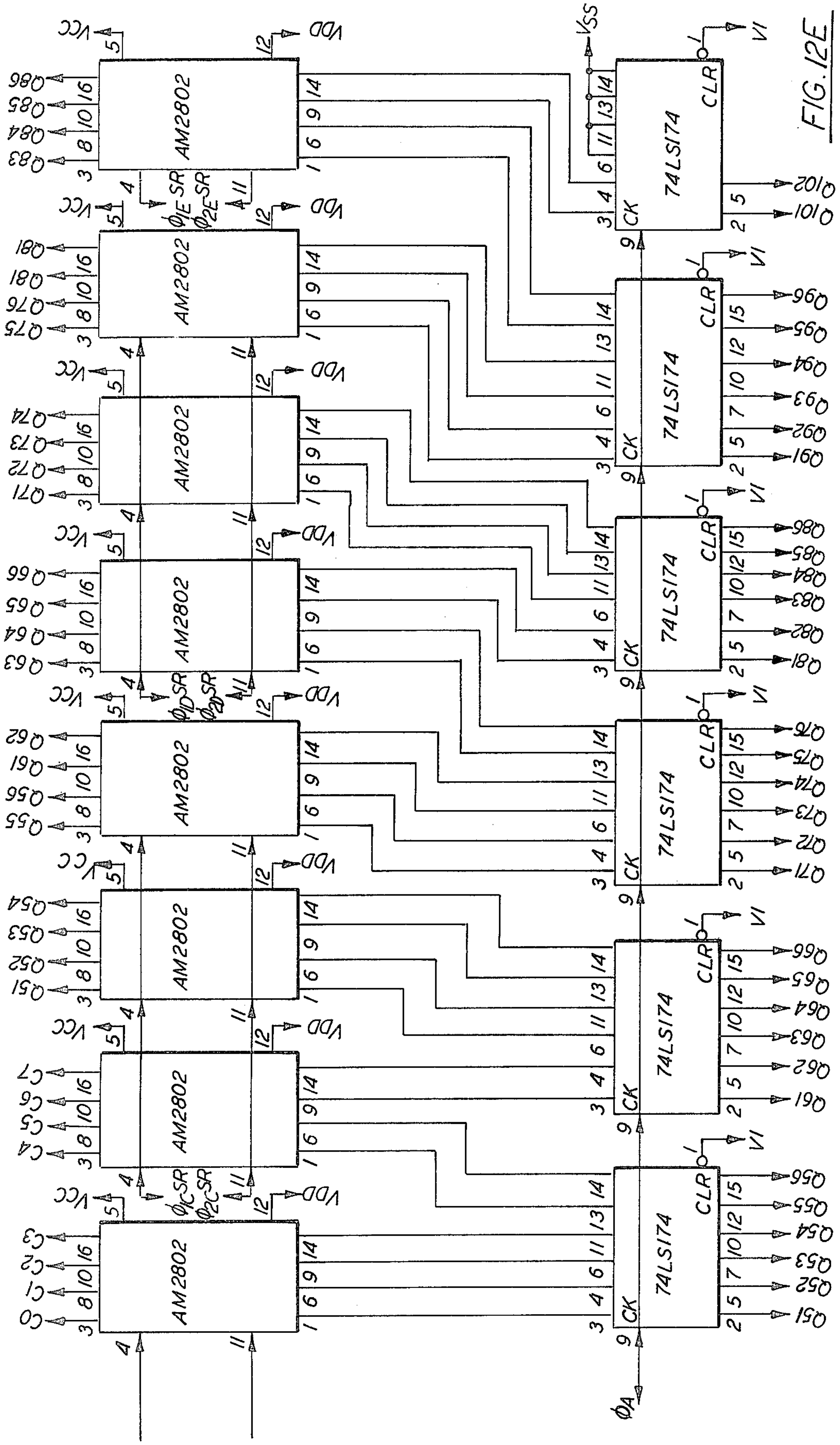
Figure 12F:
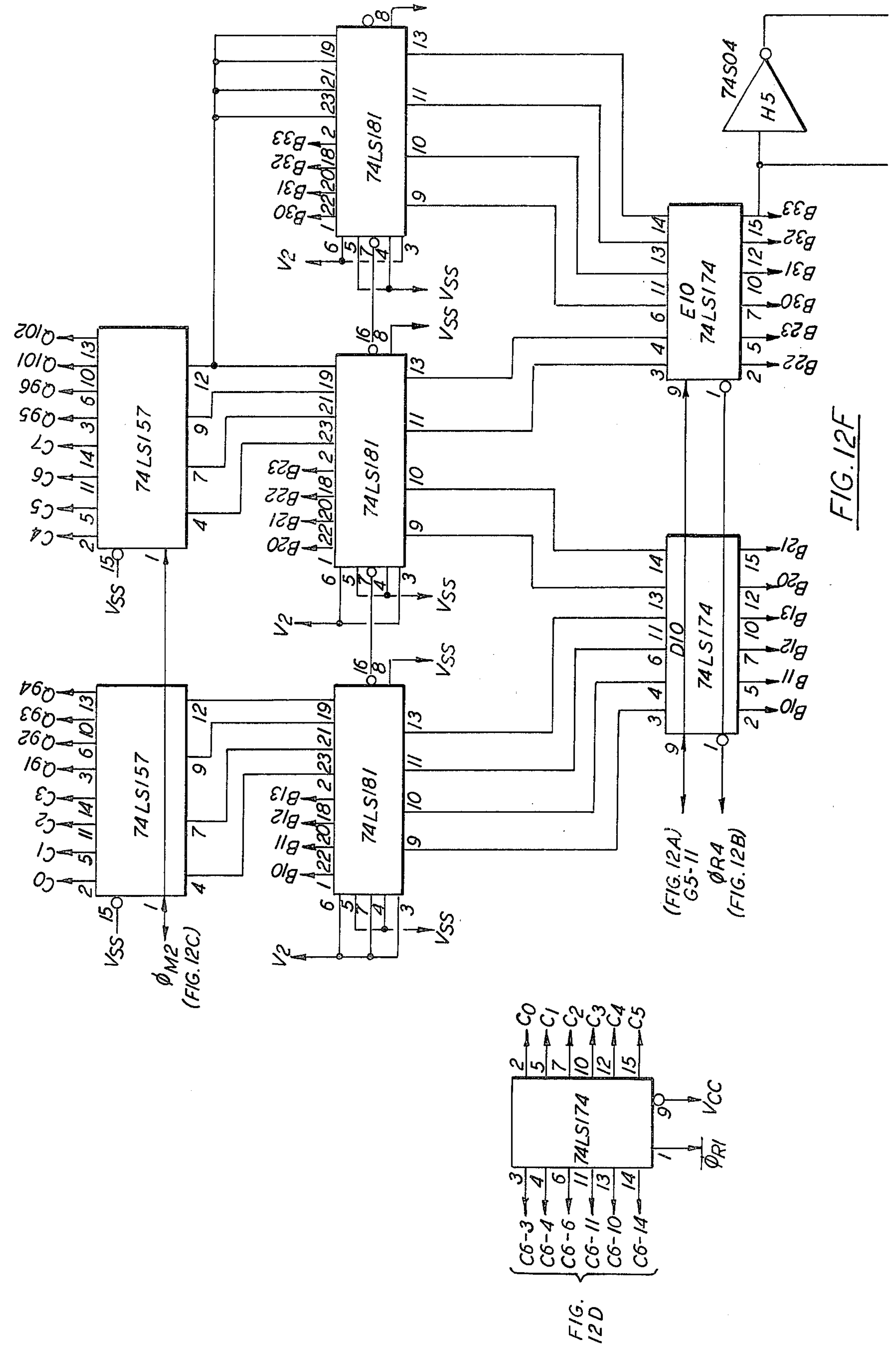
Figure 12G:
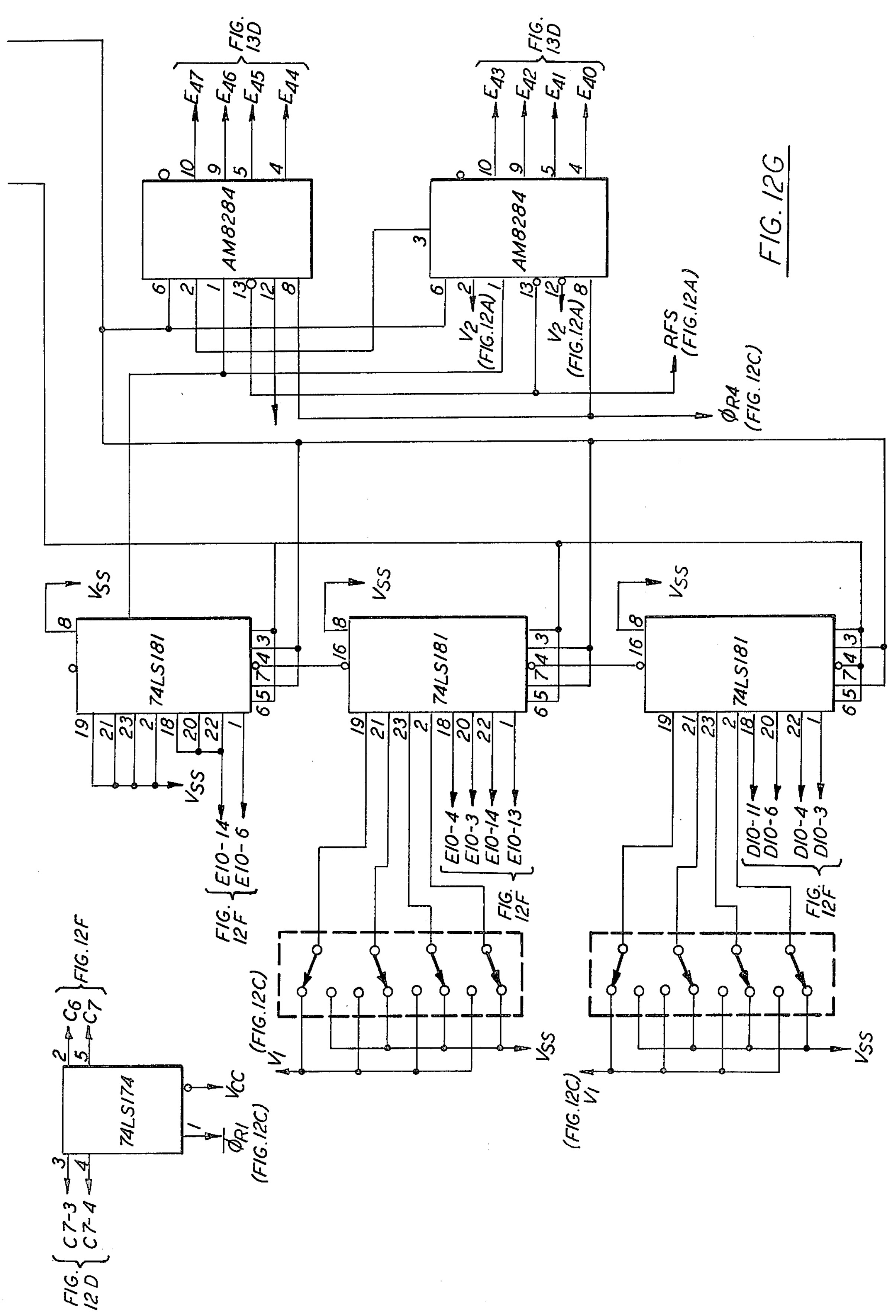
Figure 13:
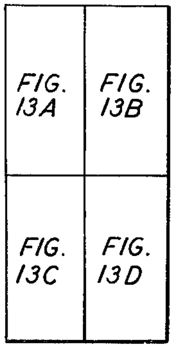
Figure 13B:
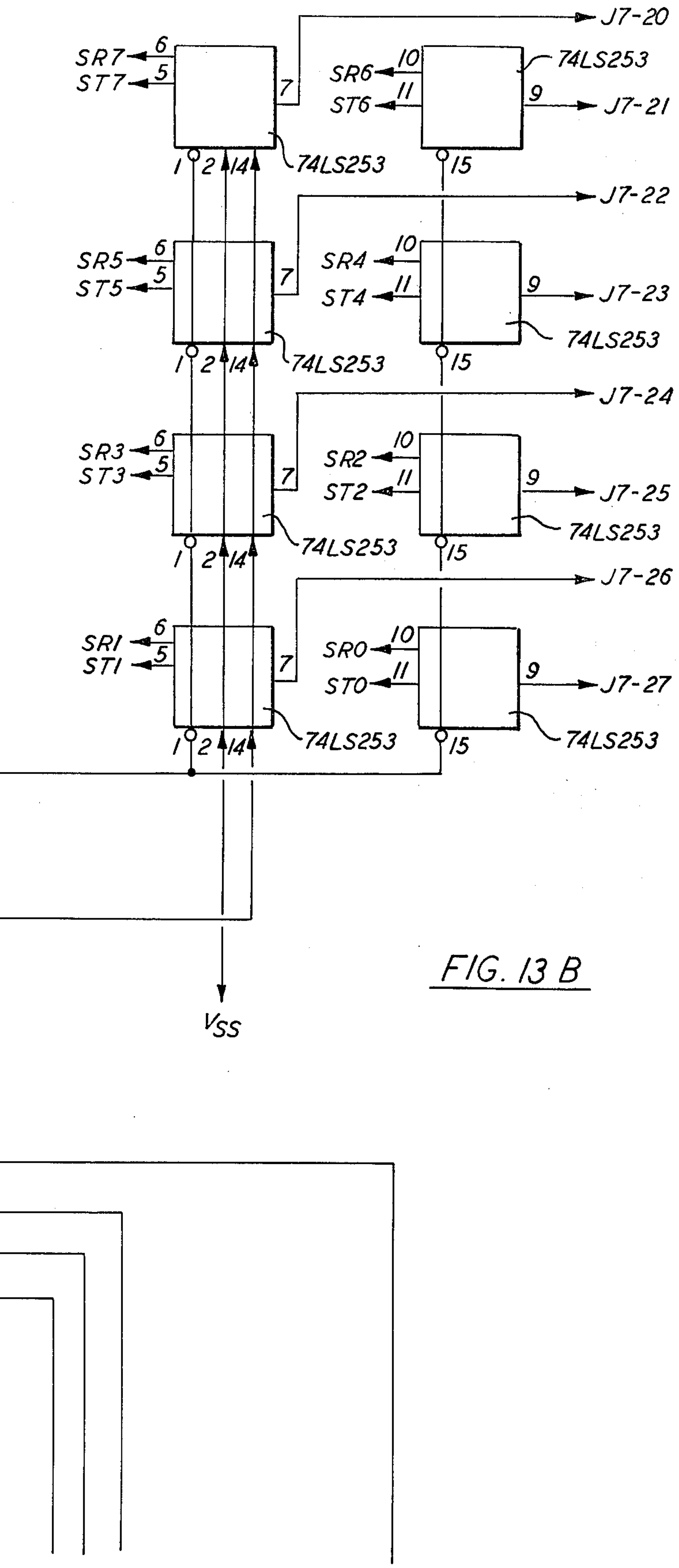
Figure 13A:
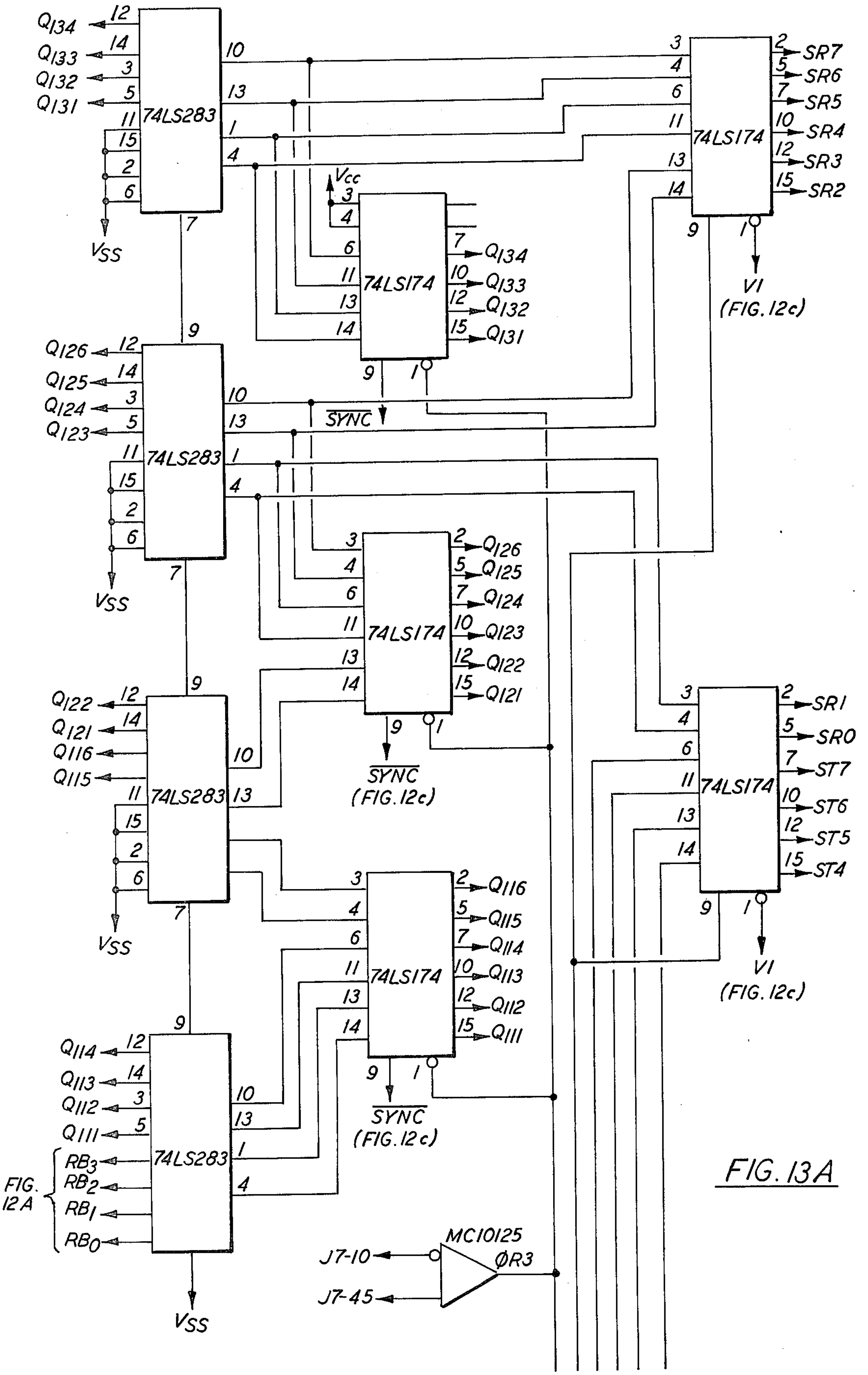
Figure 13C:
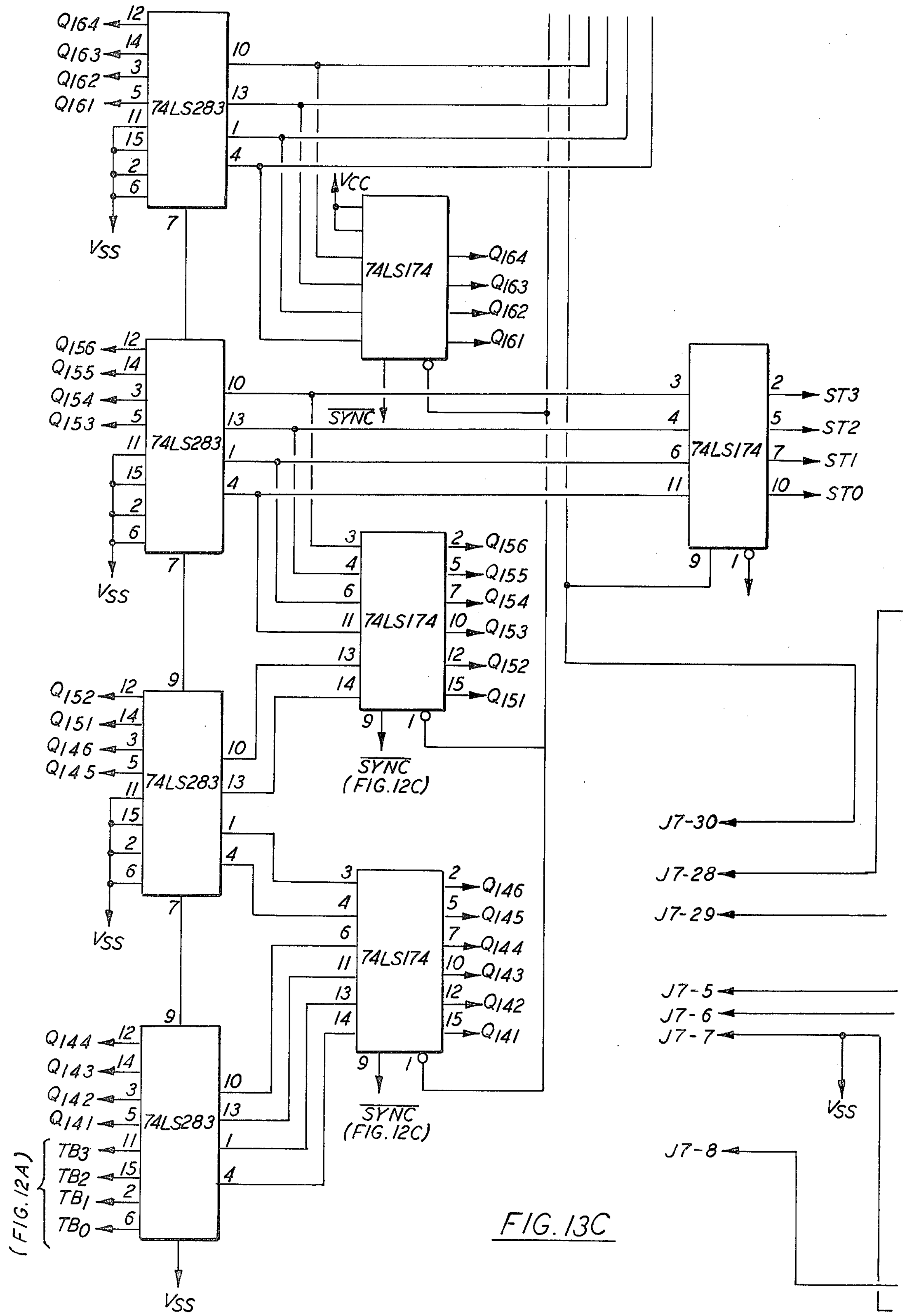
Figure 13D:
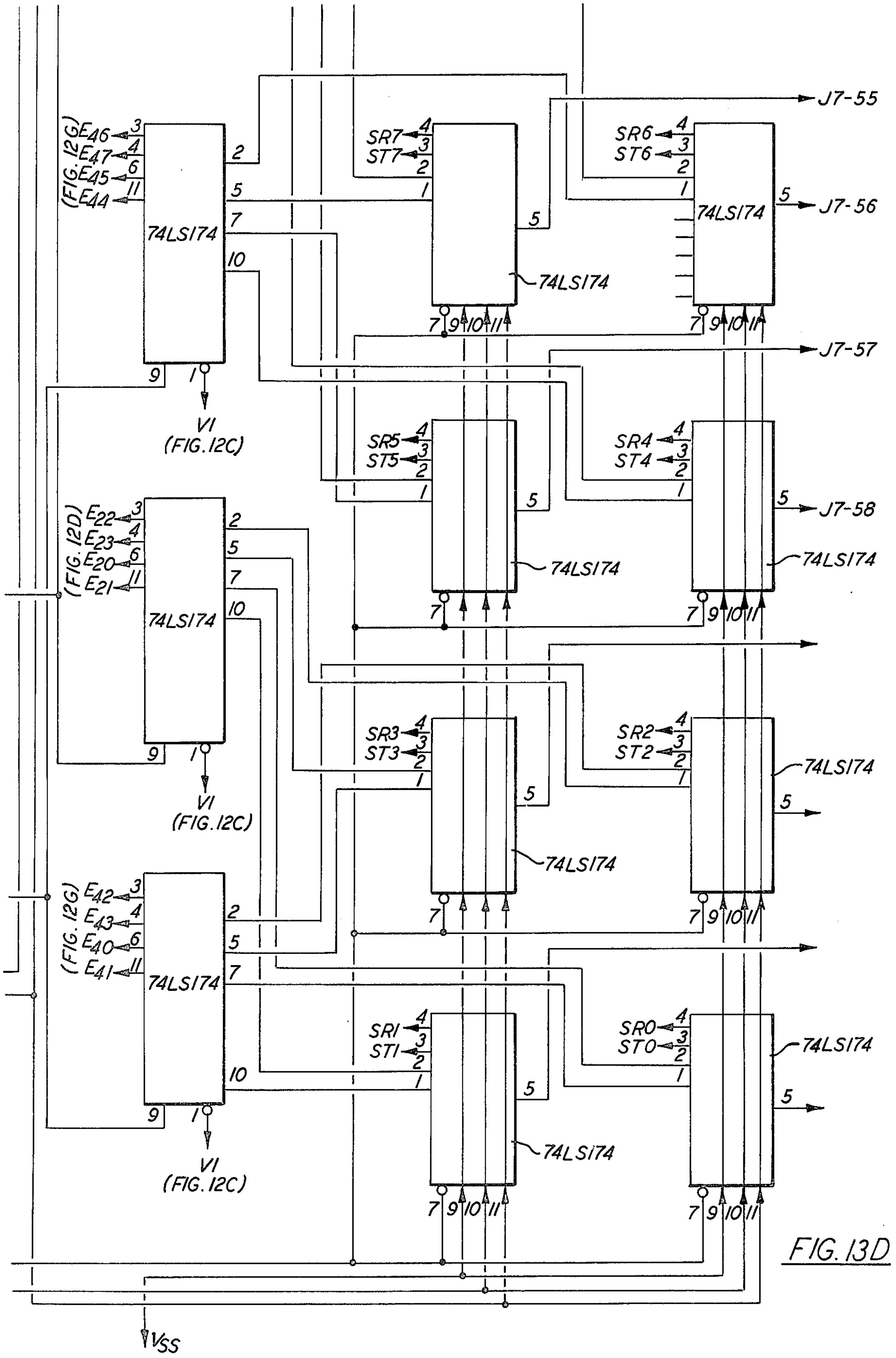
Figure 14A:
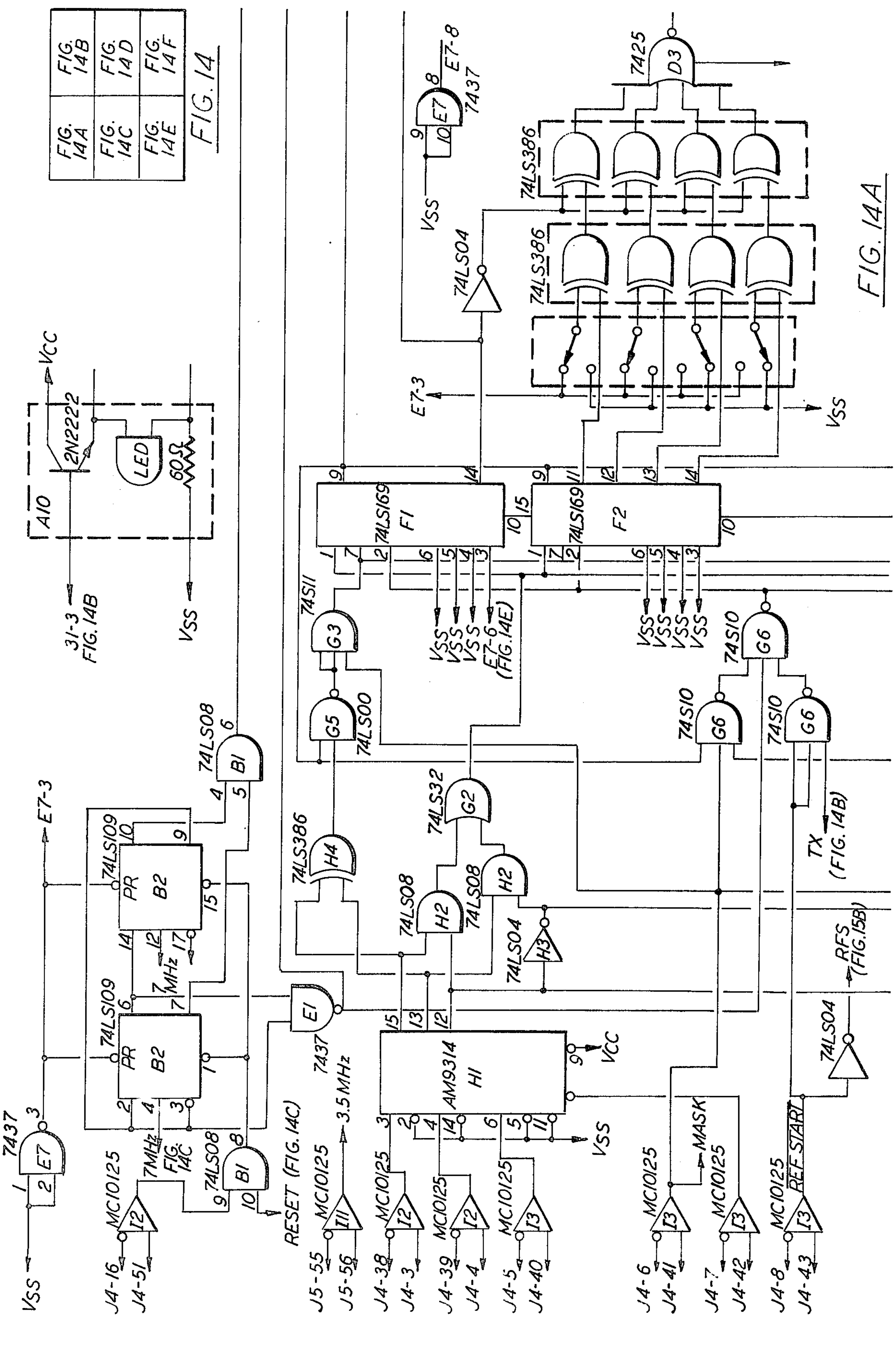
Figure 14B:
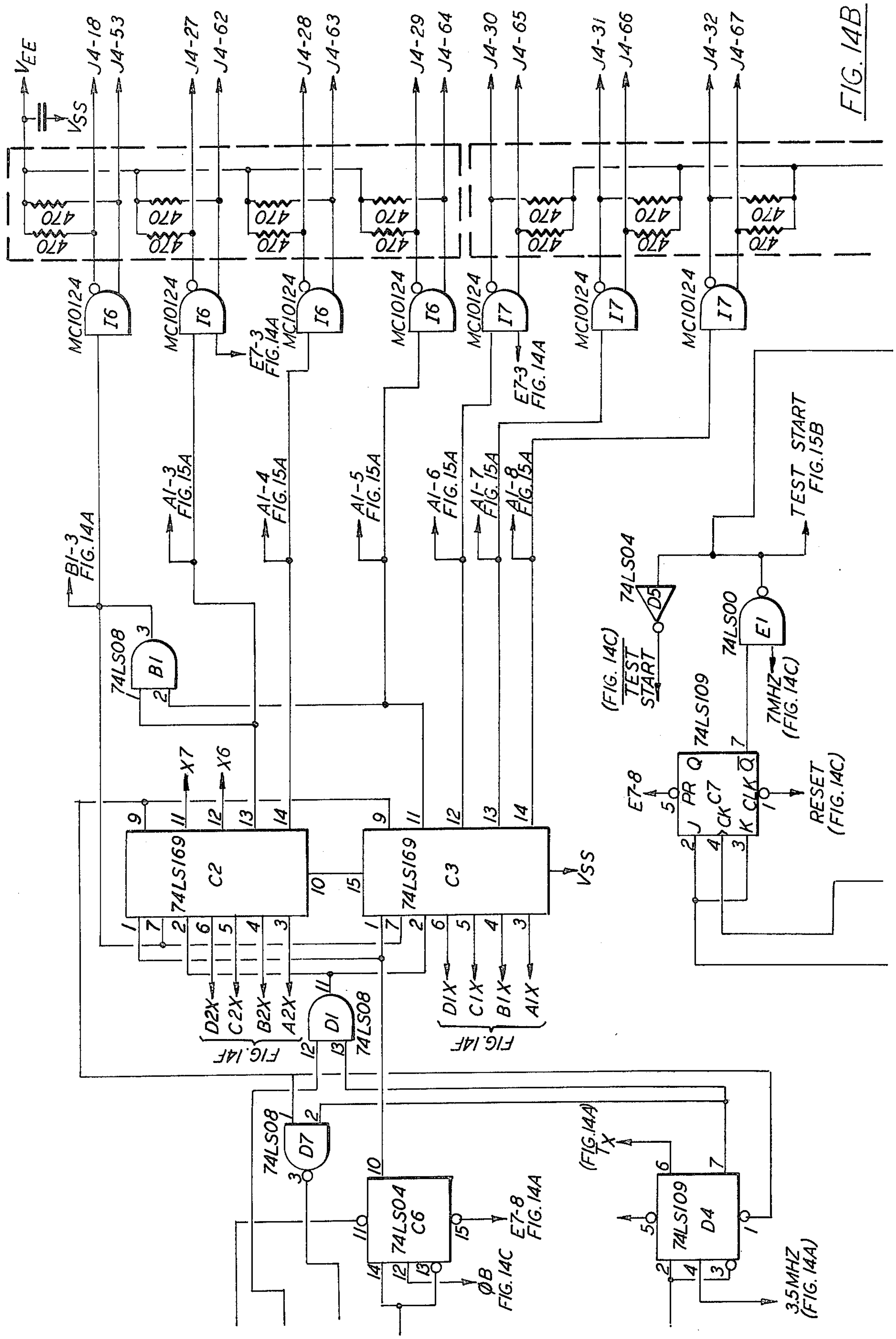
Figure 14C:
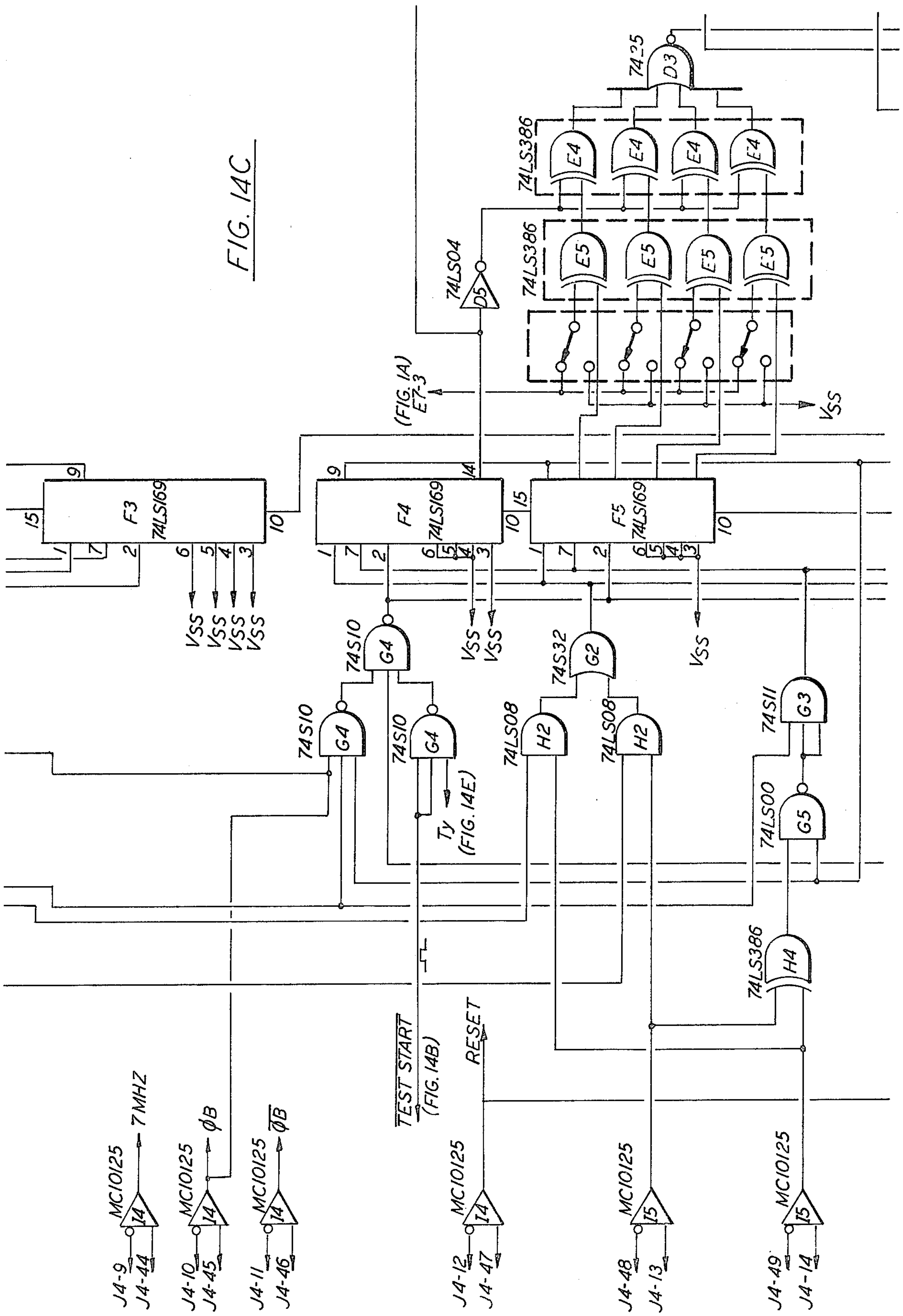
Figure 14D:
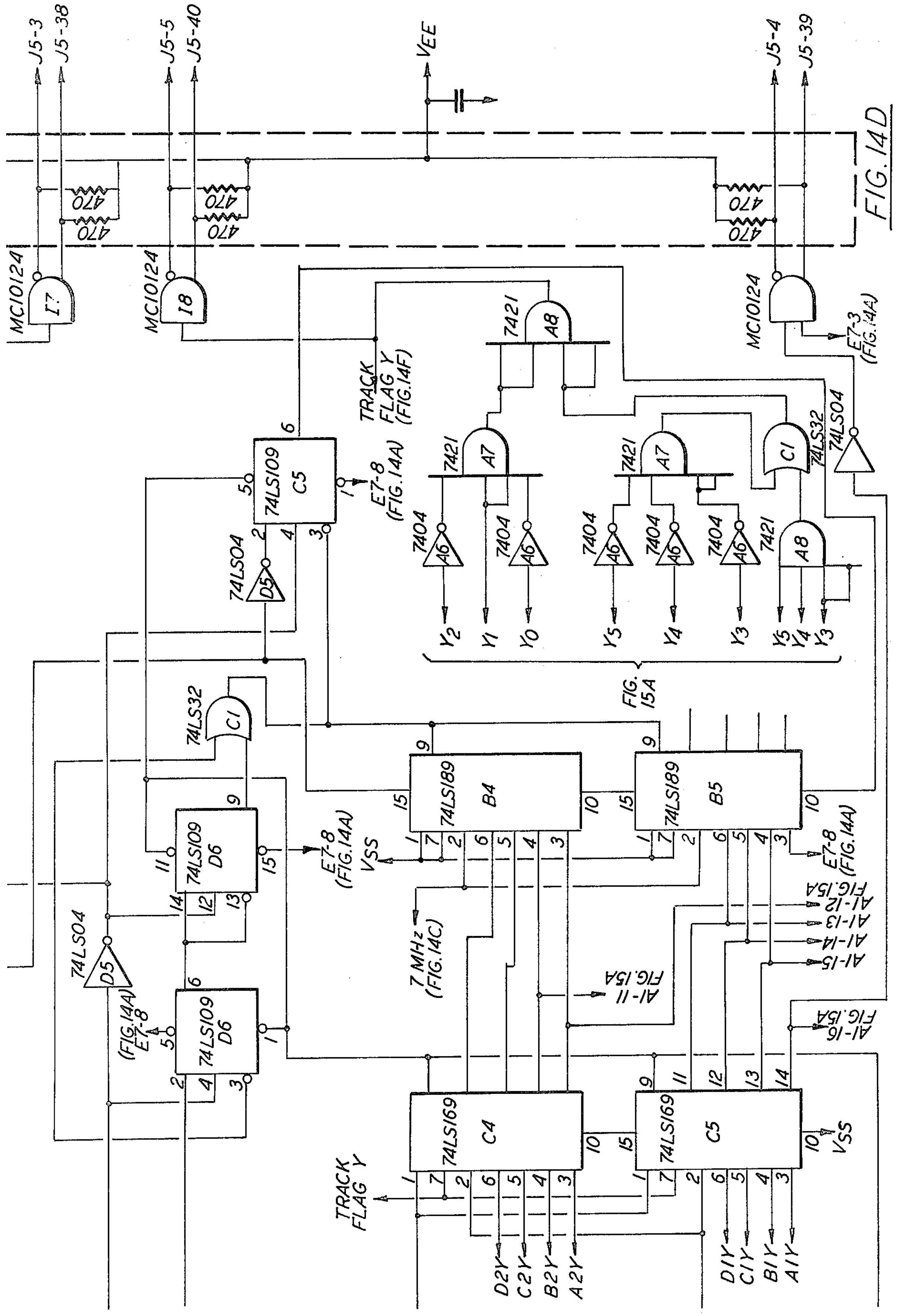
Figure 14E:
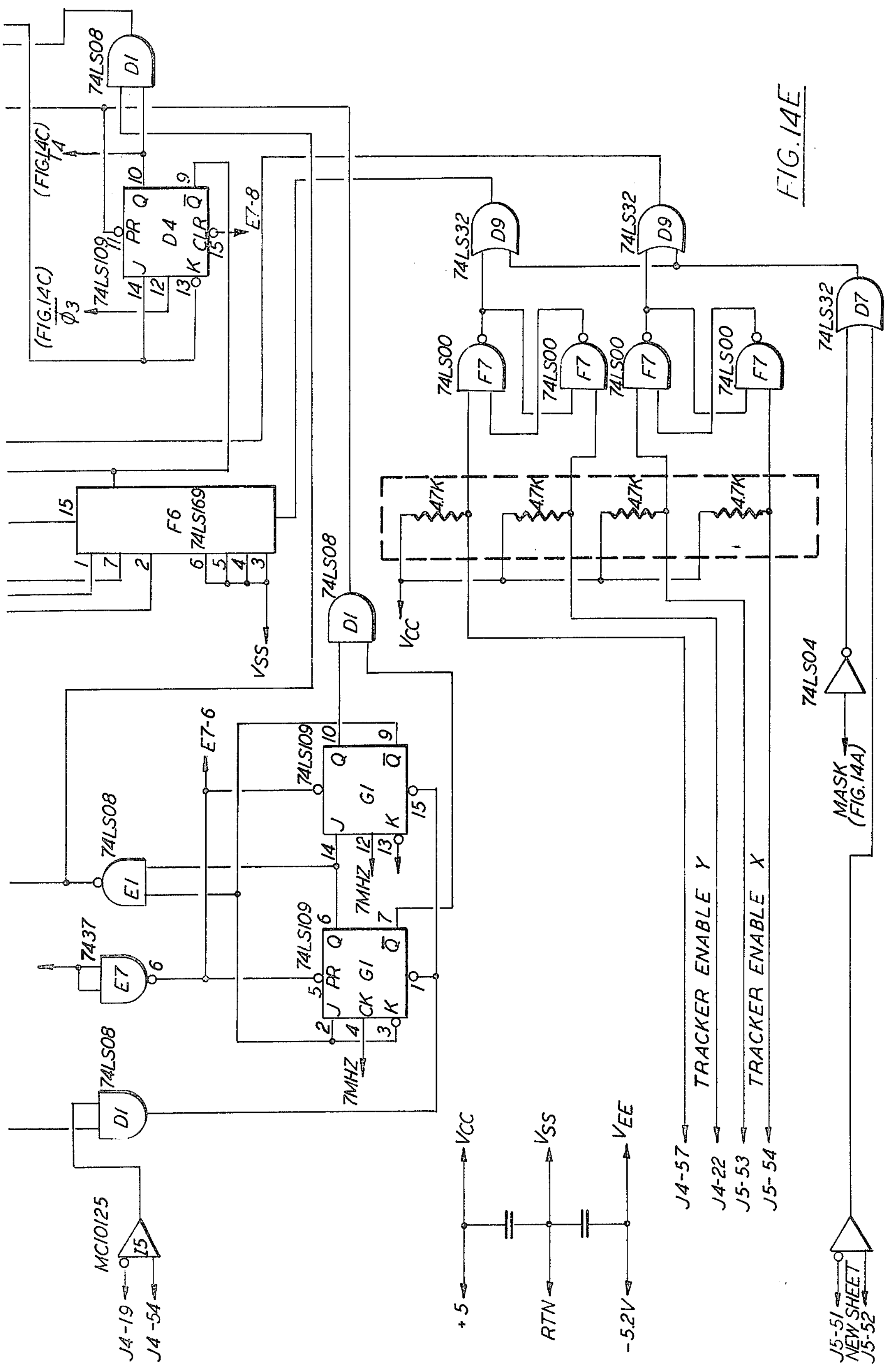
Figure 14F:
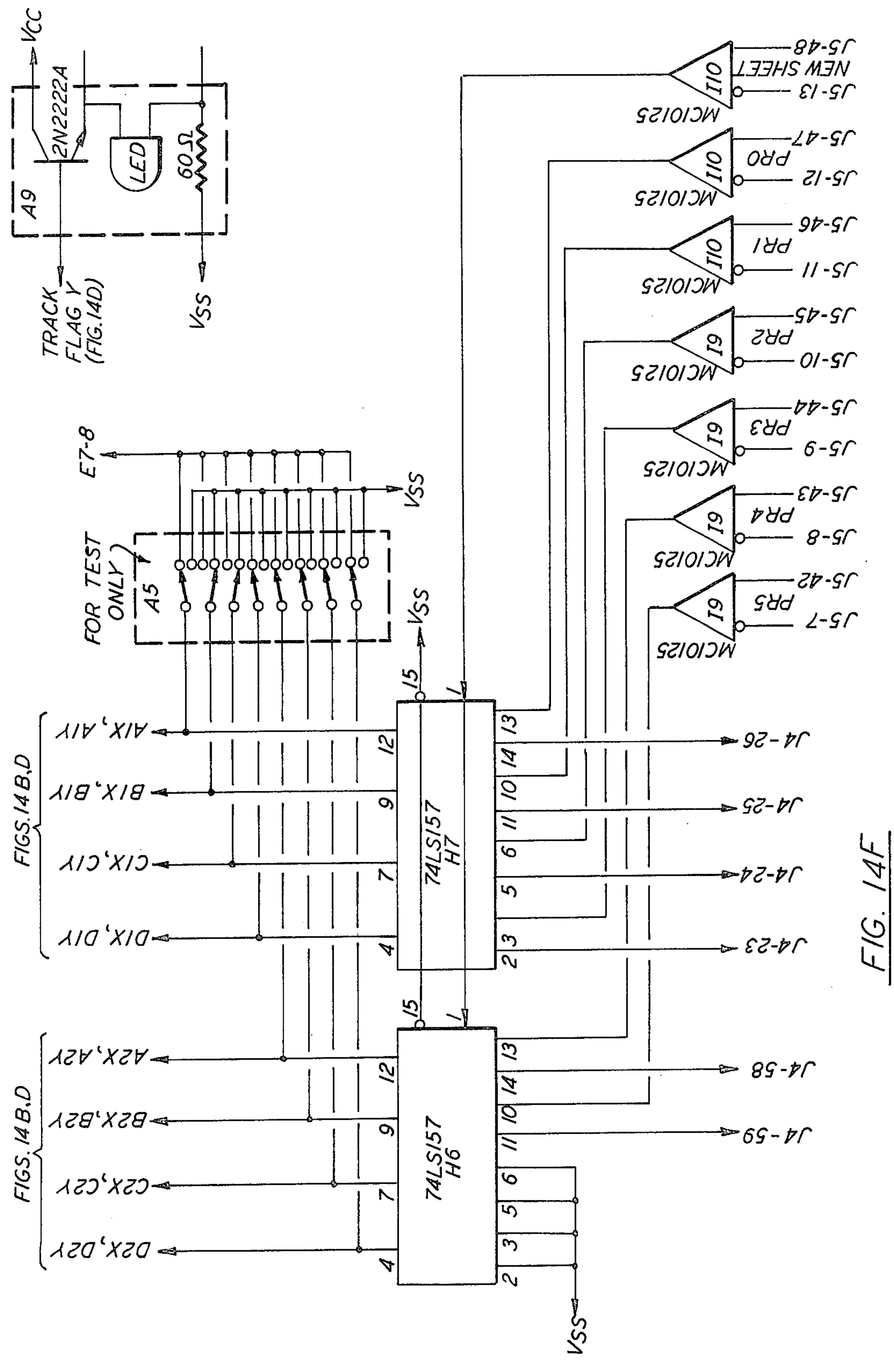
Figure 15A:
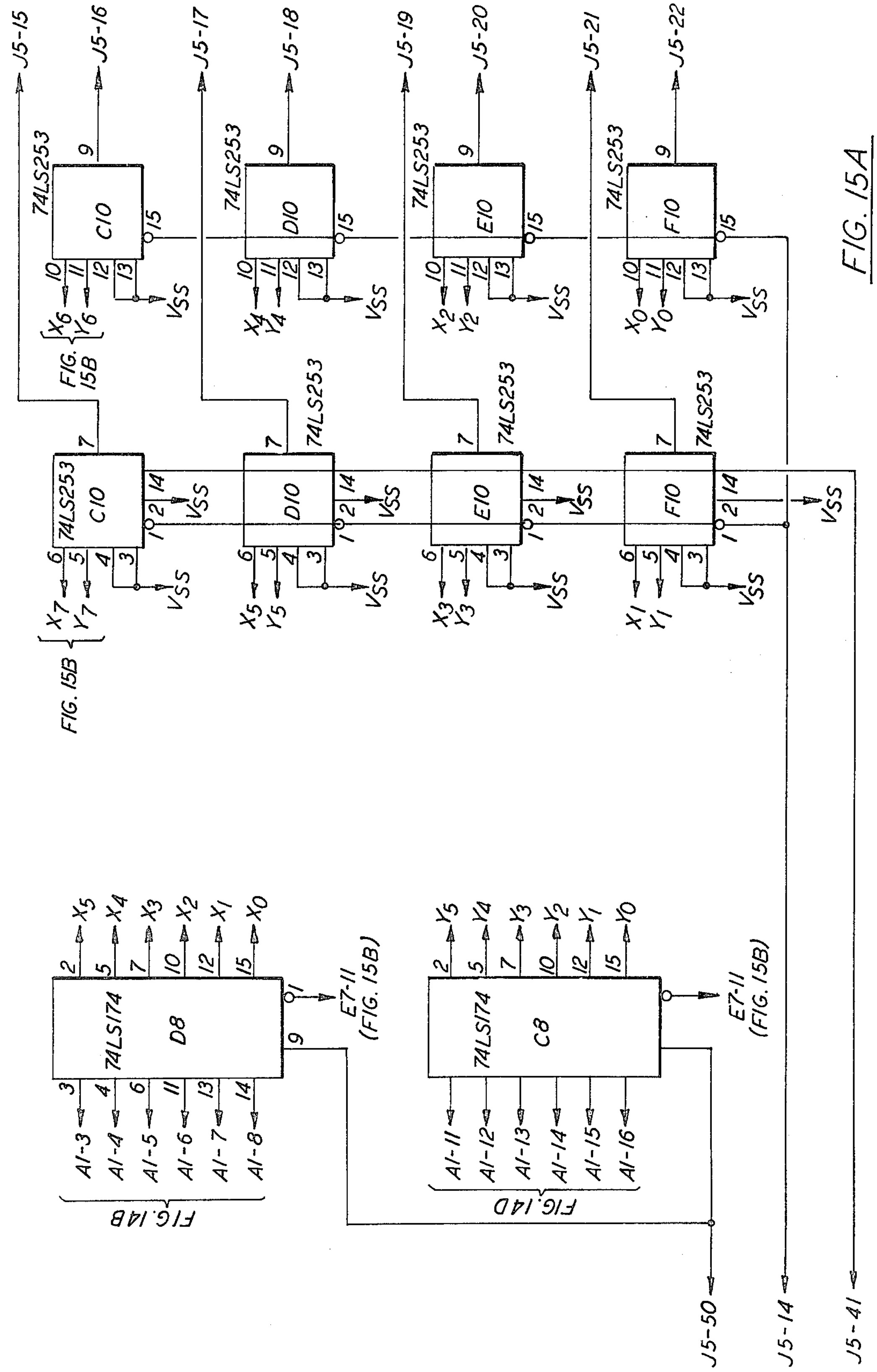
Figure 15B:
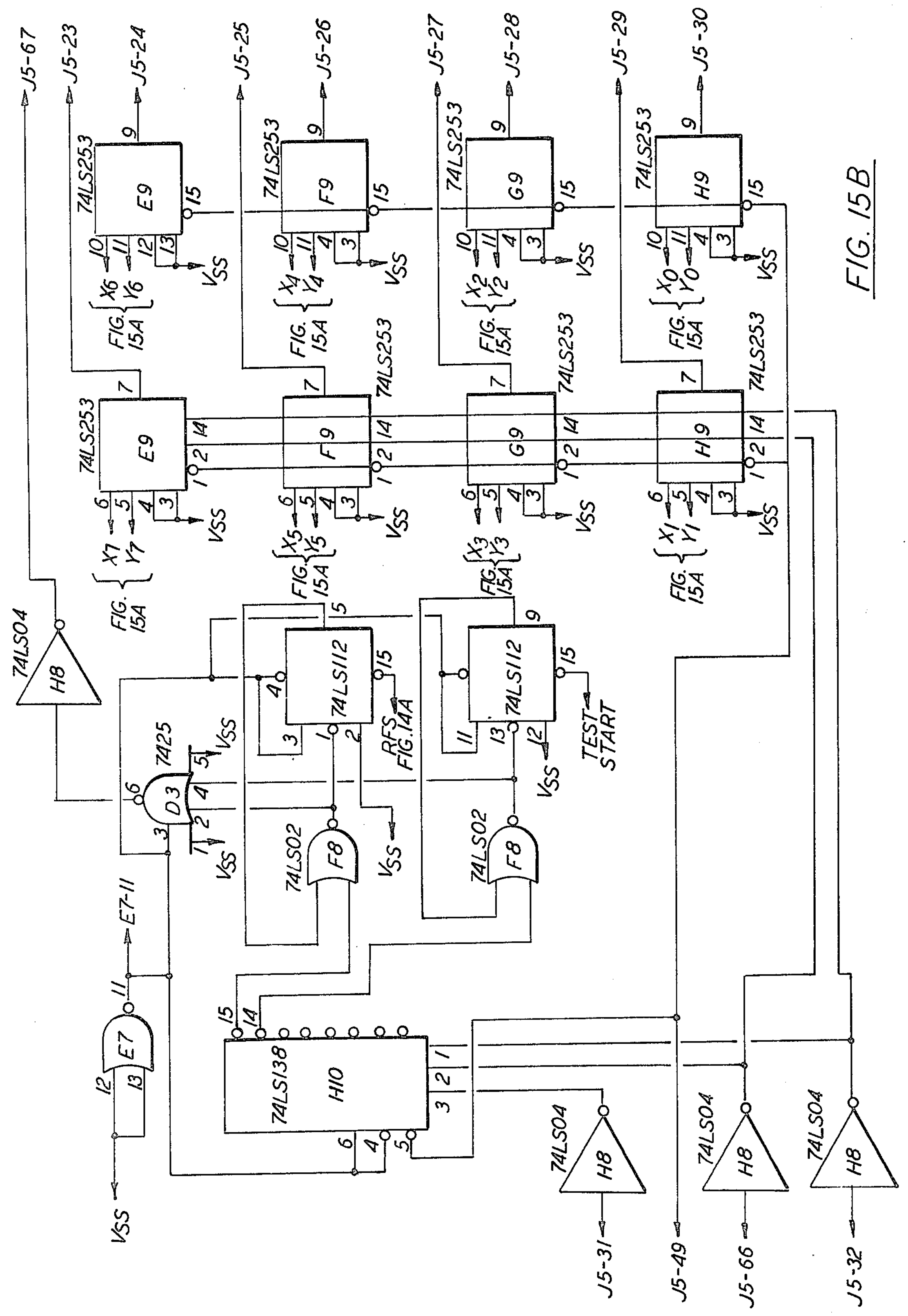
Figures 16, 16A:
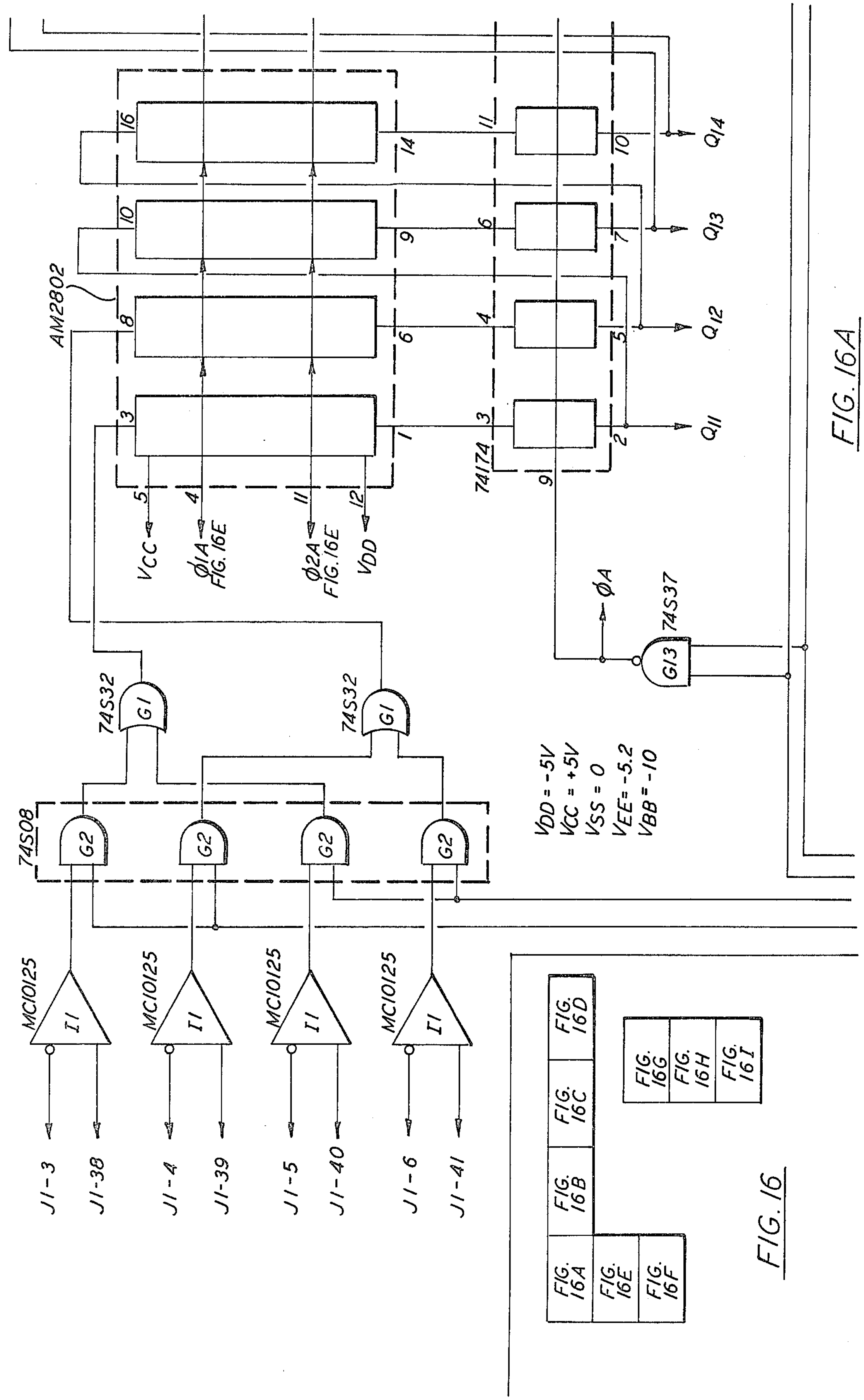
Figure 16B:
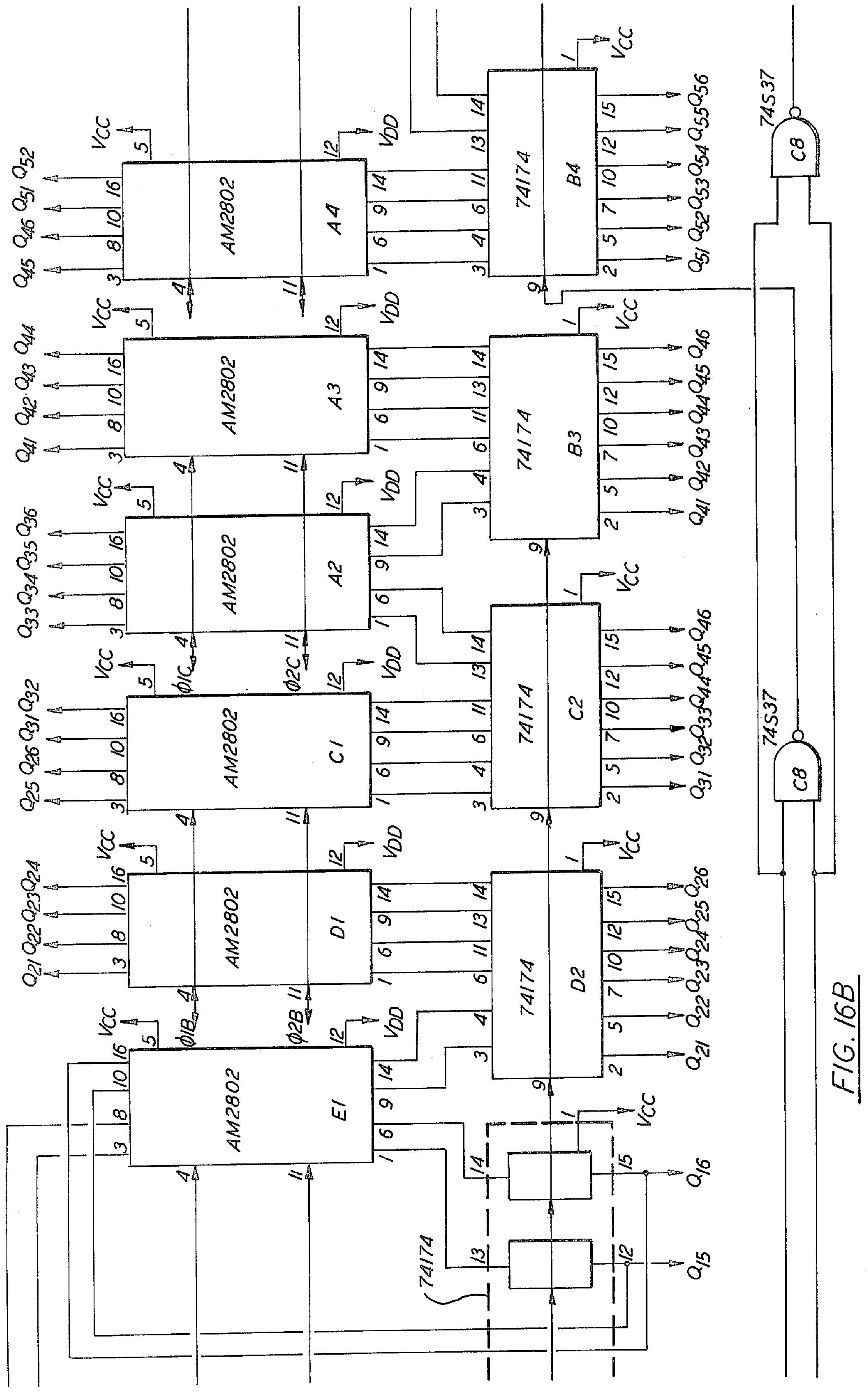
Figure 16C:
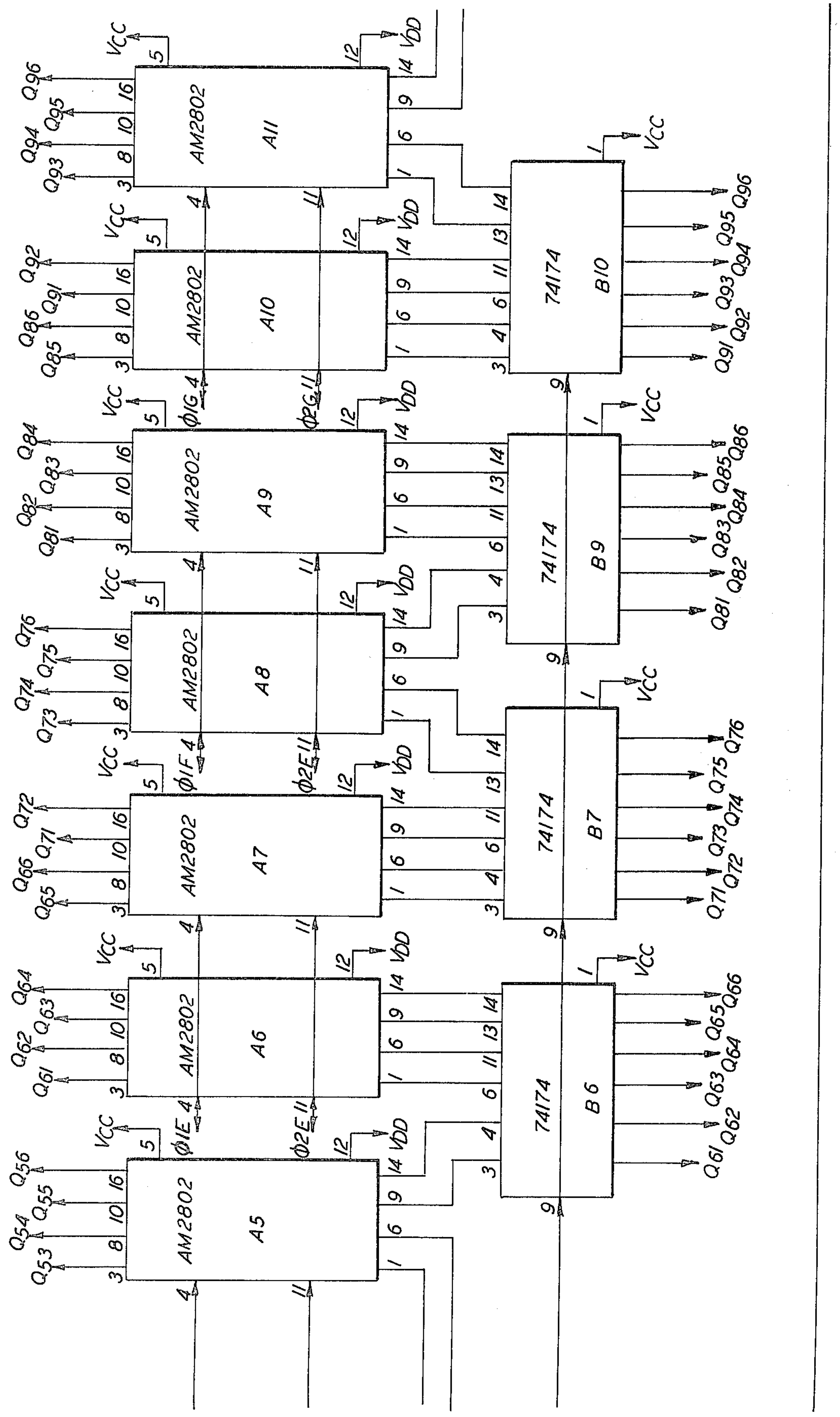
Figure 16D:
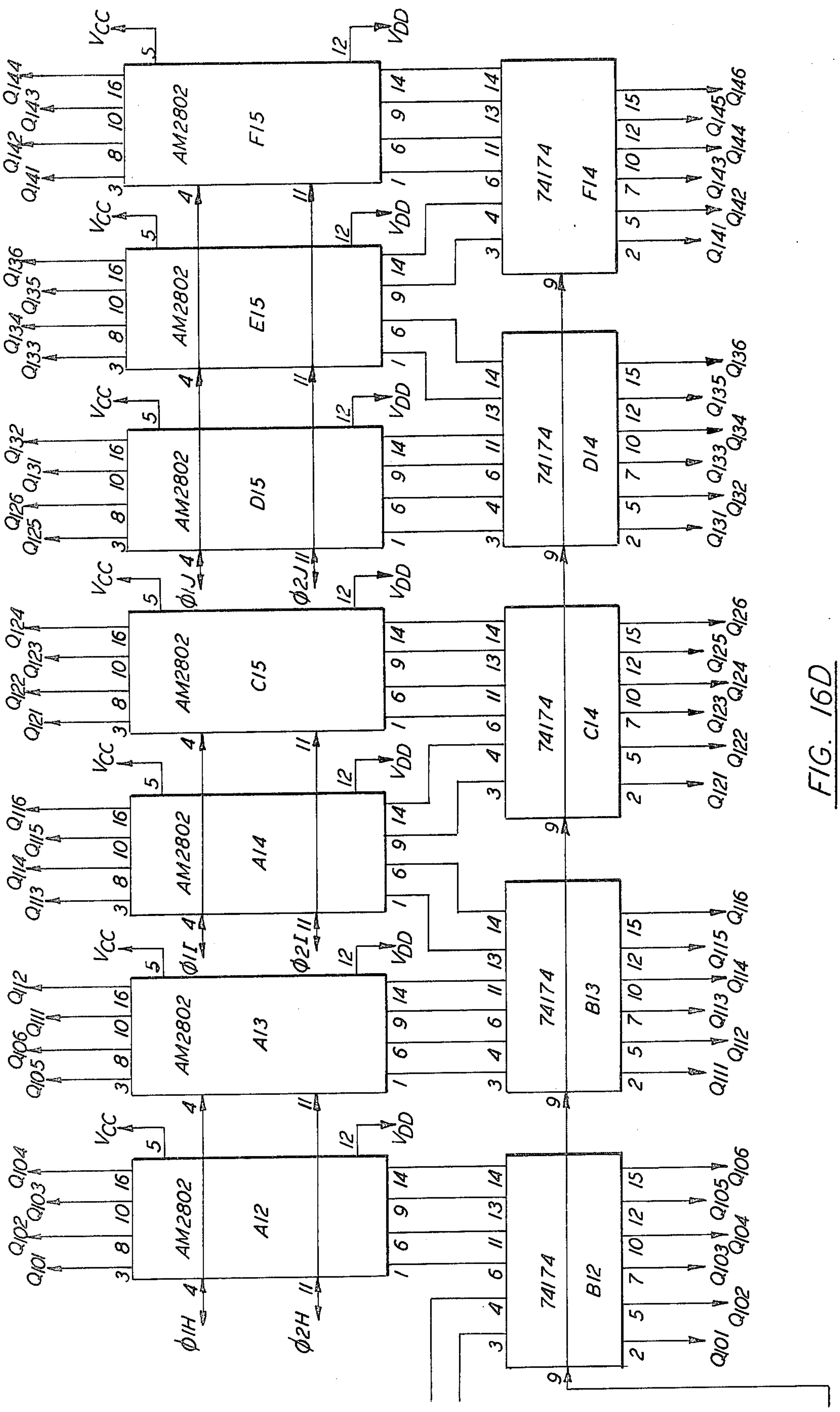
Figure 16E:
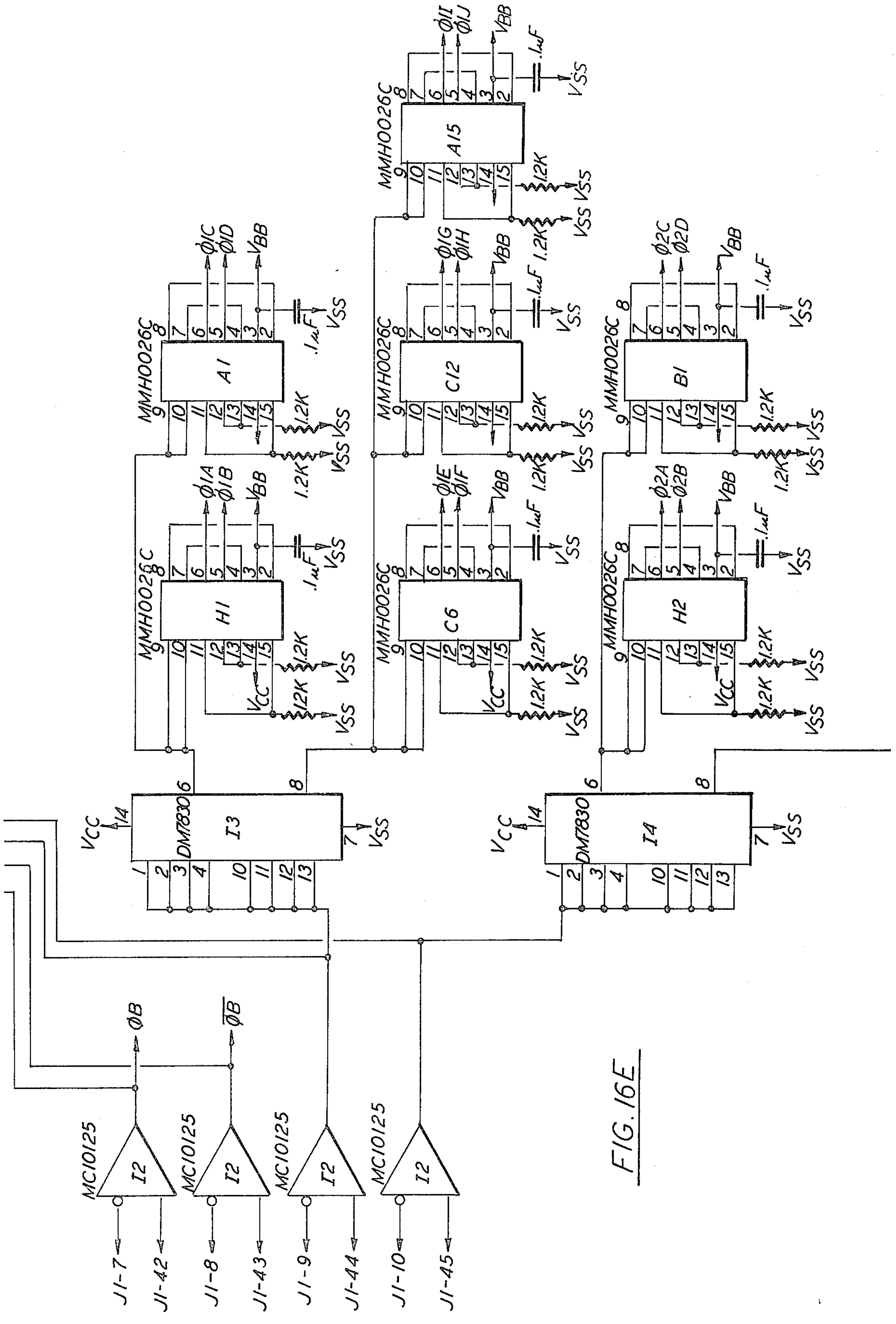
Figures 16F, 16K, 16L, 16M:
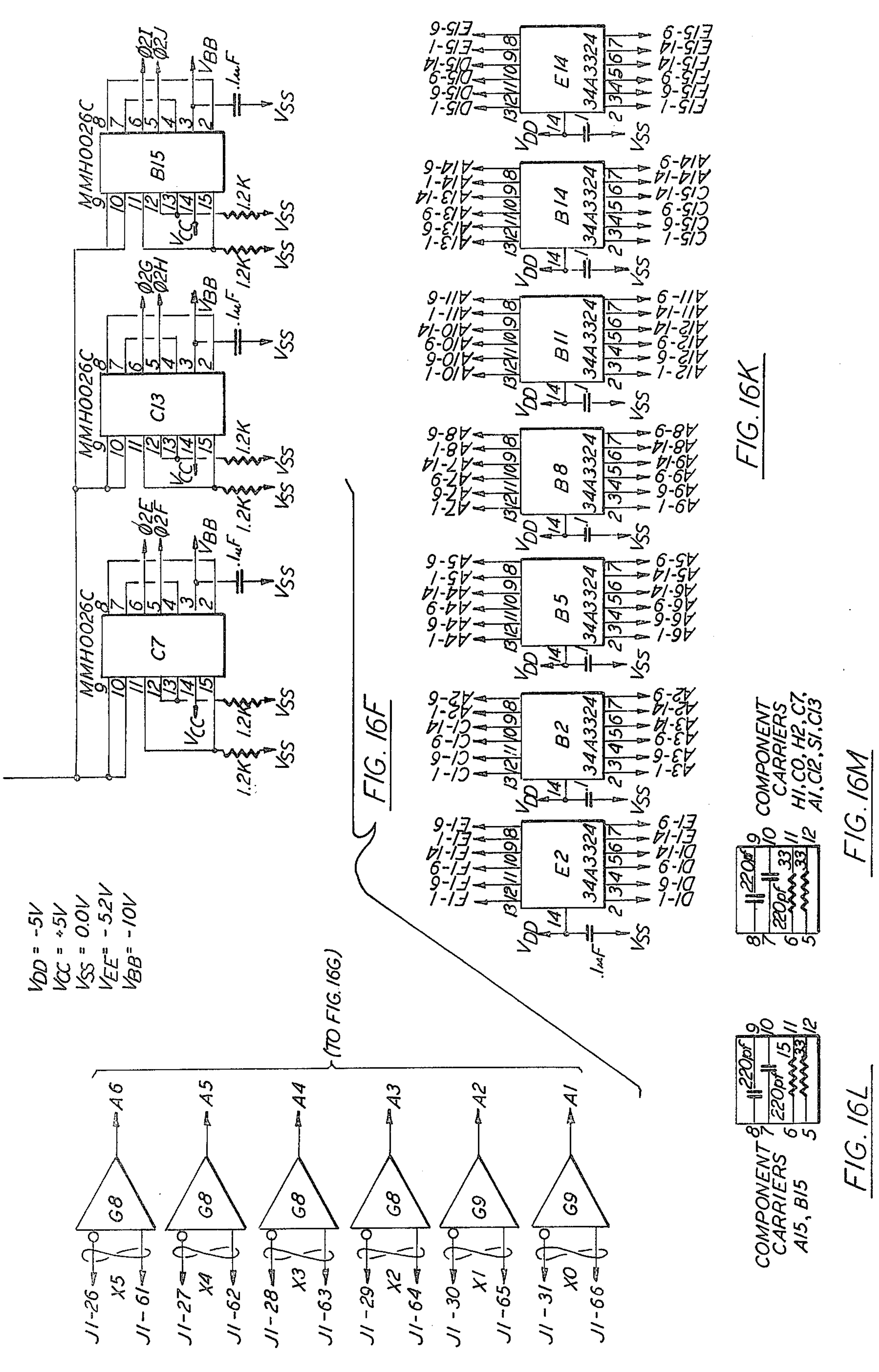
Figure 16G:
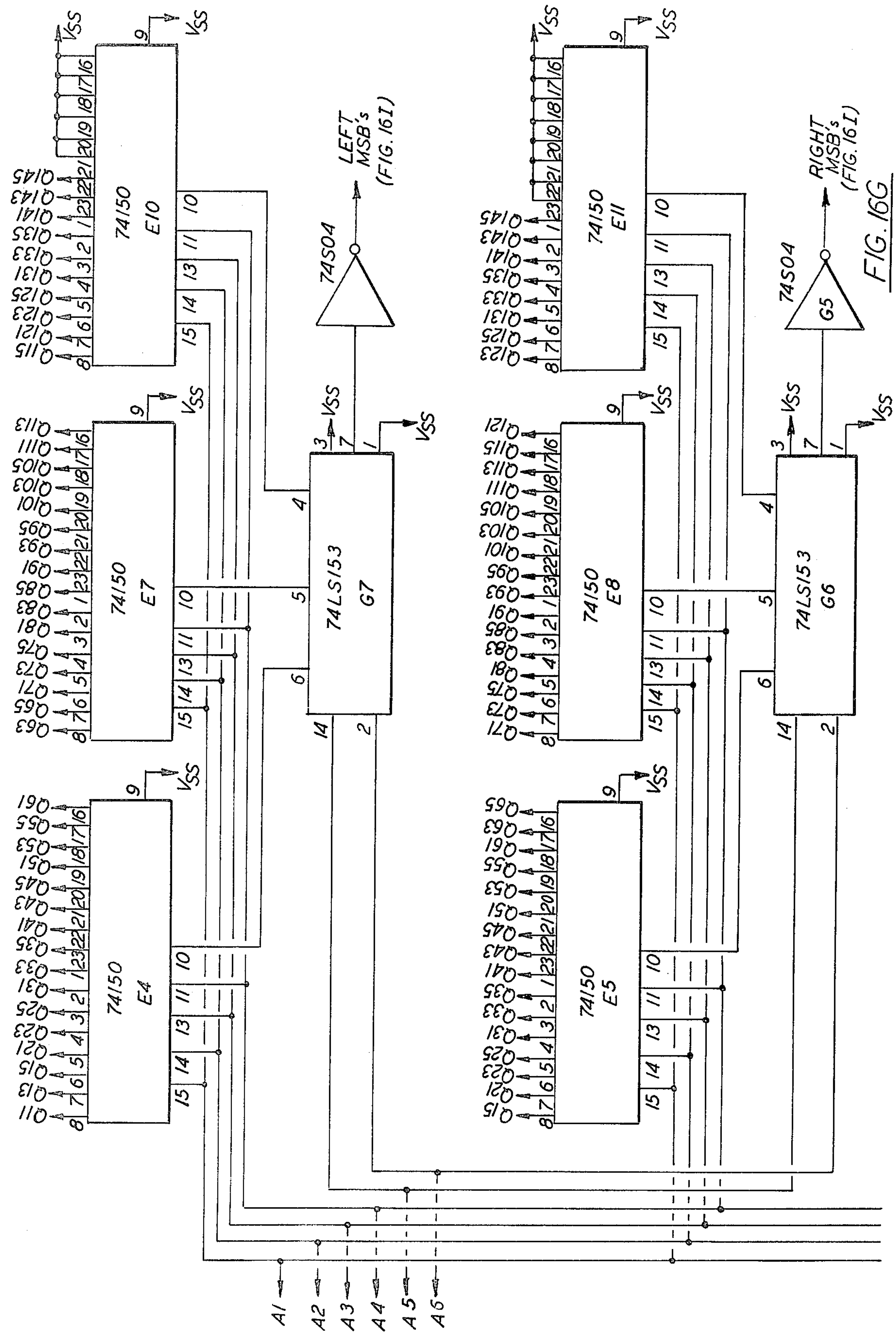
Figure 16H:
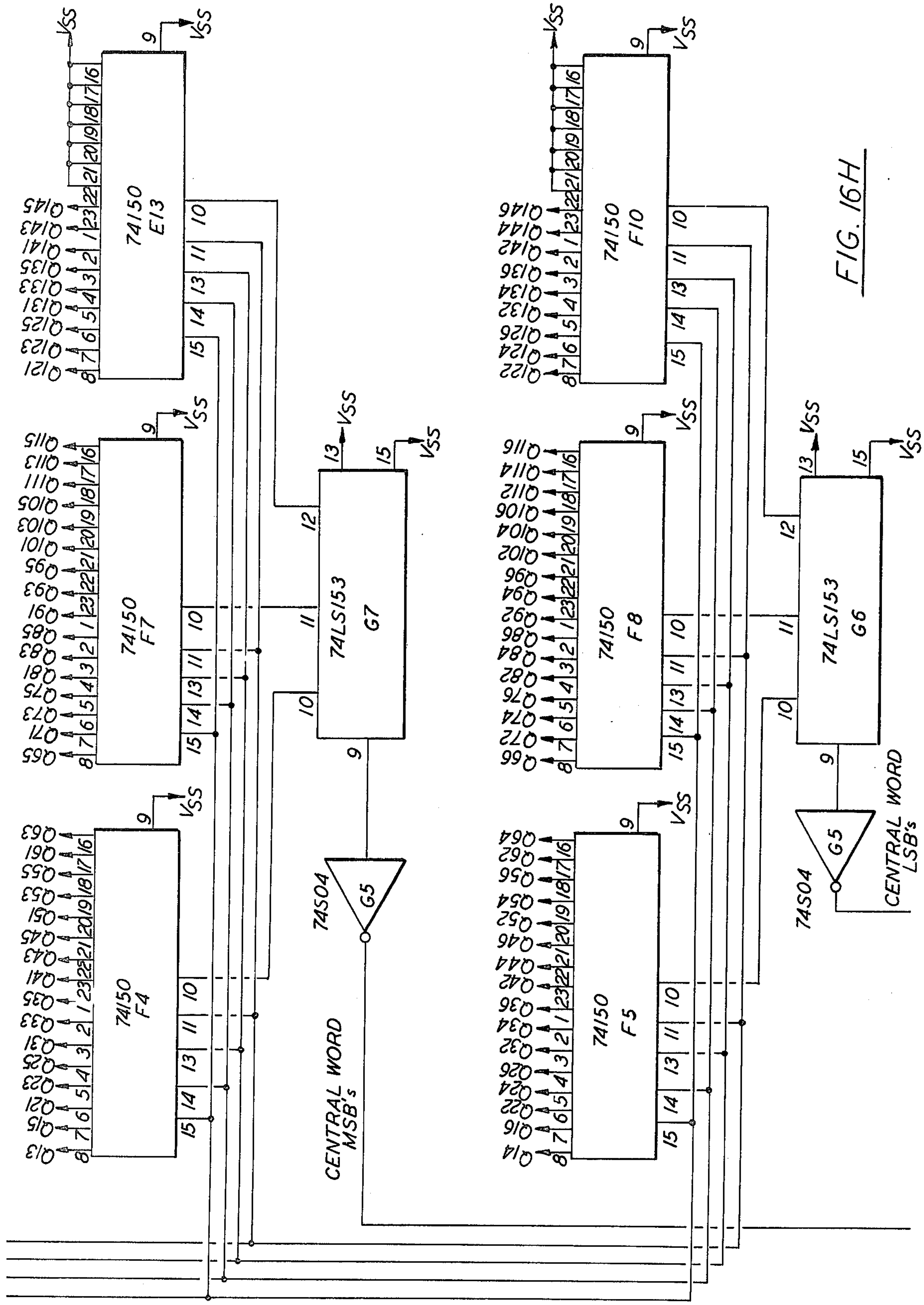
Figure 16I:
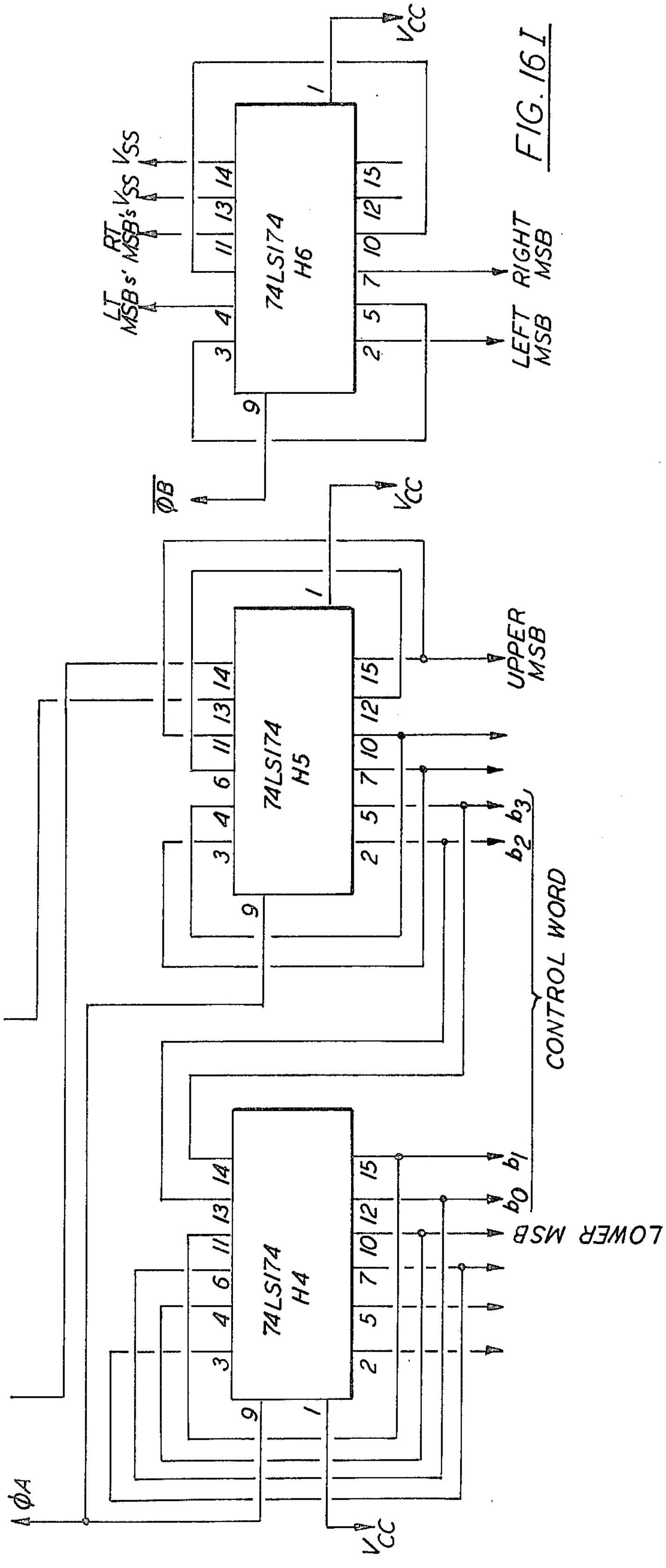
Figure 16J:
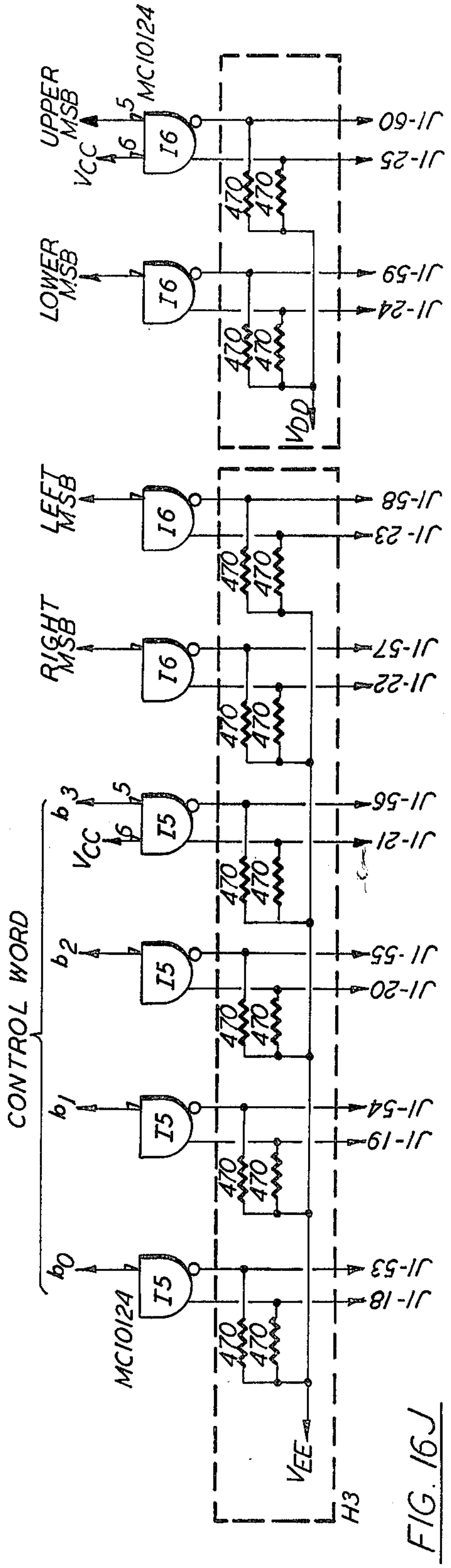

FIGS. *2a* and *2b* symbolically show the areas on the sheet for which the reflectance is measured to form picture elements referred to as pixels;

FIG. 3 shows how the detailed system diagram of FIGS. 3A and 3B are positioned to show a single channel of the printing flaw detector;

FIG. 4 is a block diagram for the image sensor of the printing flaw detector;

FIG. 5 shows diagramatically how the image sensor combines the reflectance detected by two adjacent detector elements into pixels;

FIG. 6 shows symbolically how test and reference note data is used to adjust tracking of the system;

FIG. 7 shows diagramatically the area of a note scanned by each of a plurality of channels;

FIG. 8 shows how the system wiring diagram of FIGS. 8A–8I are positioned to properly align wires interconnecting one sheet to another;

FIG. 9 shows the manner in which FIGS. 9A–9D are properly positioned to show the signal processors for the illustrated implementation of the invention;

FIG. 10 shows the positioning of FIGS. 10A–10F which depict the Clock Logic circuitry for the illustrated implementation of the invention;

FIG. 11 shows the manner in which FIGS. 11A–11K are positioned to illustrate one implementation of a corner detector according to the invention;

FIG. 12 shows how FIGS. 12A–12G are positioned to show a portion of a flaw detector according to the invention;

FIG. 13 shows how FIGS. 13A–D are positioned to show the remainder of the flaw detector;

FIG. 14 shows how FIGS. 14A–14F fit together to show part of the tracking error detector;

FIGS. 15A and 15B show a further part of the tracking error detector of the preferred embodiment:

FIG. 16 shows how FIGS. 16A–16I are arranged to show the shift register and multiplexor (SR/MUX) of the preferred embodiment.

DETAILED DESCRIPTION

Figures 1, 2A, 2B:
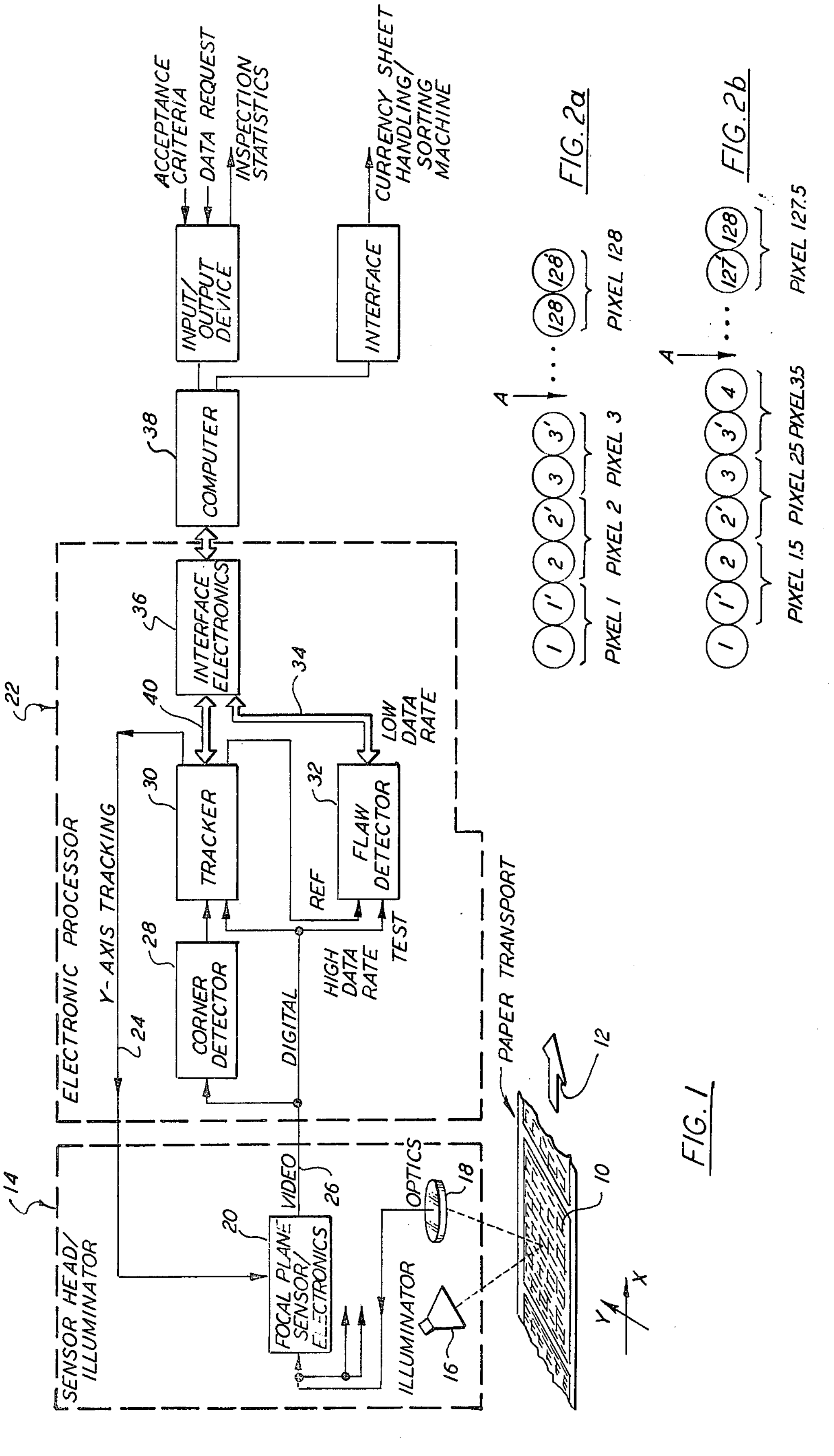
FIG. 1 is a system diagram of the components comprising a single channel of the present invention.

Referring first to FIG. 1, the system according to the present invention has a paper transport (not shown) of conventional design for moving an uncut sheet of paper 10 which was previously printed and is to be inspected by the system. The paper transport itself is not part of the present invention, however, it must move the paper sheets in the direction indicated by the arrow 12 so as to pass by the sensor head/illuminator indicated generally at 14. The only critical aspect of the paper transport itself is that it must be capable of moving sheets of paper 10 in the direction 12 at a speed correlated to the electronic circuitry coupled to the sensor head/illuminator 14. In addition, the paper transport must physically align each sheet 10 with the sensor head/illuminator 14 so that the tracking network in the system need only take care of X and Y tracking thereby permitting the system to ignore rotation of the sheet 10 with respect to an axis drawn vertically through the center of the sheets being inspected.

The sensor head/illuminator 14 has an illumination source 16 which directs light toward the surface of the paper sheet 10 being inspected. The light reflected from the sheet 10 is focused by optics 18 onto a focal plane sensor 20. A suitable focal plane sensor comprises a charge coupled device manufactured by Fairchild Semiconductor, circuit type number CCD110/11OF. Those of skill in the art, however, will recognize that this circuit type is merely representative of one circuit type usable for the stated application and that numerous other light intensity sensors could be utilized for the present application. The particular circuit type mentioned above, however, has 256 image sensor elements disposed in a straight line and appropriate optics is disposed between each sensor element and the sheet so that each sensor element "sees" an area of approximately $9.525\times10^{-3}$ cm in diameter.

Each image sensor element produces an analog output which is proportional to the reflectance of light from the area viewed thereby. In accordance with the present invention, the output of the selected adjacent image sensor elements is summed and this sum can be considered to have a centroid located substantially midway between the centers of the area viewed by each image sensor. The summed reflectance from two image sensors comprise the reflectance from an incremental area and is defined as a single picture element referred to as a pixel. This arrangement is depicted symbolically in FIG. *2a* where the circular areas labeled 1 and 1' correspond to the area on the sheet of paper viewed by two adjacent image sensors. By summing the reflectance from these two areas, the total reflectance from the area designated 1 and 1' is formed and this is referred to as pixel 1. By pairing the output from the image sensors which view the areas labeled 2 and 2' as well as 3 and 3', pixels 2 and 3 are formed. For the array used, 128 pixels can be formed in this manner.

It should be noted from FIG. 2a that the image sensors are arranged in a straight line so as to observe an area on the printed sheet which resembles a line of finite width. In accordance with the present invention, the line viewed by the image sensor elements is disposed perpendicular to the arrow labeled A which corresponds to the direction of motion of the printed page with respect to the image sensors.

In FIG. 2b, the result of performing a half pixel shift on the area viewed by the sensor head/illuminator is illustrated. By discarding the analog signal from the first sensor which "sees" the area designated 1 and by summing the analog signals representative of the reflectance from areas 1' and 2, a new pixel is formed which may be designated pixel 1.5 which has a centroid located half way between the center of area designated 1' and 2. By summing the reflectance from areas designated 2' and 3 as well as 3' and 4, pixels 2.5 and 3.5 are formed. Accordingly, by selecting which of the image sensors are to be summed together, it is possible to accomplish a one-half pixel shift in the direction transverse to the direction of movement of the sheet of paper thereby permitting the system to track very closely in the Y direction. When this is done, however, only 127 pixels are available because areas 1 and 128' are not used.

As viewed in FIG. 1, the control signal which causes the focal plane sensor electronics 20 to select a given pair of image sensors for summing is transmitted from the electronic processor 22 by way of the line 24. The mechanism which developes the signal transmitted over the line 24 is described later in greater detail.

Although not shown in FIG. 1, the system may include a second image sensor for scanning the printed surface of a reference note. The reference note video is transmitted over the line 26 to the electronic processor 22. The video information for the test note from the focal plane sensor electronics 20 is also transmitted over a line 26 to the electronic processor 22. The area scanned by each of the scanners for the reference and the test notes is generally different for any given scan. However, the data from the reference note is buffered thereby permitting the electronic processor 22 to compare real time data received for the test note with buffered data for the reference note. The electronic processor 22 can correlate the test note data with the reference note data in a manner described later in greater detail.

Internal to the electronic processor, the video signals transmitted over line 26 are coupled to a corner detector 28, a tracker 30 and a flaw detector 32. The corner detector 28 responds to the video data on line 26 by adding each pixel produced during one scan of a note to the next pixel occurring during the same scan of the note. When the sum of these two pixels in the scan direction falls below a given threshold, the top edge of a note is located and the comparator generates an output signal which initializes the tracker 30. The corner detector is also utilized to reinitialize the tracker whenever the sensor head/illuminator passes over a region of the note having no detail.

Once initialized, the tracker 30 is operative to adjust the incoming video data with respect to stored data for the reference note in the X direction, which corresponds to the direction of paper travel, as well as in the Y direction, which is transverse to the direction of paper travel. This permits the system to adjust its operation so that substantially identical scan lines from the test and the reference note are available for comparison at one time. It also permits corresponding pixels in each scan line to be available at the same time. The test note is then compared with the reference note by the flaw detector 22. This comparison is accomplished by comparing corresponding pixels from the reference and the test note which appears simultaneously at the input to the flaw detector 22. Whenever the difference in reflectance between these two pixels exceeds a predetermined value, one exceedance is said to have occurred which indicates a very small flaw has been detected. The flaw detector then calculates the number of exceedances in an area of 100 by 2 pixels and 100 by 4 pixels. If the number of exceedances in any of these given areas exceeds a threshold, a flaw indication is transmitted by way of the data communications bus 34 to the interface electronics 36 which indicates the exceedance and the area in which the exceedance has occurred to an external computer 38 which keeps track of the number of exceedances over each note. By entering an acceptance criterion into the computer 38, the operator is able to selectively control the level of exceedances occurring ovr the note being checked before the note is rejected by the system.

A communications bus 40 is provided between the interface electronics 36 and the tracker 30 for transmitting control information such as thresholds, timing information etc., from the computer 38 to the tracker 30. In this manner, the operator can adjust the operation of the tracker so as to make it perform in accordance with note acceptance criterion established in connection with system operation.

Referring now to the more detailed functional block diagram of FIGS. 3A and 3B which fit together as shown in FIG. 3, one module of the system is shown. For a system designed to scan a note the size of a United States Federal Reserve Note, two such modules are required. Five additional modified modules are also required. These modified modules derive their synchronization from one of the two modules of the type shown in FIG. 3 and these do not require the synchronization circuitry of the corner detector 28 or the tracker 30.

Each channel, one being shown in FIGS. 3A and 3B, has a pair of linear detector arrays 101 and 102 of the circuit type previously described. These array pairs 101 and 102 are positioned so that they will scan narrow strips respectively on the reference note and the test note in a direction transverse to the direction each note is moved relative to each detector array. A lens 103 (shown separately for ease of illustration) is positioned so that the plane containing the currency note (object plane) is imaged onto the plane containing the detector array (image plane). The conjugate distances (between lens and image plane and lens and object plane) are selected to produce the desired magnification, which for a given detector site determines the size of the picture element in the object plane. The detector arrays 101 and 102 "see" detail on the currency notes in the areas designated 104 and 105.

Each linear detector array 101 and 102 consists of a plurality of individual detector sites arranged in a line. For the particular circuit type already described, each detector array consists of a 256 element charge coupled devices (CCD). The term charge coupled device refers to the manner in which photoelectron charges developed at the detector sites are manipulated to generate a serial output in which the amplitude of each picture element (pixel) is proportional to the light energy incident on the two detector sites during a time interval referred to as the integration period. The manufacturer specified operation is described below in greater detail with reference to FIG. 4.

Both the reference and the test arrays 101 and 102 respectively are uniquely used to reduce the minimum tracking correction in the direction of scan from one pixel to one-half pixel. A photoelectron charge is developed at each of the detector sites during an integration period. Each charge packet is proportional to the amount of light incident on the detector site. At the end of the integration period, the detector sites are emptied of their charge packets during a short interval of time in a three step process. During step one, the charges in all even numbered detector sites are emptied into an analog shift register 211 by means of a control voltage $\phi_{xB}$ applied to a transfer gate 210 and two phase clock voltage $\phi_{1B}$ and $\phi_{2B}$ applied to the analog shift register 211. The effect of the control voltages is to generate electric field gradients that guide the flow of charge within the multiwire semi-conductor materials deposited during fabrication of the detector.

During step two, the charge in all odd numbered sites is emptied into an analog shift register 209 by means of control voltage $\phi_{xA}$ and to phase clock $\phi_{1A}$ and $\phi_{2A}$.

During the remainder of the line scan period (step three), the detector sites begin to accumulate a new photolectron charge while the two phase clocks $\phi_{1A}$, $\phi_{2A}$, $\phi_{1B}$, and $\phi_{2B}$ move the charges already in the shift registers 209 and 211 through the output gate 212 and the charge detector preamplifier 213, which alternately services charge packets from shift registers 209 and 211. The result is a video output in which the voltage levels proportional to charge packets generated at detector sites 1 to 256 appear sequentially. The reset voltage $\phi_R$ restores initial conditions between processing of successive charge packets. The phase clocks are related by the following logical equation:

$$\phi_{1A}=\bar{\phi}_{2A}=\phi_{1B}=\bar{\phi}_{2B}$$

This equation implies that phase two of each two phase clock is obtainable from phase one by inverting it.

With respect to the operation of the arrays 101 and 102 in accordance with the circuitry of the invention which is somewhat different from the manufacturer specified mode of operation, the steps involved in transferring the charge packets from the detector sites to the shift register 230 are illustrated in FIG. 5. First, all the even numbered charge packets are transferred from the even numbered detector sites 240 to the shift register 230. Then the charge packets are shifted down one position in the shift register 230. Finally, the charge transfer is completed by shifting all the odd number charge packets into the shift register locations already occupied by the even numbered charge packets. Hence, the first location in the shift register contains the sum of charge packets 1 and 2, the second is empty, the third contains charge packets 3 and 4 etc. The combined charge packets are now ready to be moved through the output gate and into the charge detector preamplifier. The sequence of charge transfer by which adjacent charge packets are combined is illustrated in FIG. 5 by the arrows labeled a, b and c.

It is evident that the first pixel (picture element) represents the energy accumulated on the detector sites 1 and 2 during the integration period. Hence, the centroid of the area is halfway between detector sites 1 and 2. The Y-axis tracker 114, which makes registration correction in the direction of scan includes provision for shifting the centroid of all pixels a distance equal to one-half the center-to-center spacing of the pixels. This is accomplished by reversing the sequence for shifting charge packets out of the detector sites. Specifically, the odd numbered charge packets are moved into the shift register first and then the even numbered charge packets are combined with the odd numbered ones. The charge packet accumulated at detector site number 1 and 256 is lost and the first pixel out of the array constains the charge packets accumulated at the detector sites 2 and 3. The second pixel contains the charge packets accumulated at detector sites 4 and 5, etc. By comparison with the previous situation in which the even numbered charge packets were transferred out first, it is apparent that the centroids of the areas on which the charge for corresponding pixels was accumulated have been shifted in a direction opposite to charge motion through the shift register by an amount equal to one-half the dimension of a pixel.

The mechanism for implementing the one-half pixel shift is shown in FIG. 3. The position of the half pixel shift switch 115 is controlled by the least significant bit (LSB) of the six bit Y axis control command. When the LSB is 1 (high), the switch is in position A. The two phase clock for the reference and test array are the same and the half pixel shift is not active. When the LSB is 0 (low), the switch 115 is in position B and the half element shift is activated. It should be noted that the inverting amplifier 116 makes $\phi_2=\bar{\phi}_1$ and the inverting amplifier 117 inverts both phase clocks when the switch is moved from position A to position B. The analog outputs at the reference and test arrays are respectively converted into 4 bit digital words by means of the analog-to-digital converters 118 and 119.

Initialization of the system for scanning strips including corners of the notes is accomplished by means of a corner detector 220. The reference and test arrays are positioned so that the reference note array always "sees" the corner of the border on the reference note 121 before the test note array "sees" the corner of the border on the test note array 222. Hence, the corner of the reference note is detected first and the differential coordinates of the corners are measured as described below.

The output of the reference note A/D converter 118 is applied to a digital delay 123, which delays the 4 bit pixel word by 1 pixel clock period. The adder 124 sums the delayed pixel word with the current pixel word. The comparator 125 compares the sum of the two contiguous pixels in the scan direction with a threshold. This condition causes the comparator to generate an output that is applied to AND gate 126. A second input to this AND gate 126 is supplied by a corner detector logic enable circuit 127, which generates an output during a time interval in which the corners of both reference and test notes may be expected to be scanned. The time interval is established from a course indication of sheet position based on a sheet edge detection and velocity measurement system (not shown).

When both inputs to the AND gate 126 go high, an output is generated that enables the pixel clock counter 128 for counting the pixel clock. The count is stopped at the beginning of the next reference line scan period by a Reference Start pulse which comes from a system master clock every 40 milliseconds. The count is then maintained in the Pixel Clock Counter 128.

The output of AND gate 126 enables a line scan counter 129 which counts the line clock which produces one pulse for each line scan. This counter 129 is used to determine how many line scans occur between locating a corner of the reference note and locating a corner on the test note.

The AND gate 133, in conjunction with the one pixel clock period delay 130, the adder 131 and the compare circuit 132, signals corner detection on the test note in a manner identical to that described above in connection with the reference note. Its output, when a corner of the reference note is "seen" by the test array 102, enables the pixel clock counter 128 to count down from the value stored therein until stopped by the next Reference Start pulse. Ideally, the number in the pixel clock counter 128 at the end of the countdown should be zero thereby indicating that the corners of the reference and the test note have fallen on the same pixel number on their respective detector arrays, i.e., the notes are registered in the direction of scan (Y direction). If a registration error exists, however, the number in the pixel clock counter 128 indicates the registration error in pixels, i.e., multiples of the center-to-center distance between pixels.

The output of the AND gate 133 also stops the line counter 129. The number remaining in the counter is equal to the number of line scans between corner detection on the reference note and corner detection on the test note. Ideally, this number should be less than the maximum registration error the system is designed to accommodate in the direction of motion (X direction). The registration error is measured in units of line pitch equal to the center to center spacing of scan lines in the object plane. If a line registration error exists, the number will be greater than zero. The output of pixel clock counter $I_Y$ and the line scan counter $I_X$ respectively indicate the Y and X axis registration differences and are used to initialize the Y and X axis tracker hardware respectively in a manner indicated below.

As indicated above, the system is capable of adjusting registration within certain bounds. If a corner is detected on the test note where the number of line scans following the corner detection on the reference note is greater than the registration difference correction capability of the system, the system will not operate correctly and will cause a large number of flaws to be indicated. The flaw detector operation is described below in greater detail.

In a system where the reference array is in a memory, corner detection on the reference note is not required as the data is at a known location. The system needs only detect the leading edge on the test note and then start comparing data with the reference note data in memory. Thus, the initial value for $I_x$ need not be determined. The corner detector operates in the same manner with respect to Y axis tracking, however.

The output of the reference array analog-to-digital converter 118 is applied to a series of shift registers 135 within an X-axis tracker 134. The shift registers 135 are capable of storing at least M lines of data from the reference array where M represents the total dynamic range of the X-axis tracker 134 and, for the preferred embodiment of the present invention, M is equal to 42. Accordingly, 42 lines, each containing 128 four bit words, are available to a multiplexer 136 which is controlled by a 6 bit word generated in the tracking error detector 137 and selects the information from selected ones of the 42 lines stored in the shift registers 135. The output of the multiplexer 136 is four data streams derived from 3 lines of data stored in the shift registers 135. One of the outputs ($S_R$) contains 128 four bit words which ideally is identical to the data received from the test array 102 when the system is properly synchronized and the test and reference notes appear to be identical. The three remaining outputs from the multiplexer 136 comprise the most significant bit (MSB) for the same word in three consecutive lines stored within the shift register 135. The MSB for the line labeled (N−P) is redundant with the MSB for the output labeled $S_R$. The most significant bit for the word in the preceeding line is output over a line labeled (N−P+1) and the most significant for the same word in the succeeding line is output over a line labeled (N−P+1). These three most significant bits are used in the tracking error detector 137 whereas the output line labeled $S_R$ is used in the flaw detector 138 in a manner described hereinafter in greater detail.

The mechanism for generating both the X and the Y axis control commands is contained in the tracking error detector 137. The operation of the tracking error detector will be described below in connection with an assumed error of 1.5 pixels in the X direction and describing the manner in which the assumed error is corrected. The explanation will be more readily understood, however, if the following generalizations are kept in mind. The validity of these generalizations has been established either theoretically, by design, experimentally, or a combination of these methods.

a. For the purposes of tracking (i.e., bring to notes into registration), currency notes may be regarded as consisting of a configuration of lines defining edges that separate areas that are either black or white depending on whether they have or have not been inked.

b. The black and white areas are indicated by 0 or 1 respectively in the most significant bit of a 4-bit word that describes the reflectance of the pixel.

c. The smallest dimension of the black and white areas is at least twice the size of a pixel.

d. The number of pixels in a scan line is limited so registration can be accomplished by making only translational corrections and the residual error due to failure to correct for rotational alignment is acceptable.

e. By definition, registration is accomplished by bringing all edges on test and reference notes into coincidence.

f. The number of tracking error measurements is equal to the number of pixels on a currency note. Each channel pair generates a new pixel on both reference and test note every pixel clock period, hence a measurement of tracking error is made every pixel clock period.

g. Each measurement of tracking error can only assume one of three values: −1, 0, +1.

h. The presence of an edge is indicated by a mismatch in the MSB's in the reference note data array illustrated in FIG. 6. More specifically a horizontal edge is indicated by a mismatch between upper and lower MSB's while a vertical edge is indicated by a mismatch between left and right MSB's.

i. The ideal error characteristic (i.e., in the absence of all equipment errors) is linear between −1 and +1 pixel and saturates beyond these limits. Hence, for example, an error of +2.5 pixels would be measured as an error of +1 pixel. The linearity between −1 and +1 is a result of statistical averaging induced by random noise. For example, an error of +0.5 pixels will produce an error of +1 50% of the time.

j. Within the linear range of the error sensor (i.e., for errors less than 1 pixel) the two components of error are given by:

$$E_X = A\frac{(M_{x,-1}) - (M_{x,+1})}{M_{r,x}}$$

$$E_y = A\frac{(M_{y,-1}) - (M_{y,+1})}{M_{r,y}}$$

where

- $E_x$, $E_y$ = x and y compontens at error respectively
- $A$ = sumation over an area
- $M_{x,-1}$ = a function that is 0 or 1 depending upon whether there is a match or mismatch respectively between the MSB of the test note pixel and the left reference note pixel (see FIG. 9).
- $M_{x,+1}$ = a function that is 0 or 1 depending upon whether there is a match or mismatch respectively between the MSB of the test note pixel and the right reference note pixel (see FIG. 9).
- $M_{r,x}$ = a function that is 0 or 1 depending upon whether there is a match or mismatch respectively between left and right reference note pixels (see FIG. 9).
- $M_{y,-1}$ = a function that is 0 or 1 depending upon whether there is a match or mismatch respectively between the MSB of the test note pixel and the upper reference note pixel (see FIG. 9).
- $M_{y,+1}$ = a function that is 0 or 1 depending upon whether there is a match or mismatch respectively between the MSB of the test note pixel and the lower reference note pixel (see FIG. 9).
- $M_{r,y}$ = a function that is 0 or 1 depending upon whether there is a match or mismatch respectively between upper and lower reference note pixels (see FIG. 9).

k. Within its linear dynamic range the tracker loop is analogous to a first order, real time, positioning servo. In such a real time servo the independent variable is time and its transient performance is described by the time required to null out 67% of an initial error. In the currency inspection system the parameter analogous to time is edges, and its performance (within the linear range of the detector and neglecting quantization effects) is indicated by the number of edges required to null out 67% of an initial error.

Based on these generalizations, operation of the X-axis tracker 134 in combination with the tracking error detector 137 is as follows. Generation of the X-axis tracker command which is transmitted from the tracking error detector 137 to the multiplexer 136 requires the most significant bit of a test note pixel and the most significant bit (MSB) from the same pixel position from scan lines N−P−1 and N−P+1 of the reference note stored in the shift register 135, i.e., in the preceeding and succeeding rows respectively of reference document pixels. These lines lie respectively to the right and to the left of the line presumed to contain the reference pixel corresponding to the current test pixel. The X tracking aspect of the tracking error detector 137 is enabled only when the MSB from the pixel positions presented thereto from scan line N−P−1 and N−P+1 are different. As depicted in FIG. 6, the MSBs shown are located in the shift register at the indicated positions relative to the pixel under test. The digital delays 139, 140 and 141 introduce equal delays of one pixel clock period in each of the three input lines to the tracking error detector 137. The output of each digital delay 139, 140 and 141 pass through a timing gate 42 which inhabits the inputs from passing therethrough except during a "time window" which allows the central 100 words from the reference note to pass through the gate 142. After passing through the time gate, the most significant bit of the right and the left pixels appear at the input to EXCLUSIVE-OR gates 143 and 144 which compare each of them respectively with the most significant bit of the test pixel. Depending on whether there is a match or not, the EXCLUSIVE-OR gates 143 and 144 generate a logic zero or a logic 1 respectively. The output of the EXCLUSIVE-OR gates 143 and 144 then appears respectively at the positive and the negative inputs of an up-down modulo N counter 145. This counter 145 is designed to overflow whenever the magnitude of the count exceeds $K_x$, which is a presetting inversely proportional to the tracker loop gain and equal to 128 is the preferred embodiment of the invention. Any overflow or underflow pulse formed by the modulo N counter 145 is transmitted to an integrator 146 which acts as a pulse counter and is preset by a value $I_x$ by the corner detector 120. It counts up in response to overflows and down in response to underflows and produces a 6-bit word used by the multiplexer 136 to select 3 of 42 stored scanned lines found within the shift register 135 which form the inputs to the tracking error detector 137.

The sequence of events for correcting an initial error of 1.5 pixels in the X direction is now described. The function of the EXCLUSIVE-OR gate 147 and the modulo N counter 148 will be described later since they are intended to improve performance but are not essential to the basic operation of the tracker.

Assume for the moment that the gain factor $K_x$ is set to 128 which means modulo N up/down counter 145 will overflow or underflow after 128 pulses are received from EXCLUSIVE ORs 143 and 144 respectively, assuming only increment or decrement pulses are produced consecutively. Since the assumed error of +1.5 pixels is greater than one pixel, the system will respond as though there were an error of one pixel. The effect of EXCLUSIVE-OR gate 143 is to produce a pulse for incrementing the modulo N counter 145 each time the MSB for the test note pixel is different from the MSB of the pixel in scan line M−P−1. Parenthetically, if there were a 1.5 pixel error in the negative direction, the EXCLUSIVE-OR gate 144 would cause the modulo N counter 145 to decrease by one count for every difference between the MSB for the test note and the corresponding pixel in line M−P+1. When the value for $K_x$ is set to 128, the modulo N counter 145 produces, for the present example, an overflow every time 128 differences are detected as indicated by the signal at the output of EXCLUSIVE OR 143. The overflow is transmitted to the integrator 146 which increments a sum stored therein. The integrator 146 acts like an accumulator.

The effect of incrementing the value stored in the integrator 146 is to cause the multiplexer 136 to output a different set of three lines of data from those lines previously output which are shifted by one line in the direction that reduces the X-axis error. Since the pitch of the scan lines is one-half pixel, i.e., each scan line covers an area one half pixel wide, the X-axis error is one pixel after the integrator 146 has been incremented once. Again, for each difference in the X direction where a positive pixel error still remains, the EXCLUSIVE-OR gate 143 generates a pulse at its output for incrementing the modulo N counter 145 which will again overflow after having detected 128 differences. This causes the integrator 146 to be incremented. Thereafter, the remaining X-axis control command is reduced to one-half pixel error. When the modulo N counter 145 overflows after 128 further differences are detected, the error is reduced to zero and synchronism is achieved in the X direction.

The tracking error detector 137 has a limit in the steady state. Specifically, it will oscillate with an amplitude of a one-half pixel error with the average value for the magnitude of the tracking error being ideally less than one-half pixel. The function of the EXCLUSIVE-OR gate 147 and the modulo N counter 148 which is designed to overflow after 4$K_x$ pulses are counted, is to inhibit the tracking adjustment whenever the error is less than one-quarter pixel. Without the EXCLUSIVE-OR gate 147 and the modulo N counter 148, the discrete size of the error correction (one-half pixel) causes an increase in tracking error whenever the system attempts to correct for an error of less than one-quarter pixel.

For example, using the same reasoning applied above, the modulo N counter 145 overflows after 128 differences are detected if the error is one-quarter pixel. An attempt to correct an error of one-quarter pixel results in an error of one-quarter pixel, however, an attempt to correct a one-eighth pixel error results in an error of three-eights. Clearly, an attempt to correct errors of less than one-quarter pixel results in an increase in error because of the discrete size of the error correction. Hence, the theoretical error can be reduced by a factor of two by inhibiting any attempt to correct errors of less than one-quarter pixel.

The above objective is accomplished as follows. The EXCLUSIVE-OR gate 147 compares the left and the right pixel in the reference data array as depicted in FIG. 6. The modulo N counter 148 is incremented each time the left and the right pixel are not alike. The counter 148 is reset whenever the modulo N counter 145 overflows. Whenever the counter 148 overflows on reaching a count of 512 (or four times the overflow number of counter 145), it resets the counter 145. It can be shown that since the counter 148 overflows after a pulse count four times that causing counter 145 to over or underflow, a constant error of less than one-quarter pixel will always cause the modulo N counter 148 to overflow first and reset the counter 145 so that the counter 145 will never overflow. For an error greater than one-quarter pixel, the counter 145 will always overflow and the counter 148 will never overflow. Based on the foregoing, it is evident that the EXCLUSIVE-OR gate 147 and the modulo N counter 148 accomplish the desired result of inhibiting the tracker from making any tracking correction whenever the tracking error is less than one-quarter pixel.

A portion of the tracking error detector 137 is used to generate a Y-axis command which utilizes the upper and the lower pixel shown in FIG. 6 for the reference array and the MSB of the test pixel in a manner directly analogous to the circuitry using the left and right pixel for generating the X-axis command. A two pixel clock period delay 149 enables an EXCLUSIVE-OR gate 150 to compare the MSB of the test pixel with the upper reference pixel and EXCLUSIVE-OR gate 151 to compare the test pixel with the lower reference pixel. The upper mismatch signal at the output of EXCLUSIVE OR 150 and the lower mismatch signal at the output of EXCLUSIVE-OR 151 respectively step up and step down the up/down modulo N counter 153. EXCLUSIVE-OR 152 steps the modulo N counter 154 whenever the MSB of the upper and lower pixel i.e., the MSB of pixel just before and just after the reference pixel presumed to correspond to the current test pixel as shown in FIG. 6 are different. When modulo N counter 154 overflows it resets modulo N counter 153 and when modulo N counter 153 either overflows or underflows counter 154 is reset.

Counter 153 is designed to overflow or underflow after $K_y$ up or down pulses where $K_y$ is preferably 128. Counter 154 overflows after 4$K_y$ pulses. The overflow or underflow pulses from counter 153 increment or decrement integrator 155 (which acts as an accumulator). The integrator 155 is initialized by the corner detector to the value $I_y$ which identifies the pixel number of the top most pixel having printing detail therein. As in the X-axis tracking, the output of the tracking error detector from integrator 155 is a six bit word. Six bits are required because the total dynamic range of the tracker in the Y direction is 28 pixels in one-half pixel increments. This results in a total of 56 discrete values for the Y-axis control command which requires six bits.

Tracking in the Y direction is accomplished by a combination of varying the starting time of the test array with respect to the reference array and the half element shift previously described. Of the 128 pixels available from the reference array, only 100 are actually used with the remaining 28 pixels being discarded. Under ideal conditions, the 100 pixels used in the reference array correspond to the central 100 pixels in the test array and the test and reference arrays are scanned in time phase. Under these conditions, pixel number 15 of the test array appears at the input to the flaw detector 138 at the same time as pixel number 15 appears from the reference array.

Should the tracking error detector indicate, for example, the correct match is between pixel number 15 from the test array and pixel number 14 from the reference array, then tracking correction can be made by starting the scan of the test array one pixel clock period earlier. This will cause pixel number 15 from the test array to arrive at the input to the flaw detector simultaneously with pixel number 14 from the reference array. Additionally, if the required tracking correction is a multiple of a one-half pixel, the timing of the test scan start is combined with a half element shift to effect the desired tracking correction. The effect of doing this is to cause an increment in tracking correction. This half element shift is accomplished in a manner described earlier in connection with the test array itself whereby the detector sites within the array 102 are selected to accomplish the desired one-half pixel shift.

The integer shift of the scan time is accomplished by feeding the five most significant bits of the Y-axis control command developed in the integrator 155 to an adder 156 while sending the least significant bit from the integrator 155 to the half pixel shift switch 115. The adder 156 adds to the five most significant bits of the control word to a bias word. The bias word is derived by measureing the displacement of the test array with respect to the position of the test note and is operative to adjust the five most significant bits from the integrator 155 such that the output of the adder 156 correctly presets the down counter 157 so as to assure that the test array begins scanning at the proper time.

Once the down counter 157 is properly preset and the system master clock indicates on the line marked SYNC that the test array should be scanning, the down counter 157 counts down with each pixel clock pulse received thereby. Once the down counter 157 reaches zero, a zero indication is transmitted to the counter 158 which becomes initialized thereby for counting pixel clock pulses. This counter 158 in cooperation with the scan logic and decoder 159 cooperate together to satisfy the scan logic requirements established by the manufacturer of the test array to activate the desired detector sites to scan the proper area of the test note.

The flaw detector 138 uses on-line high speed video data received from the test array by way of a line captioned $S_T$ and reference note video data from the multiplexer 136 over the line labeled $S_R$. The flaw detector 138 responds thereto to produce four different quantities. The first quantity $S_R$ corresponds to the average reflectance from the reference note over an area bounded by 100×16 pixels. The second quantity $S_T$ represents the average reflectance of the test note over a corresponding area of 100×16 pixels. The third quantity $E_2$ corresponds to the number of exceedances over an area of 100×2 pixels where an exceedance occurs whenever the difference between the reference and the test note signals integrated over an area of 2×2 pixels exceeds the preset threshold. The fourth quantity $E_4$ is the number of exceedances occurring over an area bounded by 100×4 pixels where each such exceedance occurs whenever the difference between the reference and the test note signals integrated over an area of 4×4 pixels exceeds a preset threshold.

The above quantities are generated in the flaw detector 138 as follows. Operation of the flaw detector assumes there is no tracking error and that corresponding pixels from the reference and the test note appear simultaneously at the two inputs to the time gate 160. During each line scan, the time gate 160 is operative to let 100 selected reference note pixels and 100 test note pixels corresponding thereto to form the input to adders 161 and 162. The adders 161 and 162 add the four bit words for each pixel thereby generating part of the quantities $S_T$ and $S_R$. Since it is desired that $S_R$ and $S_T$ represent the reflectance from the test note and reference note over an area of 100 pixels by 16 pixels and the paper transport is designed to move the test and reference note by ½ pixel for each scan line, the adders 161 and 162 must add the data from 32 consecutive scan lines to form the desired scan. Once these sums are formed, the sums $S_T$ and $S_R$ are transmitted to an external computer and the adders 161 and 162 are reset to zero so a new sum can be formed.

A third adder 163 is coupled to the output of the time gate 160 so that the quantity $S_T$ is subtracted from the quantity $S_R$. The difference between the reference and the test note represents a flaw on the test note as compared to the reference note. The difference is applied to one input of a four input adder 165 as well as to the first of three series connected shift registers 164. The three shift registers 164 and the adder 163 each present a four bit word to an input to the adder 165, each four bit word corresponding to the reflectance from an area 1×½ pixel. Therefore the sum at the output of the adder 165 represents the reflectance over an area 1 pixel high by 2 pixels wide. By operating the adder 165 a second time when the next difference is available at the output of the adder 163, a second sum is formed which itself is added to the previously formed sum. This latter sum is the difference in reflectance between the test note and the reference note over an area of 2×2 pixels which is referred to as a 2×2 patch. The adder 165 is thereafter reset so that another 2×2 patch can be formed.

The 2×2 patch is then compared in a comparator 166 to determine if it exceeds a threshold. If so, an exceedance is said to occur and the adder 167 operates like an accumulator or counter to increment a sum by one. Accordingly, the adder 167 forms a number $E_2$ which is the number of 2×2 patches on the test note having flaws of sufficient magnitude so that an exceedance has occurred. This sum of exceedances $E_2$ is periodically sampled by an external system such as a computer. When the value of $E_2$ is transmitted to the external system, the value in the adder 167 is reset to zero.

The 2×2 patch information words are also transmitted from the output of the adder 165 to one input of an adder 169 and a 50 word shift register 168. The adder 169 then forms the sum of the differences $S_R - S_T$ over an area 8 lines wide (4 pixels) by 2 pixels high. This summing is repeated and accumulated until the sum of $S_R - S_T$ over an an area of 4×100 pixels is formed which occurs once each line scan. This sum is then compared with a threshold in a comparator 170 and if the sum exceeds the threshold, the adder 171 increments an exceedance count $E_4$ by 1.

The exceedance count maintained in the adder 171 can be sampled by an external system such as a computer. When this occurs, the exceedance $E_4$ is transmitted to the external system and the adder 171 is reset to zero.

The quantities $S_T$, $S_R$, $E_2$ and $E_4$ are used by the external system to determine whether the test note is sufficiently similar to the reference note so as to be acceptable. Each of the quantities is compared in the external system against a selectable threshold. Then, as a function of their values with respect to the selectable threshold, the operator is alerted if an unacceptable note has been detected.

A further variation permits a more sophisticated flaw detection. According to this modification, the output of the adder 165 is compared against two different thresholds (a low and a high threshold). The exceedances of both comparisons are accumulated and then sent to the external system for comparison with a selectable threshold. In a similar manner, the output of the adder 169 is compared against a low and a high threshold. The exceedances are accumulated and periodically sampled by the external system. These exceedances are compared against other thresholds. When the external system detects an exceeded threshold, the operator is notified that the note is not of acceptable print quality and should be destroyed.

While the foregoing discussion has concentrated on the circuitry of FIG. 3, that circuitry is, in accordance with the present invention, the circuitry for a single channel. By the term single channel it is meant that the circuitry of FIG. 3 is designed to scan a given portion of a test and a reference note as each is moved past the test and reference array. More particularly, the single channel circuitry of FIG. 3, since it includes the tracking error detector 137, is positioned so that the test array and the associated reference array scan a portion of the test and reference note respectively which includes the edge 121 of the design which comprises the note. The edge 121 is utilized as already mentioned to initialize the system.

Any other identifiable feature on a note could be utilized to initialize the system as well. Once initialized, the systemwill make tracking adjustments so that the area scanned on the test note corresponds to the area scanned on the reference note without further use of the corner detector 120.

As viewed in FIG. 7, the vertically disposed generally rectangular area labeled A represents the area scanned by, for example, the test array as the note moves past it. The area A includes a portion indicated at 400 which lies above the border of the note 121. This area 400 normally has no detail in it, however, as pointed out earlier, this area is scanned so that the exact location of the edge 121 can be determined.

A further area 402 comprises an area scanned by the test array scanning area A as well as by a second test array which scans the area indicated by B. The arrays scanning areas A and B are physically located so that the overlap area 402 is preferably an area which is one pixel wide and 14 pixels high. Accordingly, the Y-axis tracker 114 of FIG. 3 can adjust the Y-axis tracking for the test array scanning area A upwardly or downwardly so that the lower most of the 100 actually utilized detector sites comprises one of the 14 pixels which scan the area 402. The Y-axis tracking information from the array scanning area A is transmitted to the test array scanning area B so that it starts scanning the test note beginning at the pixel lying below the last pixel utilized by test array scanning area A.

As noted before in the discussion with respect to FIG. 3, each of the test and reference arrays are utilized in a manner permitting them to output 100 of the 128 pixels produced during each scan. The tracking error detector and the Y axis tracker adjusts the system so that the top most sampled and utilized pixel lies on the upper edge 121 of the bill and the bottom most pixel of the 100 pixels utilized with respect to array A lies in the area 402. Since there is an overlap between the areas scanned by array B, the Y-axis tracker 114 is utilized to control the test array for array B. The Y-axis tracker 114 is similarly utilized to synchronize the operation of other test arrays such as arrays C and D as symbolized in FIG. 7.

Although not shown in FIG. 7, a further test array associated with another channel is disposed such that it will scan the edge 121 along the bottom of the note. By scanning from the bottom of that array upwardly toward the top edge of the note, the edge detector and tracking circuitry can be utilized to initialize the system and to properly track the test note. In addition, the circuitry associated with that channel can control the circuitry associated with other channels.

In the preferred embodiment of the present invention, the top border of the note is scanned by an array and the control signals generated thereby with respect to X and Y tracking is utilized thereby and is also transmitted to three other channels. A further channel is utilized to scan the bottom edge of the note and the X and Y axis tracking information generated thereby is utilized to control two other channels. Accordingly, a total of seven channels are utilized in scanning a single note with four channels being controlled by the array which scans the top edge of the note and three channels being controlled by the channel which scans the bottom edge of the note. Accordingly, a total of seven channels are utilized to scan a given note with each channel producing 128 pixels of which 100 are utilized by the flaw detector in each channel.

The foregoing description of the invention has made particular reference to specific sizes of shift registers, test arrays, counter etc. Those of skill in the art will readily recognize that these particular sizes and components have been chosen to particularly take advantage of circuits readily available to the designer, however, there is nothing critical about the particular circuits selected. Accordingly, those of skill in the art can easily devise other configurations having the same or similar operating characteristics to the circuitry described above and in the drawings without departing from the scope of the invention claimed herein.

One clearly evident modification involves using a master note for the reference note wherein the master note reflections are stored in a memory device. Then, when synchronism is achieved, the test note is compared with the data stored in the memory device in the same manner discussed above for the reference note.

FIGS. 8–16 show one implementation of the present invention with circuit types and the interconnections. The particular circuit types shown are merely representative of commercially available circuits for which there are known equivalents which may be substituted therefor. Accordingly, those skilled in the art can readily construct a circuit according to the present invention using different circuit types without departing from the scope of the claimed invention.

FIGS. 8–16 show the specific circuitry for one channel of the flaw detector which is operative to compare, in operation, 100 pixels of a test note with 100 pixels in a reference note which may be another note in uncut sheet of notes, a master note or digital information a memory derived from scanning a master note. The circuitry of the other channels which couple to the circuitry of FIGS. 8–16 are coupled thereto by the lines of FIGS. 8A–8I labled BUS. Since the signals on the lines labled BUS come from the channel that does synchronization, the circuitry for generating those signals in FIGS. 8–16 need not be duplicated in the other channels.

FIGS. 8A–8I, as a means of simplifying the drawing, lines with signals of opposite polarity are shown connected together. For example, in FIG. 8A, the line "REF START A (HI)" is shown being connected to the line "REF START A (LO)". In actuality, both lines are separate but follow a path designated by the common line. As such, "REF START A (HI)" couples only to pins on other jacks labled "REF START A (HI)". A similar relationship exists for the other identified signals in FIGS. 8A–8I.

Those skilled in the art to which the invention pertains will readily recognize numerous modifications which may be made to the system described above without departing from the spirit and scope of the invention as defined in the following claims.

What is claimed is:

1. A document inspection system for inspecting a test document to determine if it is the same as a reference document, comprising, in combination:

a test document optical scan means for producing a plurality of pixel representations for the light reflected from each of a plurality of defined areas on the test document, the pixels lying along a straight line;

means to periodically actuate said scan means to output a plurality of lines of said pixel representations, a pixel at a time, with the pixel output at any moment in time comprising the current test pixel, each said line being displaced from each other said line on the document and comprising most but not all of the pixels from said scan means in a line of said pixels;

means responsive to said scan means to identify the first pixel output therefrom having printing detail therein;

means to store in a plurality of rows with a plurality of pixels in each such row the pixel representations for a reference document presumed to be identical to the test document;

means to define the current row of reference document pixel representations;

means responsive to said identifying means, said means defining the current row of reference document pixel representations and to said test document pixel representations to compare the most significant bit of the current test pixel representation from said scan means with the most significant bit of the corresponding pixel in the preceeding and the succeeding row for said reference document, a preceeding mismatch signal and a succeeding mismatch signal is produced if a mismatch occurs respectively between the most significant bit of the corresponding pixel in the preceeding and succeeding row for said reference document and the most significant bit of the current test pixel;

a modulo N up/down counter means to count up in response to said preceeding mismatch signal and to count down in response to said succeeding mismatch signal, said modulo N counter producing either an overflow or an underflow signal when it overflows or underflows respectively; and accumulator means responsive to said overflow and said underflow signal to respectively count up or count down, the count in said accumulator means comprising said means to define the current row of reference document pixel representations.

2. The document inspection system of claim 1 additionally including means to form the difference between the current test pixel and the reference pixel presumed to correspond thereto, the difference being correlated to the extent of difference between the document test pixel and the reference pixel corresponding thereto; and means to sum a plurality of such differrences to form a representation for the difference between an area of the test document and a corresponding area of the reference document.

3. The document inspection system of claim 2 additionally including means to compare said sum of a plurality of such differences against a threshold and produce an exceedance signal if the threshold is exceeded and means to accumulate such exceedance signals.

4. The document inspection system of claim 1 additionally including a modulo counter and means to increment said modulo counter each time the most significant bit of the pixel in said preceeding and said succeeding row are different from each other, said modulo counter producing an overflow reset signal after 4 N differences have been counted, said overflow reset signal resets said modulo N up/down counter and said overflow or underflow signal being operative to reset said modulo counter.

5. The document inspection system of claim 1 additionally including means to compare the most significant bit of said current test pixel with the most significant bit of the pixels in said current row of reference document pixels occurring just before and just after the pixel presumed to correspond to said current test pixel to produce an upper mismatch signal or a lower mismatch signal respectively if a mismatch occurs;

a second modulo N up/down counter responsive to said upper mismatch signal or said lower mismatch signal to respectively either count up or down and producing an overflow or an underflow signal after a net of N upper mismatch signals or a net of N lower mismatch signals;

second accumulator means responsive to said overflow or said underflow signals to respectively count up or count down, the number contained therein comprising the pixel number having the top edge of printing on the document.

6. The document inspection system of claim 5 additionally including means responsive to said second accumulator means to cause said periodic actuation means to output a plurality of pixels where the first pixel output is identified by the number in said second accumulator means.

7. In an optical document inspection system, an image sensor arrangement comprising, in combination:

means to optically measure the light reflected from a plurality of elemental areas on a document, said areas being identified as odd and as even numbered areas;

means to generate either a no-shift signal or a shift signal;

combining means responsive to said no-shift signal to combine each odd numbered area with the following even numbered area to form a set of pixels having its centroid between the odd numbered area and the following even numbered area and responsive to said shift signal to combine each even numbered area with the following odd numbered area to form a pixel having its centroid between the even numbered area and the following odd numbered area.

8. The image sensor arrangement of claim 7 wherein said means to optically measure includes a register to store an analog signal whose magnitude is related to the intensity of light reflected from each elemental area and an analog shift register coupled thereto, said shift register being operative to sum the analog signal input to any position therein with the analog signal already stored therein.

9. In a document inspection system, a registration error detector comprising, in combination:

means to scan, line-by-line, a test document and produce multi-bit pixel representations of elemental areas on the document, a plurality of such pixels being produced for each line;

a modulo N up/down counter for counting up or counting down, said up/down counter producing either an overflow signal or an underflow signal on either overflowing or underflowing respectively;

an accumulator responsive to said overflow or said underflow signals to either increment or decrement the value contained therin;

means to store a plurality of multi-bit pixels in each of a plurality of rows for a reference document against which the test document is to be registered;

means to output a bit at a time the most significant bit from each pixel in the row of pixels in said storage means before and after the row identified by the value in said accumulator;

means to compare a bit at a time the most significant bit of each test pixel in a row with the most significant bits output by said output means and to produce an increment pulse to increment said up/-down counter if the most significant bit of the test pixel does not compare with the most significant bit from said output means for the row after that identified by said accumulator and to produce a decrement pulse to decrement said up/down counter if the most significant bit of the test pixel does not compare with the most significant bit from said output means for the row before that identified by said accumulator.

10. The registeration error detector of claim 9 including second compare means to compare the most significant bit from each pixel position in the row before that identified by said accumulator with the most significant bit from the same pixel position in the row after that identified by said accumulator for producing a not compare signal when the two bits are not the same;

a second modulo counter for counting each occurrence of said bit compare signal and producing an overflow reset signal if 4 N compare signals are counted;

said overflow reset signal being operative to reset said modulo N up/down counter and said overflow or said underflow signals from said modulo N up/-down counter being operative to reset said second modulo counter.

11. In a document inspection system, a registration error detector comprising, in combination:

means to scan, a pixel at a time, a plurality of pixels in a line of pixels on a test document;

a modulo N up/down counter for counting up or counting down, said up/down counter producing either an overflow signal or an underflow signal on either overflowing or underflowing respectively;

an accumulator responsive to said overflow or said underflow signals to either instrument or decrement respectively the value contained therein;

means responsive to said accumulator to select the first pixel in each line of pixels on the test document to be outputed from said scan means;

means to store a plurality of multi-bit pixels in each of a plurality of rows for the reference document against which the test document is to be registered;

means to output a bit at a time the most significant bit from the pixel before and after that corresponding to the pixel output from said scan means;

means to compare a bit at a time the most significant bit from each test pixel in row with the most significant bits output by said output means and to produce an increment pulse to increment said up/-down counter if the most significant bit of the test pixel does not correspond with the most significant bit from said output means for the pixel after that corresponding to the test pixel and to produce a decrement pulse to decrement said up/down counter if the most significant bit of the test pixel does not correspond with the most significant bit from said output means for the pixel before that corresponding to the test pixel.

12. The registration error detector of claim 11 including a second compare means to compare the most significant bit from the pixel before and the pixel after that presumed to correspond to each test pixel and to produce a not compare signal when the two bits are not the same;

a second modulo counter for counting each occurrence of said not compare signal and producing an overflow reset signal if 4 N compare signals are counted;

said overflow reset signal being operative to reset said modulo N up/down counter and said overflow or said underflow signals from said modulo N up/-down counter being operative to reset said second modulo counter.

13. In a document inspection system for inspecting a test document to determine if it is the same as a reference document, an edge detector for locating printing on the test document comprising, in combination:

means to optically scan one elemental optical area at a time across the test document, said optical scanning means including a plurality of optical sensors positioned relative to the test document so that printing on the document may be scanned thereby;

means to add the sample value from each sensor with the previous sample from the same sensor to form a sun therewith;

means to compare said sum with a threshold selected so that a sum having one relationship with respect to said threshold indicates the lack of presence of printing detail on the test document in the area scanned by said optical scan means and a sum having another relationship with respect to said selected threshold indicates the presence of printing detail, said compare means producing a detect signal when said sum has said another relationship with respect to said selected threshold.

14. The edge detector of claim 13 wherein said means to add comprises a two input adder with one input coupled directly to said scan means and its other input coupled through a one optical element delay circuit coupled to said optical scan means to produce at its output the sum of two successive optical sensor outputs from said scan means.

* * * * *